United States Patent
Kojima et al.

(10) Patent No.: US 11,894,753 B2
(45) Date of Patent: Feb. 6, 2024

(54) DECELERATION MECHANISM AND MOTOR HAVING DECELERATION MECHANISM INSTALLED THEREIN

(71) Applicant: MITSUBA Corporation, Gunma (JP)

(72) Inventors: Naoki Kojima, Gunma (JP); Motoaki Kobayashi, Gunma (JP); Teppei Tokizaki, Gunma (JP); Yoshichika Kawashima, Gunma (JP)

(73) Assignee: MITSUBA Corporation, Gunma (JP)

( * ) Notice: Subject to any disclaimer, the term of this patent is extended or adjusted under 35 U.S.C. 154(b) by 762 days.

(21) Appl. No.: 16/982,052

(22) PCT Filed: Apr. 3, 2019

(86) PCT No.: PCT/JP2019/014795
§ 371 (c)(1),
(2) Date: Sep. 18, 2020

(87) PCT Pub. No.: WO2019/194222
PCT Pub. Date: Oct. 10, 2019

(65) Prior Publication Data
US 2021/0021174 A1    Jan. 21, 2021

(30) Foreign Application Priority Data

Apr. 5, 2018    (JP) ................. 2018-072962
Apr. 27, 2018   (JP) ................. 2018-086448
Jul. 23, 2018   (JP) ................. 2018-137747

(51) Int. Cl.
H02K 7/11      (2006.01)
H02K 7/116     (2006.01)
(Continued)

(52) U.S. Cl.
CPC ............. *H02K 7/116* (2013.01); *F16H 55/08* (2013.01); *F16H 1/08* (2013.01); *F16H 55/06* (2013.01); *H02K 5/225* (2013.01)

(58) Field of Classification Search
CPC .... F16H 1/08; F16H 2055/0893; F16H 55/06; F16H 55/08; F16H 2057/02034;
(Continued)

(56) References Cited

U.S. PATENT DOCUMENTS 5,505,668 A * 4/1996 Koriakov-Savoysky ................... F16H 1/32 74/462
2005/0028626 A1 * 2/2005 Fleytman .................. F16H 1/08 74/416

(Continued)

FOREIGN PATENT DOCUMENTS

CN    102072308    5/2011
CN    104081093    10/2014
(Continued)

OTHER PUBLICATIONS

JP-2017133582-A, Ito, all pages (Year: 2017).*
(Continued)

*Primary Examiner* — Naishadh N Desai
(74) *Attorney, Agent, or Firm* — JCIPRNET

(57) ABSTRACT

A deceleration mechanism is provided with first and second gears, a first tooth part arranged in the first gear and extending spirally in an axial direction of the first gear, an engagement projected part arranged on the first tooth part, second tooth parts arranged on the second gear, and an engagement recessed part arranged between the adjacent second tooth parts. The engagement projected part is formed in an arc shape in a direction orthogonal to the axial direction of the first gear and has a curvature center eccentric from a rotation center of the first gear. The second tooth parts
(Continued)

are inclined with respect to the axial direction of the first gear and arranged in a circumferential direction of the second gear. The engagement projected part is formed in an arc-shape in a direction orthogonal to the axial direction of the first gear and engaged with the engagement projected part.

6 Claims, 30 Drawing Sheets

(51) Int. Cl.
    *F16H 55/08*     (2006.01)
    *F16H 1/08*     (2006.01)
    *F16H 55/06*     (2006.01)
    *H02K 5/22*     (2006.01)

(58) Field of Classification Search
    CPC ........... F16H 2057/0325; F16H 57/031; F16H 57/032; H02K 11/215; H02K 11/38; H02K 2213/03; H02K 5/10; H02K 5/1735; H02K 5/225; H02K 7/116; B21C 37/065; B21D 5/015
    See application file for complete search history.

(56) References Cited

U.S. PATENT DOCUMENTS

| | | | |
|---|---|---|---|
| 2010/0095792 A1* | 4/2010 | Stanovskoy | F16H 1/08 74/423 |
| 2012/0291578 A1* | 11/2012 | Stanovskoy | B23F 15/00 74/412 R |
| 2021/0021174 A1* | 1/2021 | Kojima | H02K 11/215 |

FOREIGN PATENT DOCUMENTS

| | | |
|---|---|---|
| CN | 105114532 | 12/2015 |
| EP | 2177788 | 4/2010 |
| EP | 2532926 | 12/2012 |
| JP | S63198861 | 12/1988 |
| JP | H0394455 | 9/1991 |
| JP | 2008309251 | 12/2008 |
| JP | 2009126328 | 6/2009 |
| JP | 2009248852 | 10/2009 |
| JP | 2016080040 | 5/2016 |
| JP | 2016175638 | 10/2016 |
| JP | 2017078457 | 4/2017 |
| JP | 2017133582 | 8/2017 |
| JP | 2017133582 A * | 8/2017 |
| JP | 2017166690 | 9/2017 |
| WO | 2017041400 | 3/2017 |

OTHER PUBLICATIONS

"Search Report of Europe Counterpart Application", dated Sep. 24, 2021, p. 1-p. 9.
"Office Action of China Counterpart Application", dated Mar. 1, 2023, with English translation thereof, p. 1-p. 16.
"Office Action of Japan Counterpart Application", dated Dec. 21, 2021, with English translation thereof, p. 1-p. 9.
"International Search Report (Form PCT/ISA/210) of PCT/JP2019/ 014795," dated Jun. 25, 2019, with English translation thereof, pp. 1-4.
Office Action of China Counterpart Application, with English translation thereof, dated Jul. 28, 2023, pp. 1-12.

* cited by examiner

DECELERATION MECHANISM AND MOTOR HAVING DECELERATION MECHANISM INSTALLED THEREIN

CROSS-REFERENCE TO RELATED APPLICATION

This application is a 371 application of the International PCT application serial no. PCT/JP2019/014795, filed on Apr. 3, 2019, which claims the priority benefits of Japan Patent Application No. 2018-072962, filed on Apr. 5, 2018, Japan Patent Application No. 2018-086448, filed on Apr. 27, 2018, and Japan Patent Application No. 2018-137747, filed on Jul. 23, 2018. The entirety of each of the above-mentioned patent applications is hereby incorporated by reference herein and made a part of this specification.

BACKGROUND

Technical Field

The present invention relates to a deceleration mechanism comprising a first gear and a second gear that are engaged with each other and a motor having deceleration mechanism installed therein.

Related Art

Conventionally, a motor having deceleration mechanism installed therein which is small-sized and capable of providing high output has been used as a drive source of a wiper device, a power window device or the like mounted on a vehicle such as an automobile. The motor having deceleration mechanism installed therein for automobile use is described in, for example, Patent literature 1.

The motor having deceleration mechanism installed therein described in Patent literature 1 is used as a drive source of a seat lifter device and includes an electric motor and a housing. A helical gear having a small gear number rotated by the rotary shaft of the electric motor, a driven side helical gear engaged with the helical gear having a small gear number, a worm integrally rotated with the driven side helical gear, and a worm wheel engaged with the worm are rotatably housed in the housing.

As described above, in the motor having deceleration mechanism installed therein described in Patent literature 1, a two-stage deceleration mechanism is housed in the housing. Specifically, the first-stage deceleration mechanism is composed of the helical gear having a small gear number and the driven side helical gear, and the second-stage deceleration mechanism is composed of the worm and the worm wheel. This allows the motor having deceleration mechanism installed therein to be made compact and installed beside the seat.

LITERATURE OF RELATED ART

Patent Literature

Patent literature 1: Japanese Patent Laid-Open No. 2017-133582

SUMMARY

Problems to be Solved

However, in the technique described in Patent literature 1, for example, involute gears are used for the helical gear having a small gear number and the driven side helical gear that constitute the first-stage deceleration mechanism. Therefore, when it is necessary to further increase the deceleration ratio, the following problems may occur.

That is, in order to increase the deceleration ratio, it is necessary to increase the difference in the number of teeth between the helical gear having a small gear number and the driven side helical gear. However, the number of the teeth on the helical gear having a small gear number is already as small as "2". Therefore, when it is considered to increase the number of the teeth on the driven side helical gear, adjacent teeth on the driven side helical gear are arranged close to each other, and the engagement surface of the teeth stands substantially vertically and becomes flat.

Then, the teeth on the helical gear having a small gear number and the teeth on the driven side helical gear interfere with each other, consequently resulting in deterioration in the state of engagement. Thus, in the involute gear, there is a limit to meet the need for further increasing the deceleration ratio without increasing the size of the deceleration mechanism.

An object of the present invention is to provide a deceleration mechanism, which is provided with gears formed in an engaging shape capable of increasing the deceleration ratio, and a motor having deceleration mechanism installed therein.

Means to Solve Problems

In the deceleration mechanism of the present invention, there is provided a deceleration mechanism including a first gear and a second gear. The deceleration mechanism has a first tooth part arranged in the first gear and extending spirally in the axial direction of the first gear, an engagement projected part arranged on the first tooth part, formed in an arc shape in a direction orthogonal to the axial direction of the first gear, and having a curvature center at a position eccentric from the rotation center of the first gear; a plurality of second tooth parts arranged on the second gear, inclined with respect to the axial direction of the first gear, and arranged in the circumferential direction of the second gear; and an engagement recessed part arranged between the adjacent second tooth parts, formed in an arc shape in a direction orthogonal to the axial direction of the first gear, and engaged with the engagement projected part.

In another aspect of the present invention, the deceleration ratio of the first gear and the second gear is equal to the ratio of a first distance between the curvature center of the engagement projected part and the rotation center of the first gear and a second distance between the curvature center of the engagement recessed part and the rotation center of the second gear.

In another aspect of the present invention, the first tooth part include an apex arranged on the engagement projected part at an end part of a radial outer side of the first gear, and a relief part arranged at the end part opposite to the apex with respect to the curvature center of the engagement projected part and configured to prevent interference with the second tooth part.

In another aspect of the present invention, the axis of the first gear and the axis of the second gear are parallel to each other.

In the motor having deceleration mechanism installed therein of the present invention, there is provided a motor having deceleration mechanism installed therein including a motor having a rotating body, a first gear rotated by the rotating body, and a second gear rotated by the first gear. The motor having deceleration mechanism installed therein has a first tooth part arranged in the first gear and extending spirally in the axial direction of the first gear; an engagement projected part arranged on the first tooth part, formed in an arc shape in a direction orthogonal to the axial direction of the first gear, and having a curvature center at a position eccentric from the rotation center of the first gear; a plurality of second tooth parts arranged on the second gear, inclined with respect to the axial direction of the first gear, and arranged in the circumferential direction of the second gear; an engagement recessed part arranged between the adjacent second tooth parts, formed in an arc shape in a direction orthogonal to the axial direction of the first gear, and engaged with the engagement projected part; and an output shaft arranged at the rotation center of the second gear.

In another aspect of the present invention, the deceleration ratio of the first gear and the second gear is equal to the ratio of a first distance between the curvature center of the engagement projected part and the rotation center of the first gear and a second distance between the curvature center of the engagement recessed part and the rotation center of the second gear.

In another aspect of the present invention, the first tooth part includes an apex arranged on the engagement projected part at an end part of a radial outer side of the first gear, and a relief part arranged at the end part opposite to the apex with respect to the curvature center of the engagement projected part and configured to prevent interference with the second tooth part.

In another aspect of the present invention, the axis of the first gear and the axis of the second gear are parallel to each other.

In the deceleration mechanism of the present invention, there is provided a deceleration mechanism including a first gear and a second gear. The deceleration mechanism has an engagement projected part arranged on the first gear, formed in an arc shape having a first radius of curvature along the rotation direction of the first gear, and an engagement recessed part arranged on the second gear and engaged with the engagement projected part. The engagement recessed part includes a bottom arranged at the center of the engagement recessed part along the rotation direction of the second gear, and side wall parts arranged on both sides of the bottom along the rotation direction of the second gear. The side wall parts are arc-shaped recessed parts or arc-shaped projected parts having a second radius of curvature larger than the first radius of curvature.

In another aspect of the present invention, the size of the second radius of curvature is at least twice the size of the first radius of curvature.

In another aspect of the present invention, a lubricating oil holding part for holding lubricating oil is arranged between the engagement projected part and the bottom.

In another aspect of the present invention, a build-up part that narrows a gap formed between the engagement projected part and the bottom is arranged between the engagement projected part and the bottom.

In another aspect of the present invention, there is provided a deceleration mechanism including a first gear and a second gear. The deceleration mechanism has an engagement projected part arranged on the first gear, formed in an arc shape along the rotation direction of the first gear, and an engagement recessed part arranged on the second gear and engaged with the engagement projected part. The engagement recessed part includes a bottom arranged at the center of the engagement recessed part along the rotation direction of the second gear, and side wall parts arranged on both sides of the bottom along the rotation direction of the second gear. The side wall parts are flat surfaces extending straight from the bottom.

In another aspect of the present invention, a lubricating oil holding part for holding lubricating oil is arranged between the engagement projected part and the bottom.

In another aspect of the present invention, a build-up part that narrows a gap formed between the engagement projected part and the bottom is arranged between the engagement projected part and the bottom.

In the motor having deceleration mechanism installed therein of the present invention, there is provided a motor having deceleration mechanism installed therein which has a deceleration mechanism including a first gear and a second gear and includes a rotary shaft for driving the first gear to rotate. The motor having deceleration mechanism installed therein has an engagement projected part arranged on the first gear and formed in an arc shape having a first radius of curvature along the rotation direction of the first gear and an engagement recessed part arranged on the second gear and engaged with the engagement projected part. The engagement recessed part includes a bottom arranged at the center of the engagement recessed part along the rotation direction of the second gear and side wall parts arranged on both sides of the bottom along the rotation direction of the second gear. The side wall parts are arc-shaped recessed parts or arc-shaped projected parts having a second radius of curvature larger than the first radius of curvature.

In another aspect of the present invention, the size of the second radius of curvature is at least twice the size of the first radius of curvature.

In another aspect of the present invention, a lubricating oil holding part for holding lubricating oil is arranged between the engagement projected part and the bottom.

In another aspect of the present invention, a build-up part that narrows a gap formed between the engagement projected part and the bottom is arranged between the engagement projected part and the bottom.

In another aspect of the present invention, there is provided a motor having deceleration mechanism installed therein which has a deceleration mechanism including a first gear and a second gear and includes a rotary shaft for driving the first gear to rotate. The motor having deceleration mechanism installed therein has an engagement projected part arranged on the first gear and formed in an arc shape along the rotation direction of the first gear, and an engagement recessed part arranged on the second gear and engaged with the engagement projected part. The engagement recessed part includes a bottom arranged at the center of the engagement recessed part along the rotation direction of the second gear, and side wall parts arranged on both sides of the bottom along the rotation direction of the second gear. The side wall parts are flat surfaces extending straight from the bottom.

In another aspect of the present invention, a lubricating oil holding part for holding lubricating oil is arranged between the engagement projected part and the bottom.

In another aspect of the present invention, a build-up part that narrows a gap formed between the engagement projected part and the bottom is arranged between the engagement projected part and the bottom.

Effect

According to the present invention, one engagement projected part having a spiral shape is arranged in the first gear, a plurality of engagement recessed parts engaged with the engagement projected part are arranged in the second gear, and the engagement projected part and the engagement recessed parts are each formed to have an arc shape in a direction orthogonal to the axial direction of the first gear.

Therefore, the first gear and the second gear can be configured in an arc-shaped projected/recessed engagement structure that does not deteriorate the state of engagement therebetween. Also, by increasing the number of teeth on the second gear while keeping the number of teeth on the first gear at one tooth, the difference in the number of teeth can be easily increased. Therefore, the deceleration ratio of a deceleration mechanism can be increased without increasing the size thereof.

Figure 33:
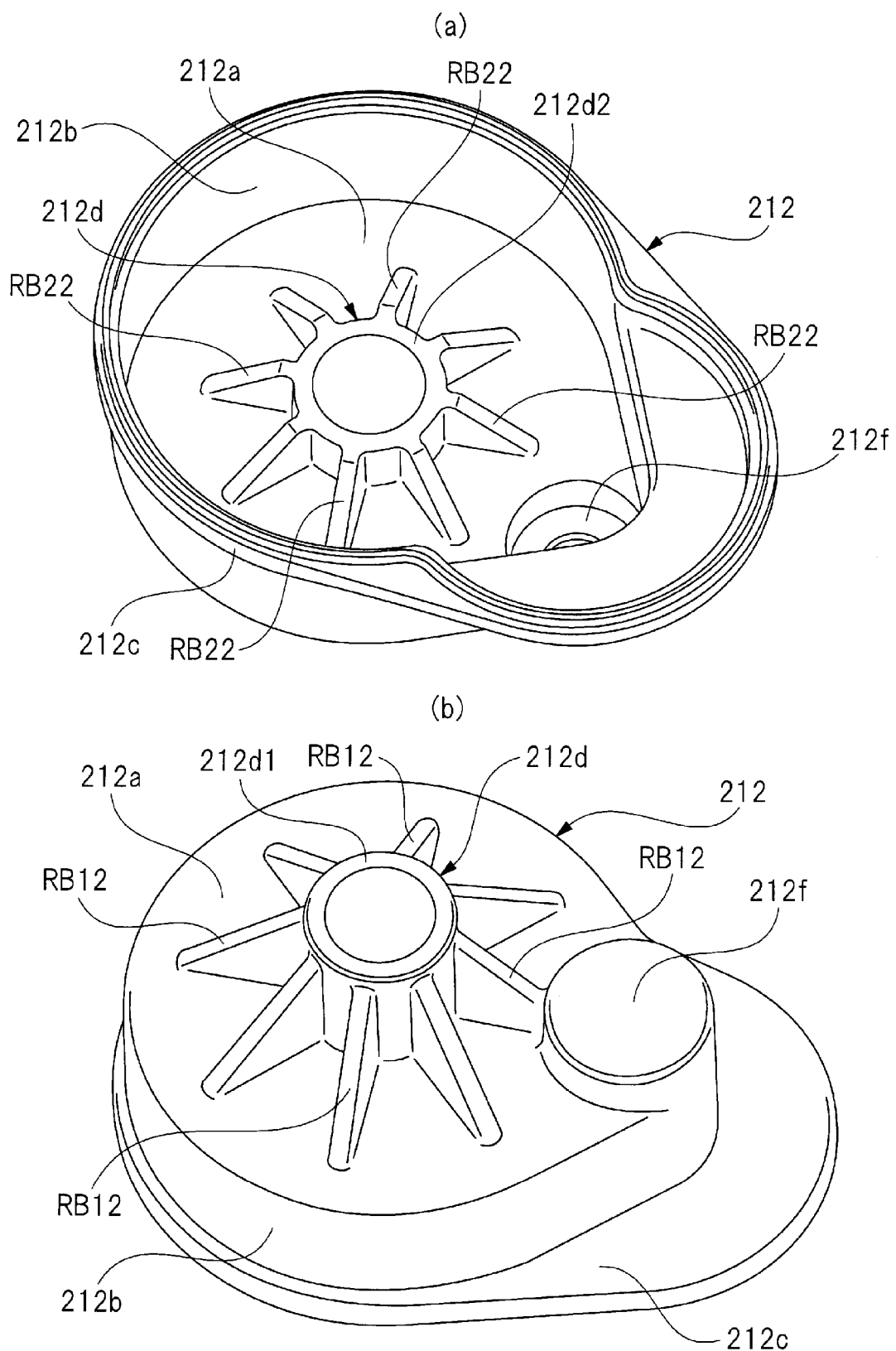

(a) and (b) of FIG. 33 are perspective views showing a gear case as a single unit.

Figure 34:
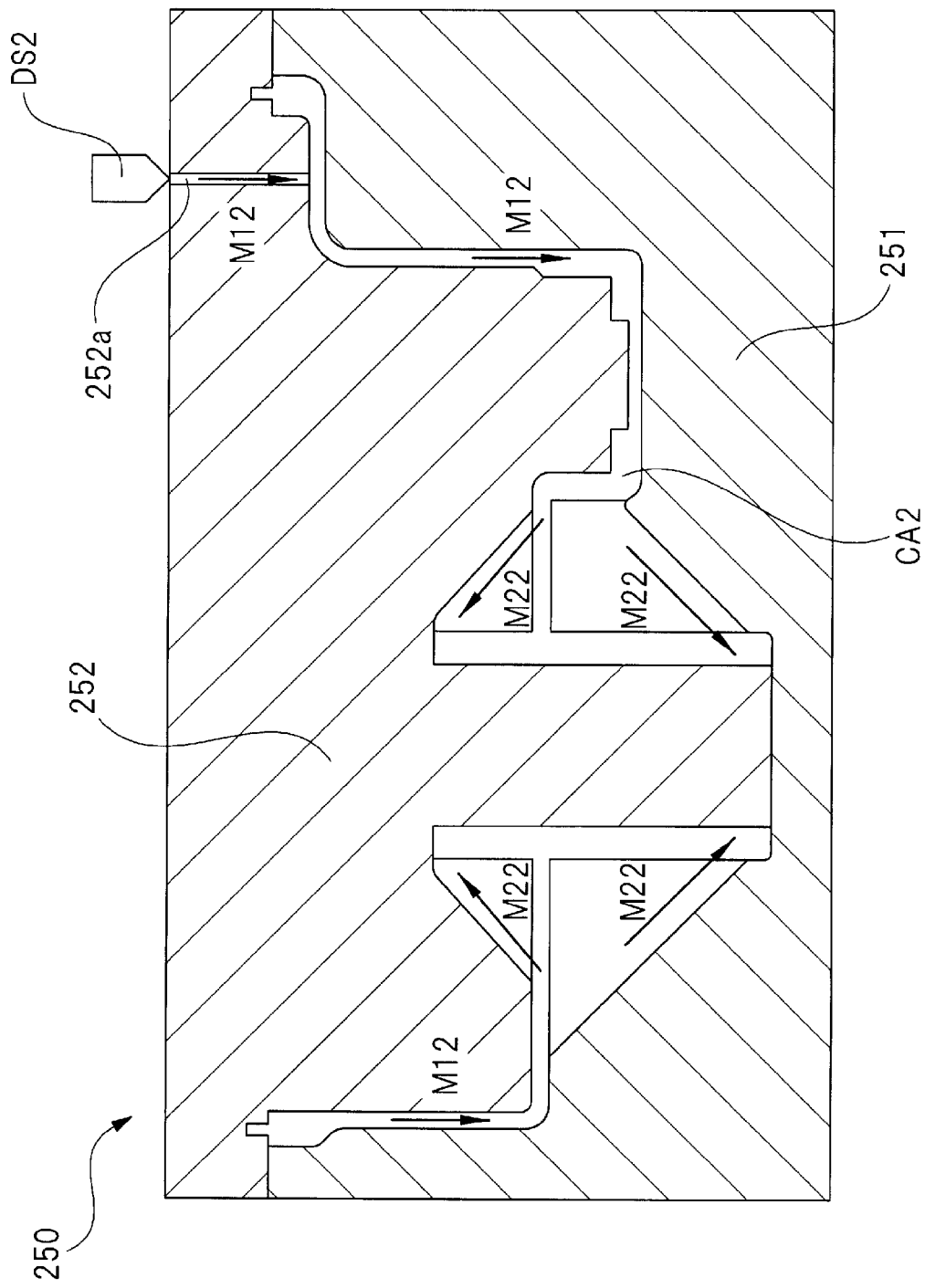

FIG. 34 is an explanatory diagram showing a manufacturing procedure of the gear case.

Figure 35:
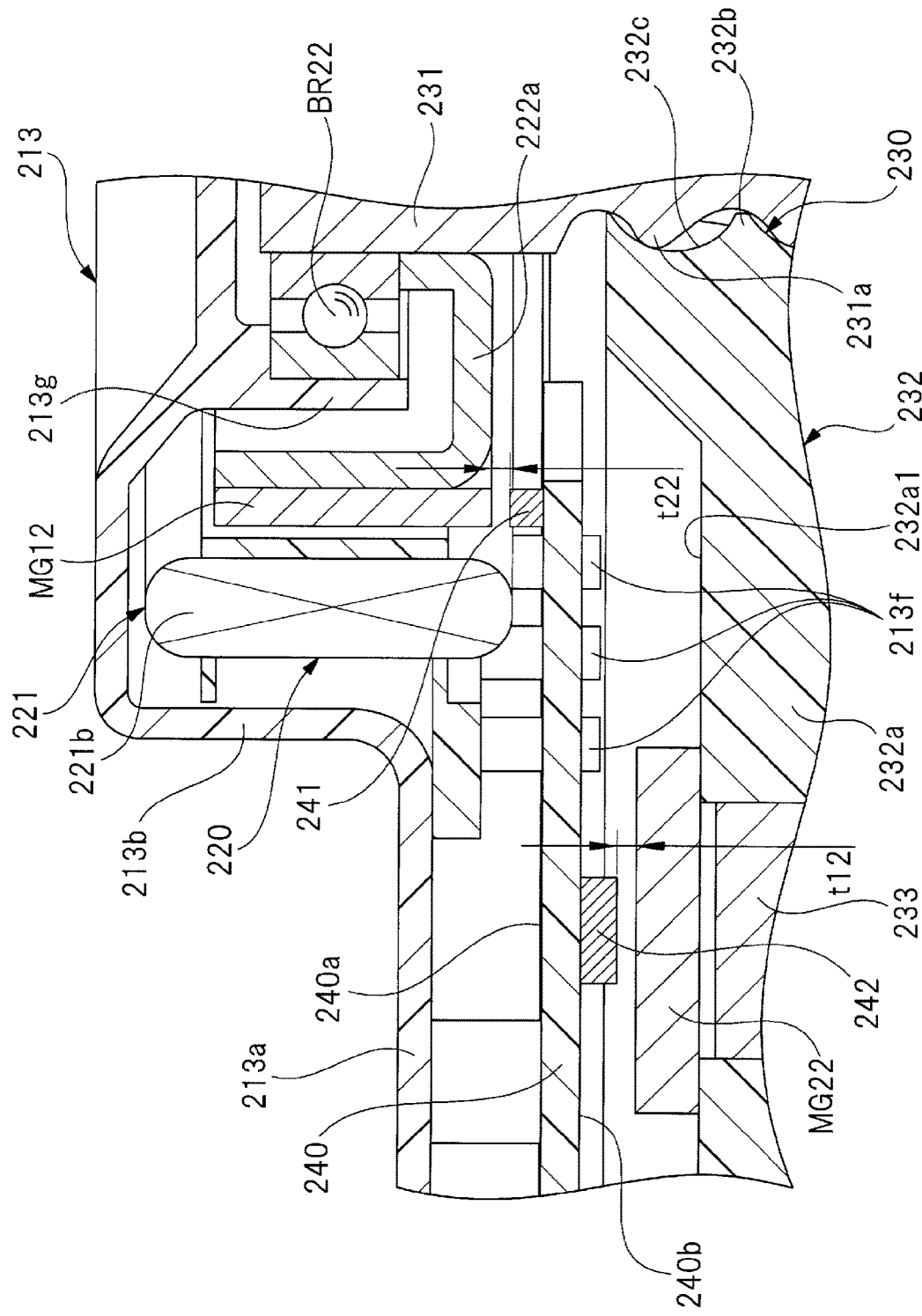

FIG. 35 is an enlarged cross-sectional view showing details of the sensor substrate.

Figure 36:
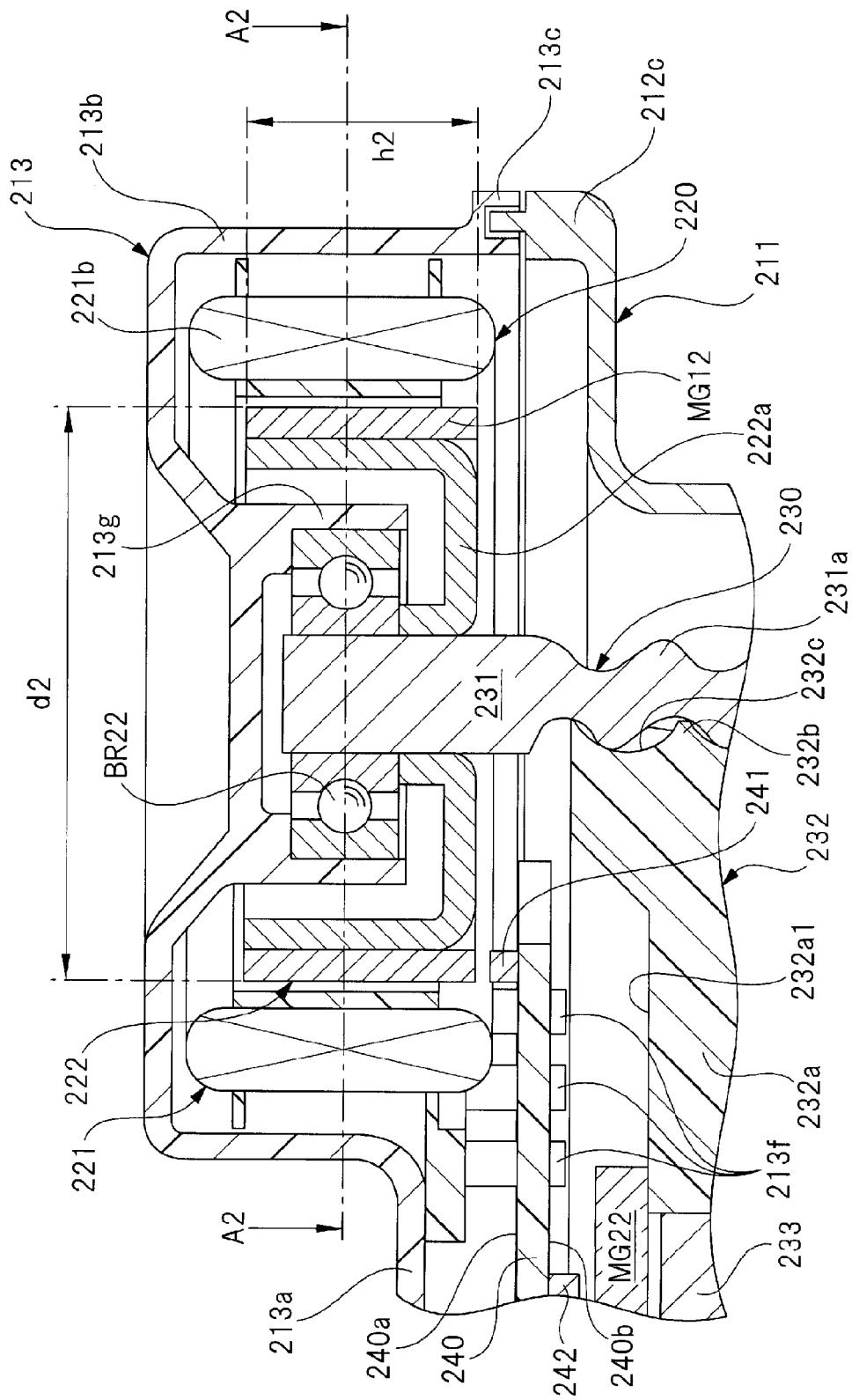

FIG. 36 is an enlarged cross-sectional view of a brushless motor.

Figure 37:
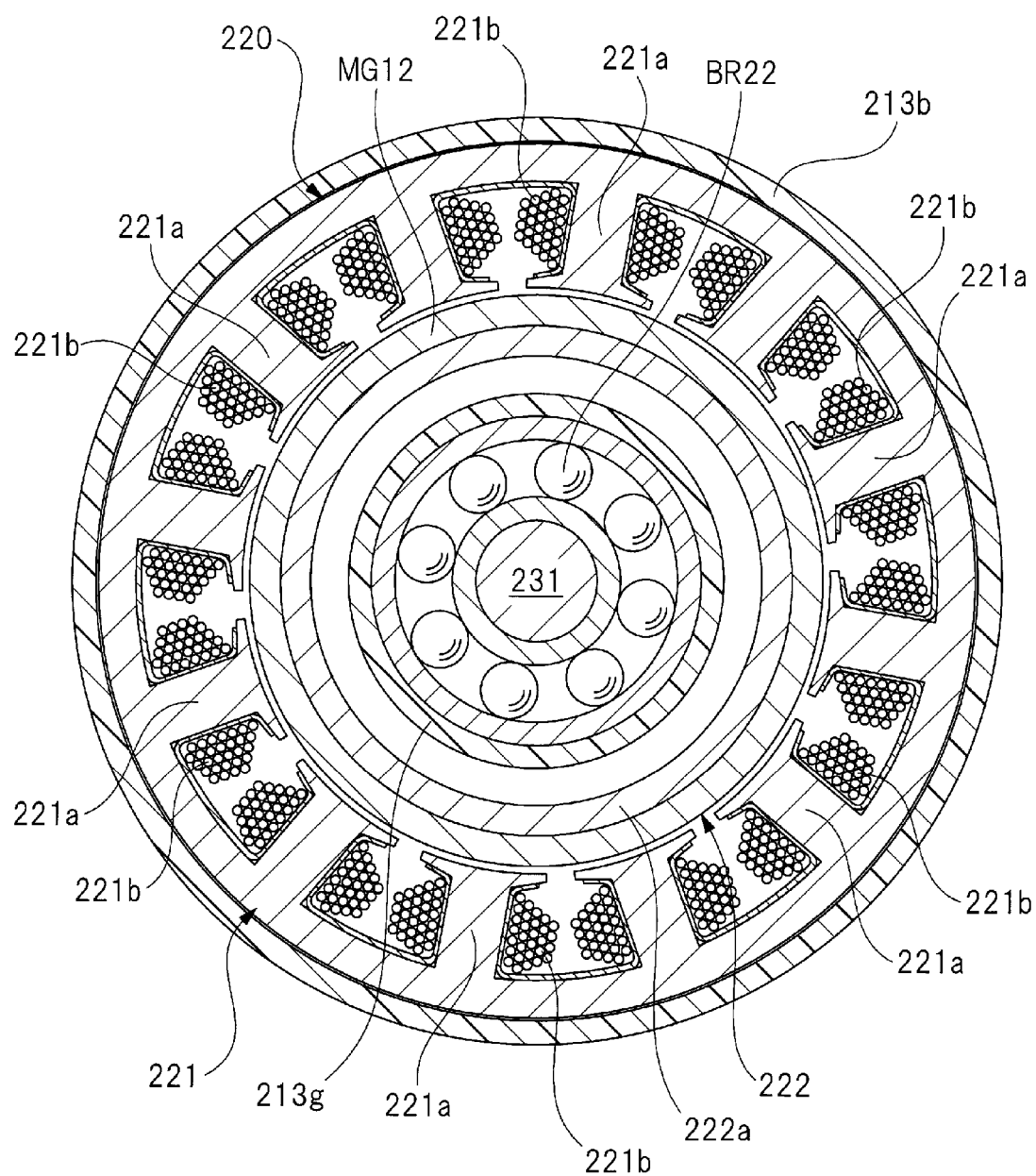

FIG. 37 is a cross-sectional view taken along the line A2-A2 of FIG. 36.

Figure 38:
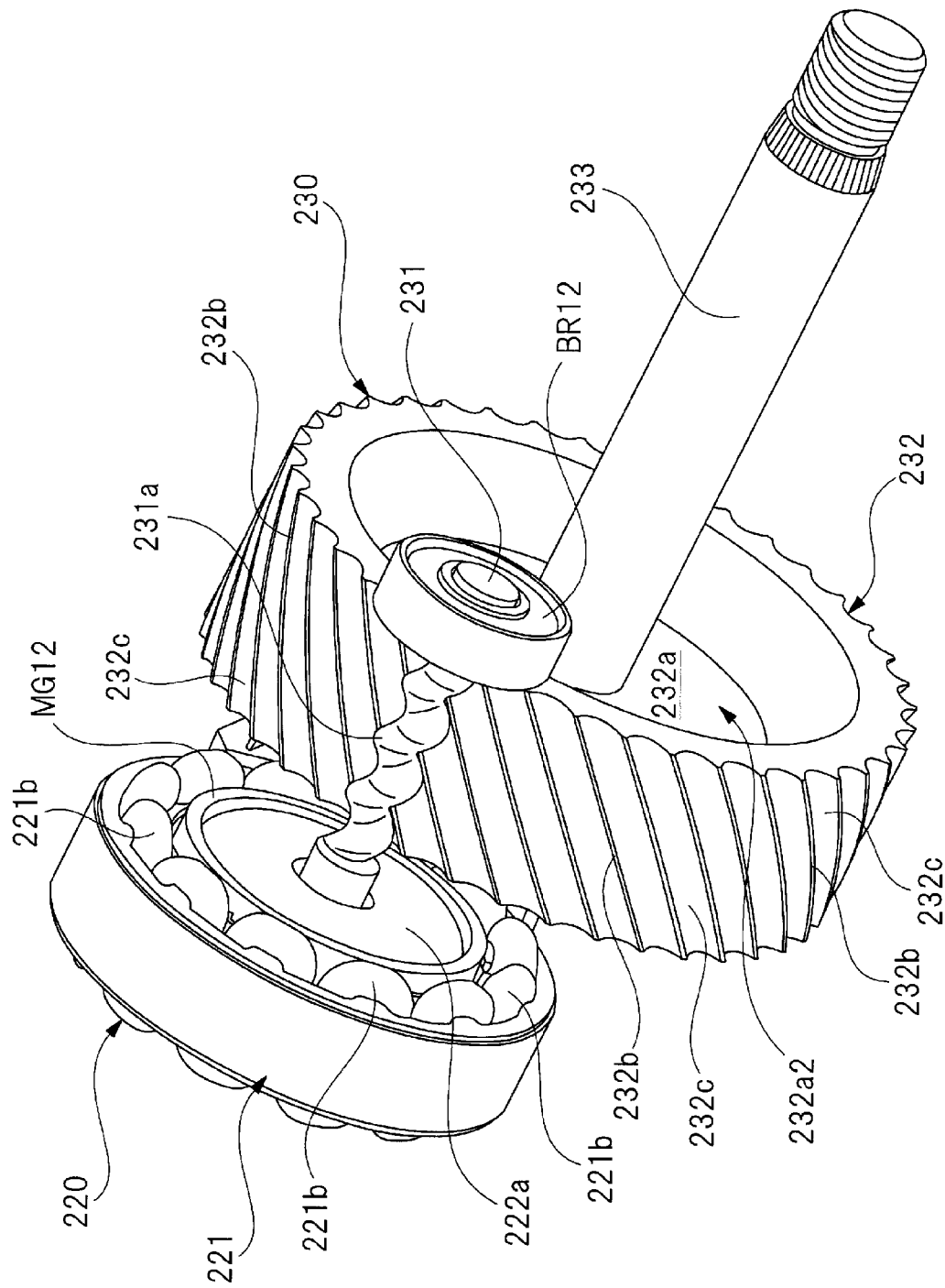

FIG. 38 is a perspective view showing details of the deceleration mechanism.

DESCRIPTION OF THE EMBODIMENTS

Hereinafter, a first embodiment of the present invention is described in detail with reference to the drawings.

Figure 1:
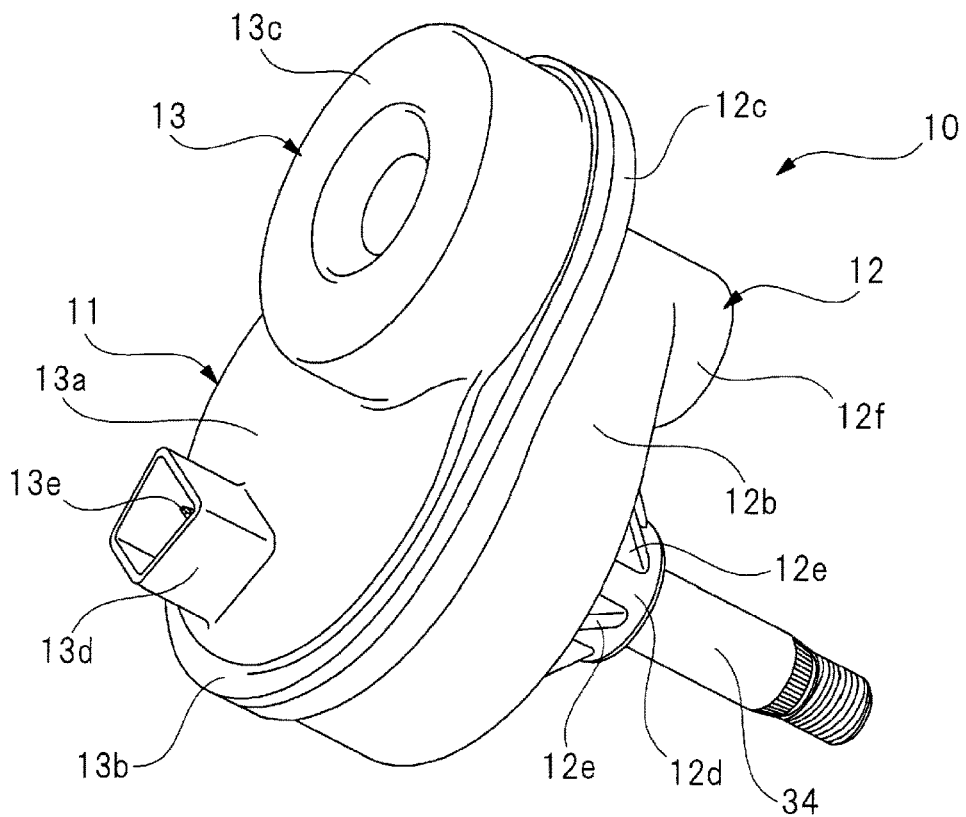
FIG. 1 is a perspective view of a motor having deceleration mechanism installed therein as viewed from a connector connection part side.
Figure 2:
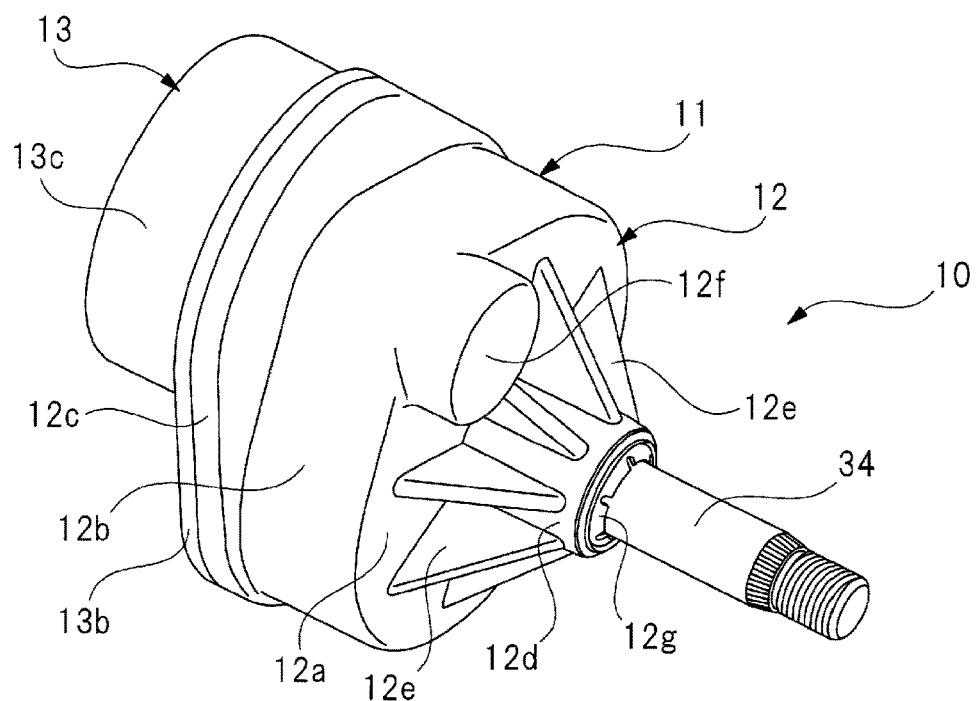
FIG. 2 is a perspective view of the motor having deceleration mechanism installed therein as viewed from an output shaft side.
Figure 3:
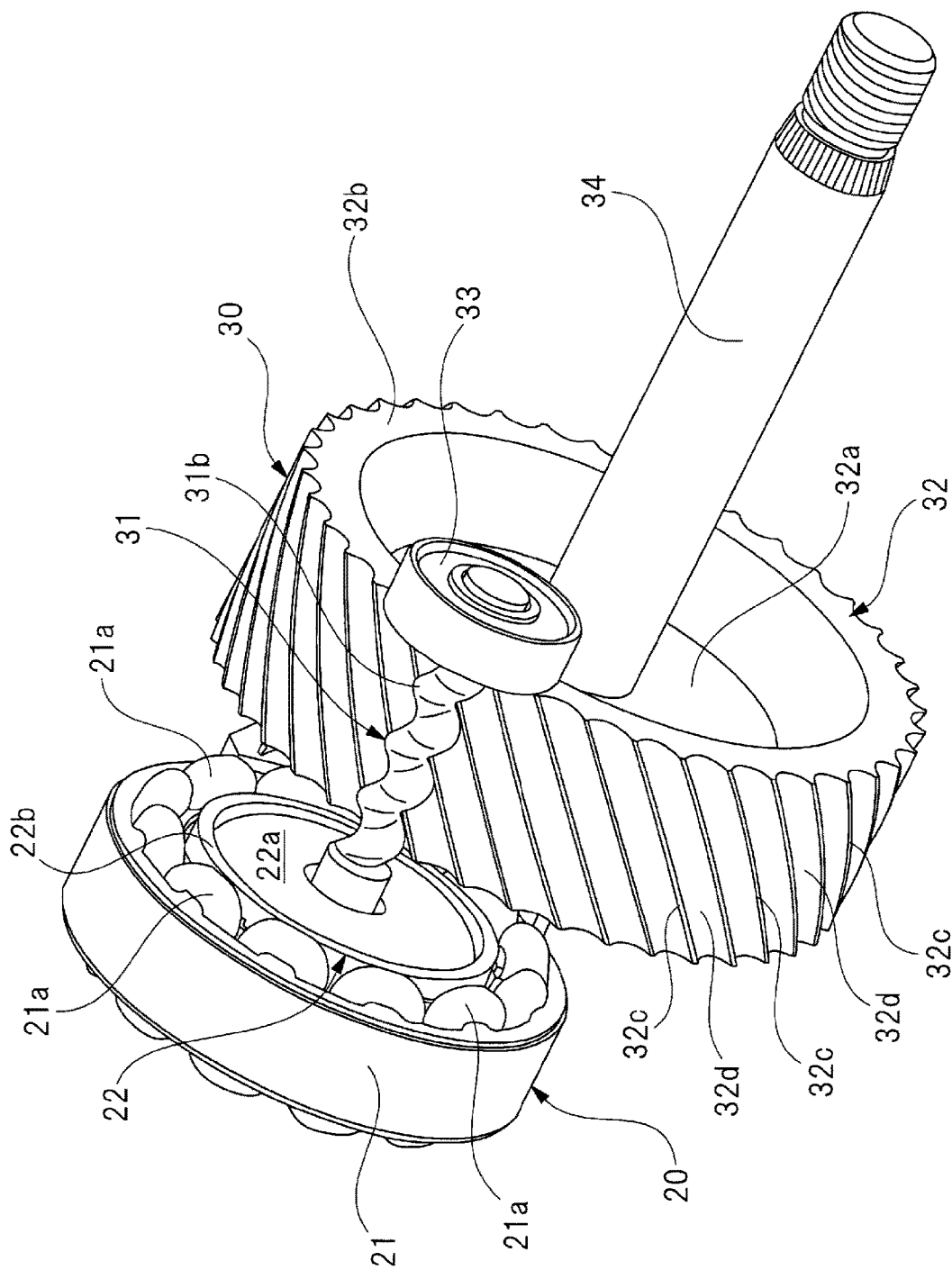
FIG. 3 is a perspective view showing an internal structure of the motor having deceleration mechanism installed therein.
Figure 4:
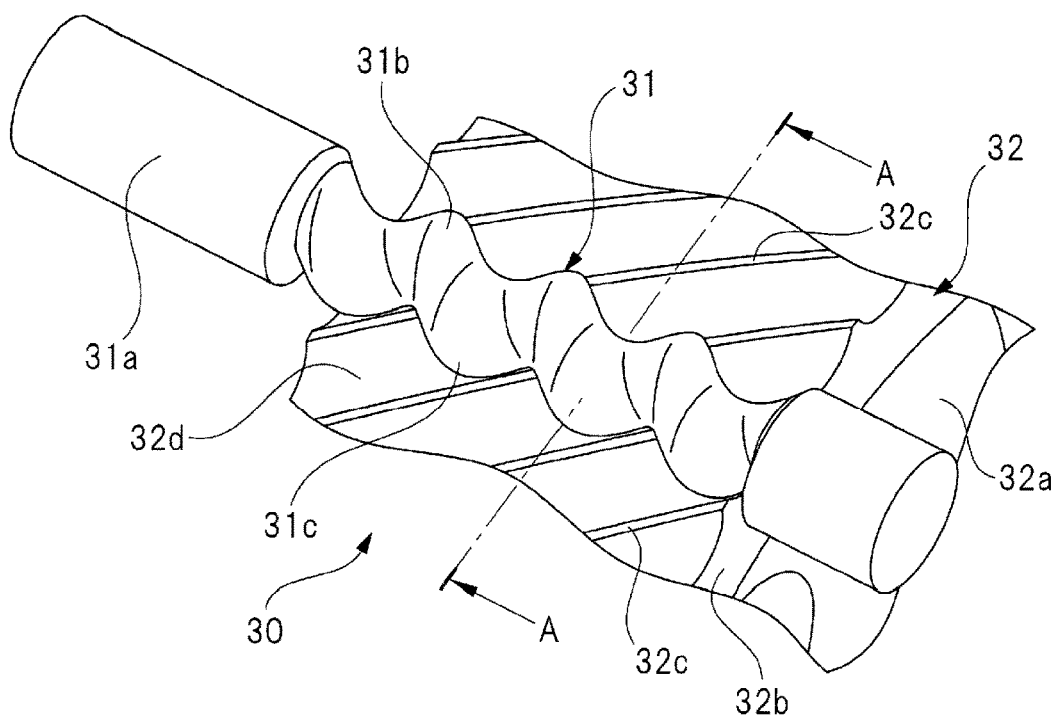
FIG. 4 is an enlarged perspective view of an engagement part of a pinion gear and a helical gear.
Figure 5:
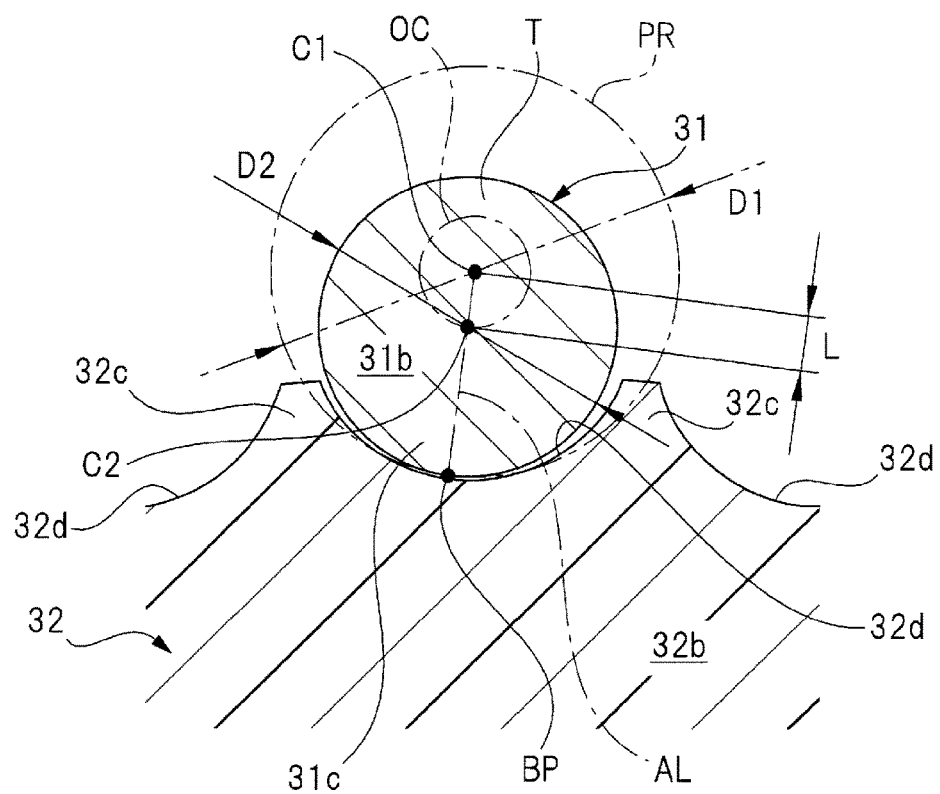
FIG. 5 is a cross-sectional view taken along the line A-A of FIG. 4.
Figure 6:
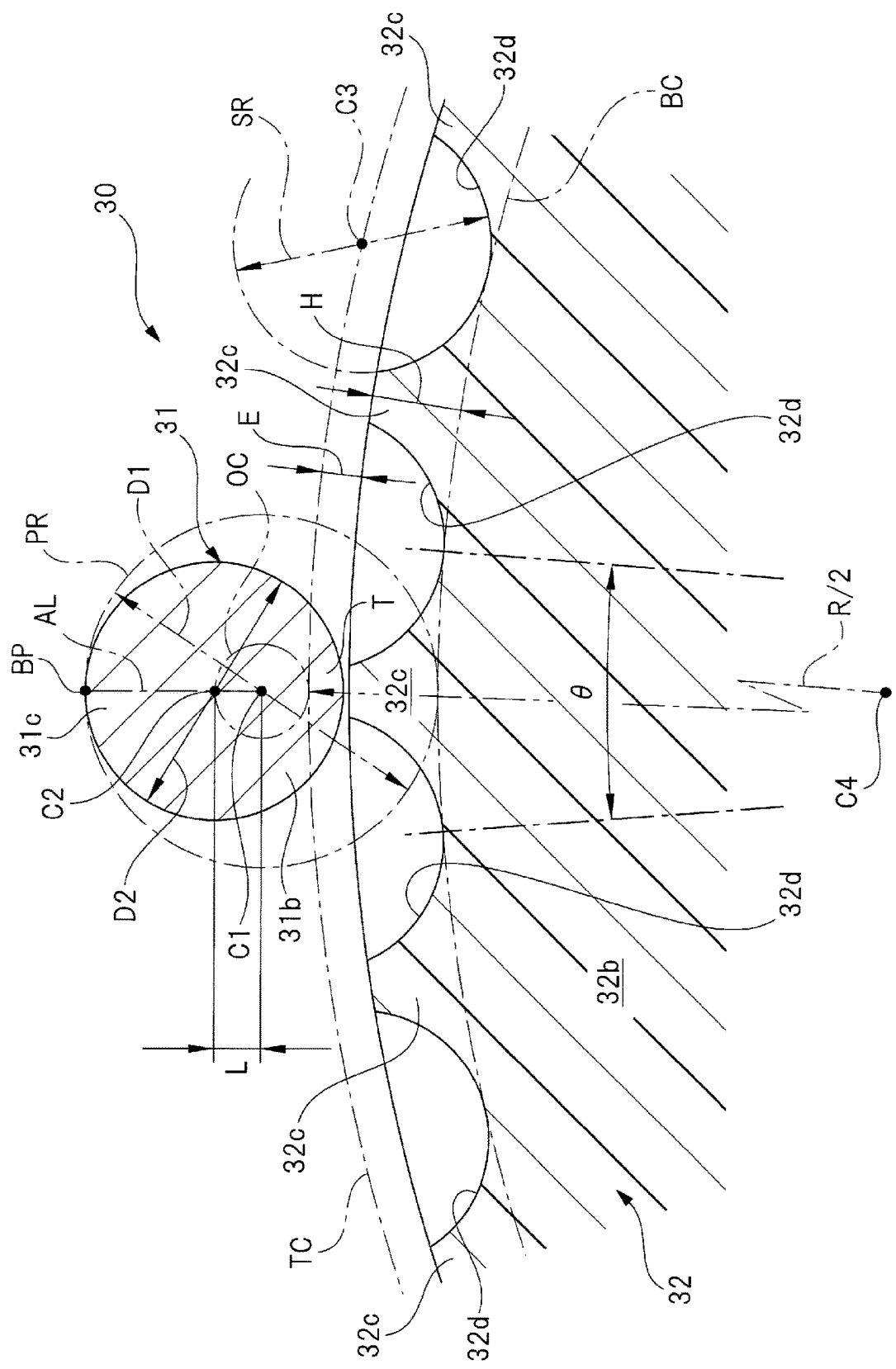
FIG. 6 is an explanatory diagram showing detailed shapes of the pinion gear and the helical gear.
Figure 7:
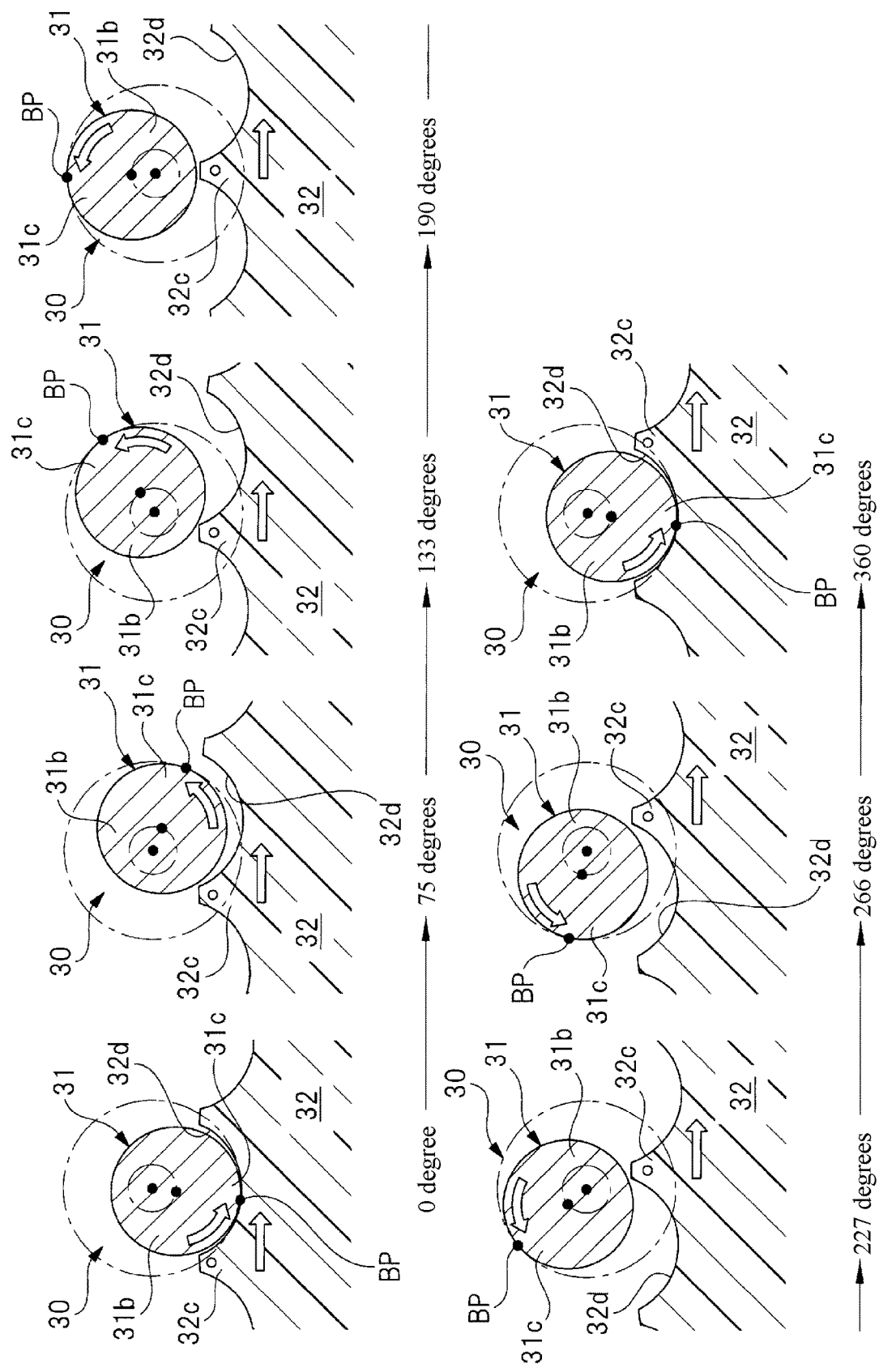
FIG. 7 is an explanatory diagram showing an engaging operation of the pinion gear and the helical gear.

FIG. 1 is a perspective view of a motor having deceleration mechanism installed therein as viewed from a connector connection part side. FIG. 2 is a perspective view of the motor having deceleration mechanism installed therein as viewed from an output shaft side. FIG. 3 is a perspective view showing an internal structure of the motor having deceleration mechanism installed therein. FIG. 4 is an enlarged perspective view of an engagement part of a pinion gear and a helical gear. FIG. 5 is a cross-sectional view taken along the line A-A of FIG. 4. FIG. 6 is an explanatory diagram showing detailed shapes of the pinion gear and the helical gear. FIG. 7 is an explanatory diagram showing an engaging operation of the pinion gear and the helical gear.

A motor 10 having deceleration mechanism installed therein shown in FIGS. 1 and 2 is used as a drive source of a wiper device (not shown) mounted on a vehicle such as an automobile. More specifically, in the motor 10 having deceleration mechanism installed therein, a wiper member (not shown) swingably arranged on the front side of a windshield (not shown) is swung within a predetermined wiping range (between the lower reversal position and the upper reversal position).

The motor 10 having deceleration mechanism installed therein includes a housing 11 that forms the outer shell thereof. As shown in FIG. 3, a brushless motor 20 and a deceleration mechanism 30 are rotatably housed inside the housing 11. Here, the housing 11 is formed of a casing 12 made of aluminum and a cover member 13 made of plastic.

As shown in FIGS. 1 and 2, the casing 12 is formed in a substantially bowl shape by injection molding of a molten aluminum material. Specifically, the casing 12 includes a bottom wall part 12a, a side wall part 12b formed around the bottom wall part 12a in an integrated manner, and a case flange 12c arranged on the opening side (left side in the diagram) of the casing 12.

A cylindrical boss part 12d rotatably holding an output shaft 34 is arranged substantially at the center of the bottom wall part 12a in an integrated manner. A cylindrical bearing member (not shown), which is a so-called metal, is mounted on the radial inner side of the boss part 12d, thereby allowing the output shaft 34 to rotate smoothly without chattering with respect to the boss part 12d.

In addition, a plurality of reinforcing ribs 12e extending radially around the boss part 12d are arranged on the radial outer side of the boss part 12d in an integrated manner. These reinforcing ribs 12e are arranged between the boss part 12d and the bottom wall part 12a, and have a substantially triangular shape. These reinforcing ribs 12e are configured to enhance the fixing strength of the boss part 12d to the bottom wall part 12a and prevent the occurrence of defects such as the boss part 12d being inclined with respect to the bottom wall part 12a.

Furthermore, a bearing member housing part 12f is arranged at a position eccentric from the boss part 12d of the bottom wall part 12a in an integrated manner. The bearing member housing part 12f is formed in a cylindrical shape with a bottom, and protrudes in the same direction as the protruding direction of the boss part 12d. In addition, as shown in FIG. 3, a ball bearing 33 rotatably supporting the front end side of a pinion gear 31 is housed inside the bearing member housing part 12f.

Moreover, as shown in FIG. 2, a retaining ring 12g is arranged between the boss part 12d and the output shaft 34, thereby preventing the output shaft 34 from chattering in the axial direction of the boss part 12d. Consequently, the quietness of the motor 10 having deceleration mechanism installed therein is ensured.

The cover member 13 forming the housing 11 is formed in a substantially flat plate shape by injection molding of a molten plastic material. Specifically, the cover member 13 includes a main body 13a and a cover flange 13b arranged around the main body 13a in an integrated manner. Besides, the cover flange 13b is abutted against the case flange 12c via a seal member (not shown) such as an O-ring, thereby preventing rainwater and the like from entering the housing 11.

In addition, a motor housing part 13c for housing the brushless motor 20 (see FIG. 3) is arranged on the main body part 13a of the cover member 13 in an integrated manner. The motor housing part 13c is formed in a cylindrical shape with a bottom, and protrudes toward the side opposite to the casing 12 side. The motor housing part 13c faces the bearing member housing part 12f of the casing 12 with the cover member 13 mounted on the casing 12. In addition, a stator 21 (see FIG. 3) of the brushless motor 20 is fixed inside the motor housing part 13c.

Furthermore, a connector connection part 13d connected with an external connector (not shown) on the vehicle side is arranged on the main body part 13a of the cover member 13 in an integrated manner. One end sides of a plurality of terminal members 13e (only one is shown in FIG. 1) for supplying a drive current to the brushless motor 20 are exposed inside the connector connection part side 13d. In addition, a drive current is supplied to the brushless motor 20 from the external connector via these terminal members 13e.

Moreover, a control substrate (not shown) for controlling the rotation state (rotation speed, rotation direction, and the like) of the brushless motor 20 is arranged between the other end sides of the plurality of terminal members 13e and the brushless motor 20. Accordingly, the wiper member fixed to the front end side of the output shaft 34 is swung on the windshield within a predetermined wiping range. Moreover, the control substrate is fixed inside the main body 13a of the cover member 13.

As shown in FIG. 3, the brushless motor 20 housed inside the housing 11 includes an annular stator (stationary member) 21. The stator 21 is fixed inside the motor housing part 13c (see FIG. 1) of the cover member 13 in a rotation-stopped state.

The stator 21 is formed by stacking a plurality of thin steel plates (magnetic bodies), and a plurality of teeth (not shown) are arranged on the radial inner side of the stator 21. U-phase, V-phase, and W-phase coils 21a are wound around these teeth in multiple turns by concentrated winding or the like. Accordingly, by alternately supplying a drive current to each coil 21a at a predetermined timing, the rotor 22 arranged on the radial inner side of the stator 21 is rotated with a predetermined drive torque in a predetermined rotation direction.

A rotor (rotary member) 22 is rotatably arranged on the radial inner side of the stator 21 via a minute gap (air gap). The rotor 22 constitutes the rotating body of the present invention, and includes a rotor body 22a formed by stacking a plurality of thin steel plates (magnetic bodies) into a substantially columnar shape. Besides, a cylindrical permanent magnet 22b is arranged on the outer peripheral part of the rotor 22. Here, the permanent magnet 22b is magnetized so that magnetic poles are arranged alternately with N poles, S pole, . . . in this order in the circumferential direction. The permanent magnet 22b is firmly fixed to the rotor body 22a in an integrally rotating manner by an adhesive or the like.

As described above, the brushless motor 20 according to the present embodiment is a brushless motor having a surface permanent magnet (SPM) structure in which the permanent magnet 22b is fixed to the surface of the rotor body 22a. However, the brushless motor is not limited to the SPM structure, and a brushless motor having an interior permanent magnet (IPM) structure in which a plurality of permanent magnets are embedded in the rotor body 22a may also be used.

In addition, instead of one permanent magnet 22b formed in a cylindrical shape, a plurality of permanent magnets having a substantially arc shaped cross section along a direction intersecting with the axis of the rotor body 22a may be arranged at equal intervals so that the magnetic poles are arranged alternately in the circumferential direction. Furthermore, the number of poles of the permanent magnet 22b may be arbitrarily set to, for example, 2 poles or 4 poles or more, depending on the specifications of the brushless motor 20.

As shown in FIG. 3, the deceleration mechanism 30 housed inside the housing 11 includes a pinion gear (first gear) 31 formed in a substantially rod shape and a helical gear (second gear) 32 formed in a substantially disc shape. Here, the axis of the pinion gear 31 and the axis of the helical gear 32 are parallel to each other. Accordingly, the deceleration mechanism 30 can be made more compact in size than a worm reduction gear including a worm and a worm wheel the axes of which intersect each other.

In addition, the pinion gear 31 is arranged on the input side (drive source side) of the motor 10 having deceleration mechanism installed therein, and the helical gear 32 is arranged on the output side (driving target side) of the motor 10 having deceleration mechanism installed therein. That is, the deceleration mechanism 30 reduces the high speed of rotation of the pinion gear 31 having a small number of teeth to the low speed of rotation of the helical gear 32 having a large number of teeth.

Here, the base end side of the pinion gear 31 is firmly fixed to the rotation center of the rotor body 22a by press fitting or the like, and the pinion gear 31 is integrally rotated with the rotor body 22a. That is, the pinion gear 31 is rotated by the rotor 22. In addition, the front end side of the pinion gear 31 is rotatably supported by the ball bearing 33. Furthermore, the base end side of the output shaft 34 is firmly fixed to the rotation center of the helical gear 32 by press fitting or the like, and the output shaft 34 is integrally rotated with the helical gear 32.

The pinion gear 31 forming the deceleration mechanism 30 is made of metal and has a shape as shown in FIGS. 3 to 6. Specifically, the pinion gear 31 has a pinion body 31a formed in a substantially columnar shape, the axial base end side is fixed to the rotor body 22a, and the axial front end side is rotatably supported by the ball bearing 33. That is, the rotation center C1 of the pinion gear 31 (pinion body 31a) coincides with the rotation center of the rotor body 22a and the ball bearing 33.

A spiral tooth (first tooth part) 31b is arranged at a part facing the helical gear 32 along the axial direction of the pinion body 31a in an integrated manner. Specifically, the axial length of the spiral tooth 31b is set to be slightly longer than the axial length of the helical gear 32. Accordingly, the spiral tooth 31b may be reliably engaged with the helical gear 32. Besides, the spiral tooth 31b continuously extends in a spiral manner in the axial direction of the pinion gear 31, and the pinion gear 31 is provided with only one spiral tooth 31b. That is, the number of teeth of the pinion gear 31 is set to "1".

As shown in FIG. 5, the spiral tooth 31b is formed to have a circular cross section along a direction orthogonal to the axial direction of the pinion gear 31. The center C2 of the spiral tooth 31b is eccentric (offset) from the rotation center C1 of the pinion gear 31 by a predetermined distance L. That is, the eccentric amount of the center C2 with respect to the rotation center C1 is L. Accordingly, the center C2 of the spiral tooth 31b follows a first rotation locus OC along with the rotation of the pinion gear 31. In other words, the first rotation locus OC forms a reference circle of the spiral tooth 31b.

Besides, as shown in FIG. 5, when an auxiliary line AL is drawn from the rotation center C1 of the pinion gear 31 toward the center C2 of the spiral tooth 31b (downward in the diagram) and the auxiliary line AL is further extended to the surface of the spiral tooth 31b, the auxiliary line AL intersects with the surface of the spiral tooth 31b. This intersection point is an apex BP of the engagement projected part 31c. Here, the apex BP is arranged on the engagement projected part 31c at the end part of the radial outer side (surface) of the pinion gear 31. In addition, the engagement projected part 31c, which constitutes an engagement part being a part of the spiral tooth 31b, also has a spiral shape and enters (be engaged with) the engagement recessed part 32d formed between adjacent helical teeth 32c of the helical gear 32.

In this way, the engagement projected part 31c is arranged at a part near the apex BP of the spiral tooth 31b. Besides, the engagement projected part 31c is formed in an arc shape in a direction orthogonal to the axial direction of the pinion gear 31, and a curvature center C2 is arranged at a position eccentric from the rotation center C1 of the pinion gear 31 by the predetermined distance L. That is, the curvature center C2 of the engagement projected part 31c coincides with the center C2 of the spiral tooth 31b.

Here, the apex BP of the engagement projected part 31c follows a second rotation locus PR along with the rotation of the pinion gear 31. That is, the diameter size D1 of the second rotation locus PR is larger than the diameter size D2 of the spiral tooth 31b (D1>D2).

Moreover, FIG. 5 shows a state in which the apex BP of the engagement projected part 31c has entered the engagement recessed part 32d of the helical gear 32, that is, a state in which the engagement projected part 31c is engaged with the engagement recessed part 32d.

The helical gear 32 forming the deceleration mechanism 30 is made of plastic and has a shape as shown in FIGS. 3 to 6. Specifically, the helical gear 32 includes a gear body 32a formed in a substantially disc shape, and the base end side of the output shaft 34 is firmly fixed to the center part of the gear body 32a by press fitting or the like. In addition, a cylindrical part 32b extending in the axial direction of the output shaft 34 is arranged on the outer peripheral part of the gear body 32a in an integrated manner.

A plurality of helical teeth (the second tooth part) 32c are arranged on the radial outer side of the cylindrical part 32b in an integrated manner so as to be aligned in the circumferential direction of the cylindrical part 32b. These helical teeth 32c are inclined with respect to the axial direction of the pinion gear 31 at a predetermined angle, and the helical gear 32 rotates with the rotation of the spiral tooth 31b accordingly. Here, the number of helical teeth 32c arranged on the helical gear 32 is set to "40". That is, in the present embodiment, the deceleration ratio of the deceleration mechanism 30 including the pinion gear 31 and the helical gear 32 is "40". Moreover, the engaging operation of the pinion gear 31 and the helical gear 32 is described below in detail.

As shown in FIGS. 5 and 6, the engagement recessed part 32d is arranged between the adjacent helical teeth 32c. Therefore, similar to the helical teeth 32c, the engagement recessed part 32d is also inclined with respect to the axial direction of the pinion gear 31 at a predetermined angle. The engagement projected part 31c of the pinion gear 31 is inserted into and engaged with the engagement recessed part 32d.

Here, the engagement recessed part 32d has a circular (substantially arc shape) cross section along the direction orthogonal to the axial direction of the pinion gear 31, and a curvature center C3 thereof is positioned on the reference circle TC of the helical gear 32. In addition, the diameter size SR of the engagement recess 32d is slightly larger than the diameter size D2 of the spiral tooth 31b (SR>D2).

The reference circle (=first rotation locus OC) of the spiral tooth 31b is circumscribed to the reference circle TC of the helical gear 32. Therefore, normally, the diameter size of the helical gear 32 is R (twice the distance between a rotation center C4 of the helical gear 32 and the first rotation locus OC) at the center of the helical gear 32c along the circumferential direction of the helical gear 32. In the present embodiment, the cross-sectional shape of the spiral tooth 31b is circular, following the shape of the engagement projected part 31c. Thus, although the pinion gear 31 is easy to manufacture, the thick part T having a predetermined thickness exists on the side opposite to the apex BP side of the spiral tooth 31b.

Therefore, in order to prevent the interference (contact) between the spiral tooth 31b and the helical teeth 32c, the tooth depth of the helical teeth 32c is reduced by a relief amount E and set to a tooth depth H at which the helical tooth 31b and the helical teeth 32c do not come into contact with each other. Here, the tooth depth H of the helical teeth 32c is the height from the root circle BC that passes through the deepest part of the engagement recessed part 32d. In addition, because the number of the teeth of the helical gear 32 is "40" and the number of the engagement recessed parts 32d is also "40", the angle θ formed between the adjacent engagement recessed parts 32d in the present embodiment is "9 degrees".

In summary, the shapes of the pinion gear 31 and the helical gear 32 are determined so as to satisfy the following various formulas.

Specifically, the shape of the pinion gear 31 is determined based on the following Formula (1).

$$(D2 \div 2 + L) \times 2 = D1 \quad (1)$$

D2: Diameter size of the spiral tooth 31b
L: Eccentricity
D1: Diameter size of the second rotation locus PR
In addition, the shape of the helical gear 32 is determined based on the following Formulas (2) to (4).

$$L \times 2 \times \text{deceleration ratio} = R \quad (2)$$

L: Eccentricity
R: Diameter size of the center of the spiral tooth 32c
Deceleration ratio: "40" in the present embodiment
That is, as shown in the above Formula (2), the deceleration ratio of the pinion gear 31 and the helical gear 32 (deceleration mechanism 30) is equal to the ratio of the first distance (=eccentricity L) between the curvature center C2 of the engagement projected part 31c and the rotation center C1 of the pinion gear 31 and the second distance (=R/2) between the curvature center C3 of the engagement recessed part 32d and the rotation center C4 of the helical gear 32.

$$SR = D2 + \alpha \quad (3)$$

SR: Diameter size of the engagement recessed part 32d
D2: Diameter size of the spiral tooth 31b
α: Very small amount $$D2 \div 2 - L \times 2 + \beta = E \quad (4)$$

D2: Diameter size of the spiral tooth 31b
L: Eccentricity
β: Very small amount
E: Relief amount of the helical teeth 32c
Here, the small amounts α and β in the above Formulas (3) and (4) are set values for smoothly engaging the engagement projected part 31c and the engagement recessed part 32d, and are appropriately set to minute optimum values according to the detailed shape of the tooth tip of the helical teeth 32c (minute curve, taper shape, and the like).

Next, the operation of the deceleration mechanism 30 formed as described above, that is, the engaging operation of the pinion gear 31 and the helical gear 32 is described in detail with reference to the drawings.

The state shown as "0 degree" in FIG. 7 is the same as the state shown in FIG. 5. In this state, the apex BP of the engagement projected part 31c of the pinion gear 31 is in a state of being put inside the engagement recessed part 32d of the helical gear 32. That is, the engagement projected part 31c and the engagement recessed part 32d are in a state of being engaged with each other.

Then, during the operation of the deceleration mechanism 30, the state in which the engagement projected part 31c and the engagement recessed part 32d are engaged with each other, that is, the state shown as "0 degree" of FIG. 7 (the state shown in FIG. 5) gradually moves in the axial direction of the spiral tooth 31b. Then, the engagement recessed part 32d is inclined with respect to the axial direction of the pinion gear 31, and accordingly the helical gear 32 is rotated at a speed lower than the rotation speed of the pinion gear 31. In this way, the helical gear 32 rotates with the rotation of the pinion gear 31.

Here, when focusing on only a part along the axial direction of the spiral tooth 31b (for example, a part along the line A-A in FIG. 4), the apex BP of the engagement projected part 31c is rotated in a counterclockwise direction along with the rotation of the pinion gear 31 in a counterclockwise direction in the state shown as "0 degree" in FIG. 7. Accordingly, the engagement projected part 31c rotates in the order of "75 degrees"→"133 degrees"→"190 degrees"→"227 degrees"→"266 degrees", and gets over one spiral tooth 32c. Subsequently, as shown in the state of "360 degrees" in FIG. 7, the engagement projected part 31c rotated once is engaged with the adjacent engagement recessed part 32d (see the moving state of the white circle in the diagram).

In this way, when the spiral tooth 31b is rotated once, the helical gear 32 is rotated by the amount of one of the helical teeth 32c (one of the engagement recessed parts 32d). That is, the helical gear 32 is rotated by 9 degrees while the pinion gear 31 is rotated once. In other words, when the pinion gear 31 is rotated 40 times, the helical gear 32 is gradually rotated once (=deceleration ratio "40"). Accordingly, the helical gear 32 is rotated with 40 times the rotational torque (high torque) of the pinion gear 31.

As described above in detail, according to the first embodiment, one engagement projected part 31c having a spiral shape is arranged on the pinion gear 31, and a plurality of engagement recessed parts 32d engaged with the engagement projected part 31c are arranged on the helical gear 32. The engagement projected part 31c and the engagement recessed part 32d are each formed in an arc shape in a direction orthogonal to the axial direction of the pinion gear 31.

Therefore, the pinion gear 31 and the helical gear 32 may be configured in an arc-shaped projected/recessed engagement structure that does not deteriorate the state of engagement therebetween. Also, by increasing the number of teeth on the helical gear 32 ("40" in the embodiment) while keeping the number of teeth on the pinion gear 31 at one tooth, the difference in the number of teeth can be easily increased. Therefore, the deceleration ratio of the deceleration mechanism 30 can be increased without increasing the size thereof.

In addition, according to the first embodiment, because the axis of the pinion gear 31 and the axis of the helical gear 32 are parallel to each other, the size can be made more compact than the worm reduction gear including a worm and a worm wheel the axes of which intersect each other.

Next, various embodiments according to the present invention are described in detail with reference to the drawings. The parts having the same functions as those in the first embodiment described above are designated by the same reference signs, and detailed description thereof is omitted.

Figure 8:
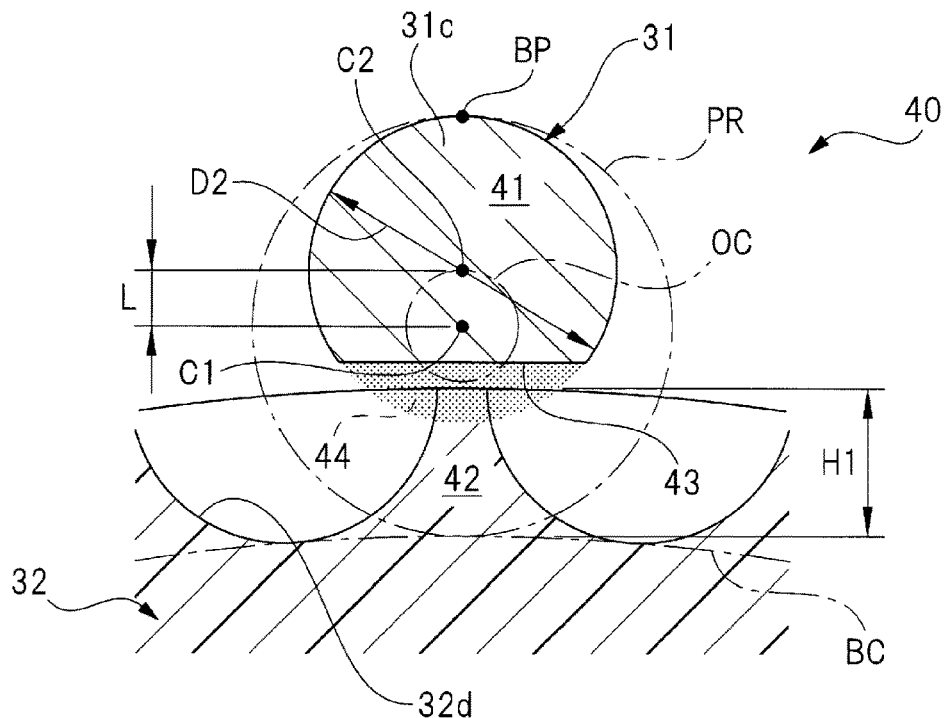
FIG. 8 is a diagram corresponding to FIG. 5, showing a second embodiment.
Figure 9:
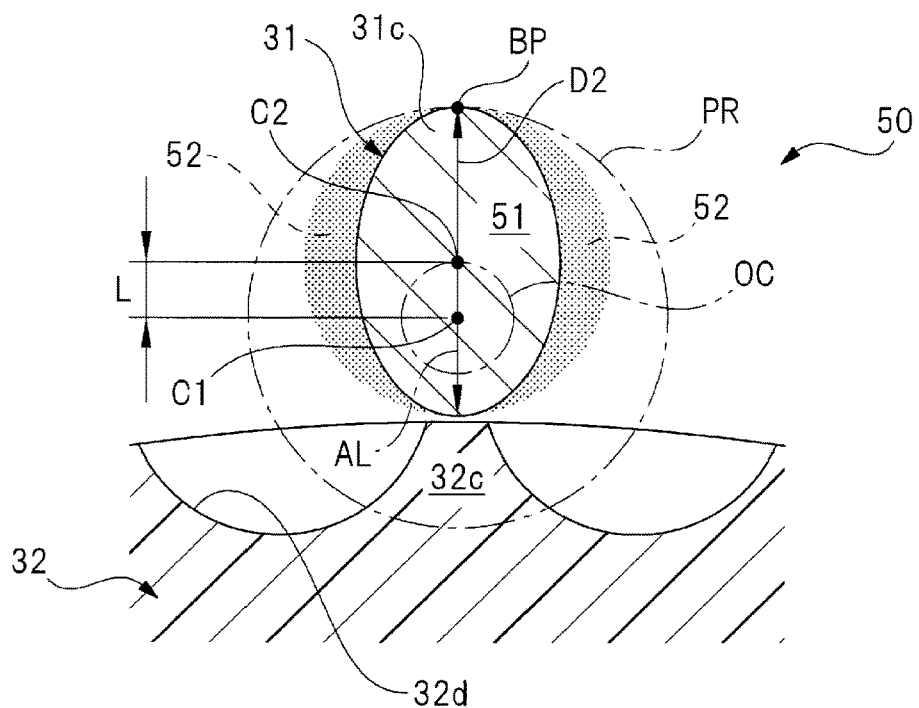
FIG. 9 is a diagram corresponding to FIG. 5, showing a third embodiment.
Figure 10:
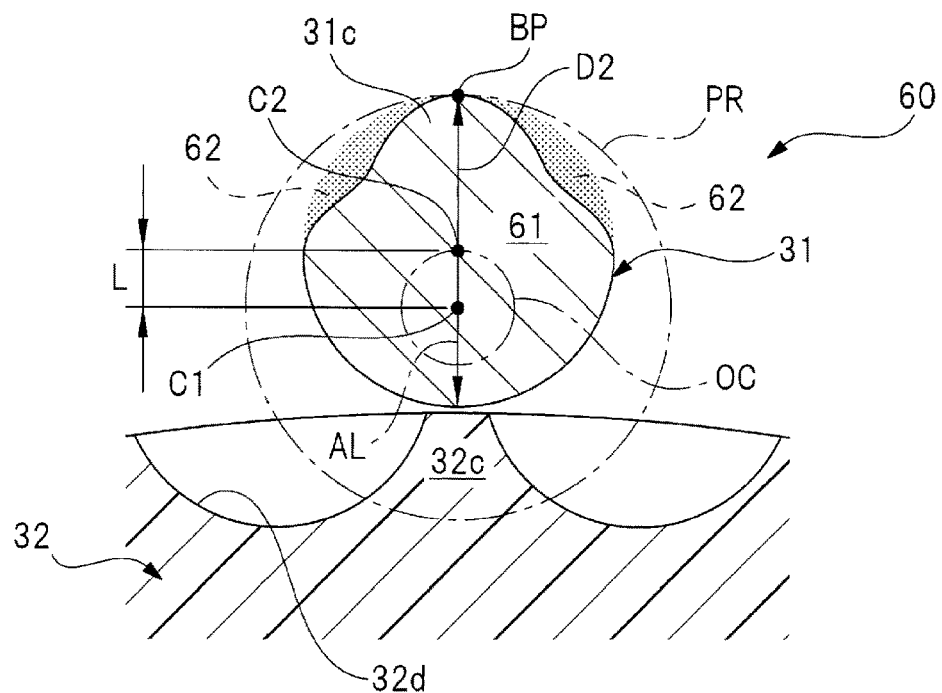
FIG. 10 is a diagram corresponding to FIG. 5, showing a fourth embodiment.
Figure 11:
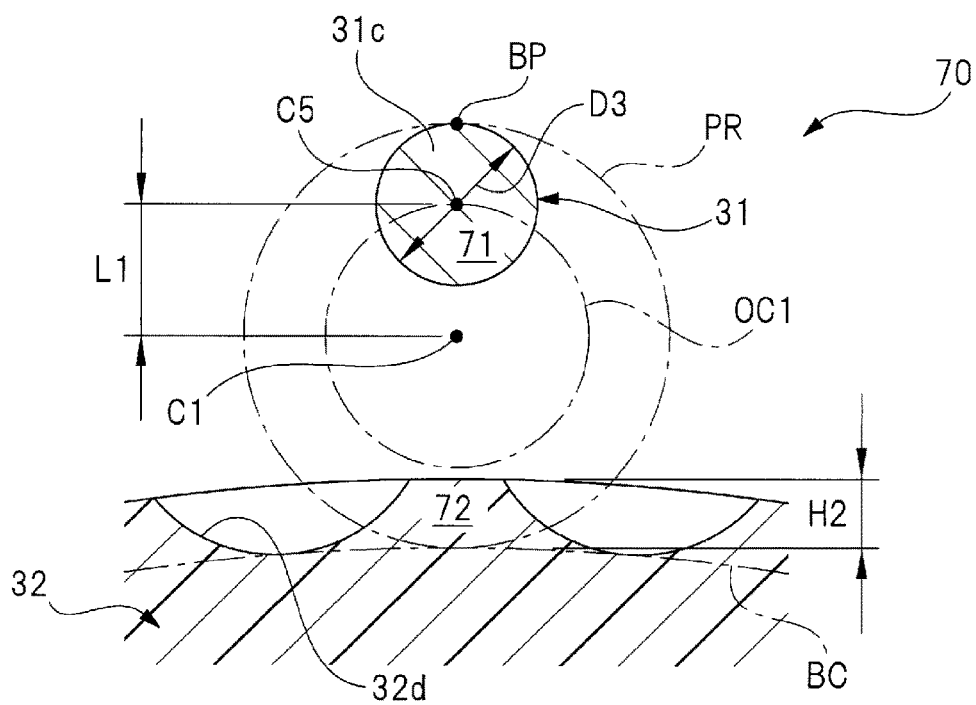
FIG. 11 is a diagram corresponding to FIG. 5, showing a fifth embodiment.
Figure 12:
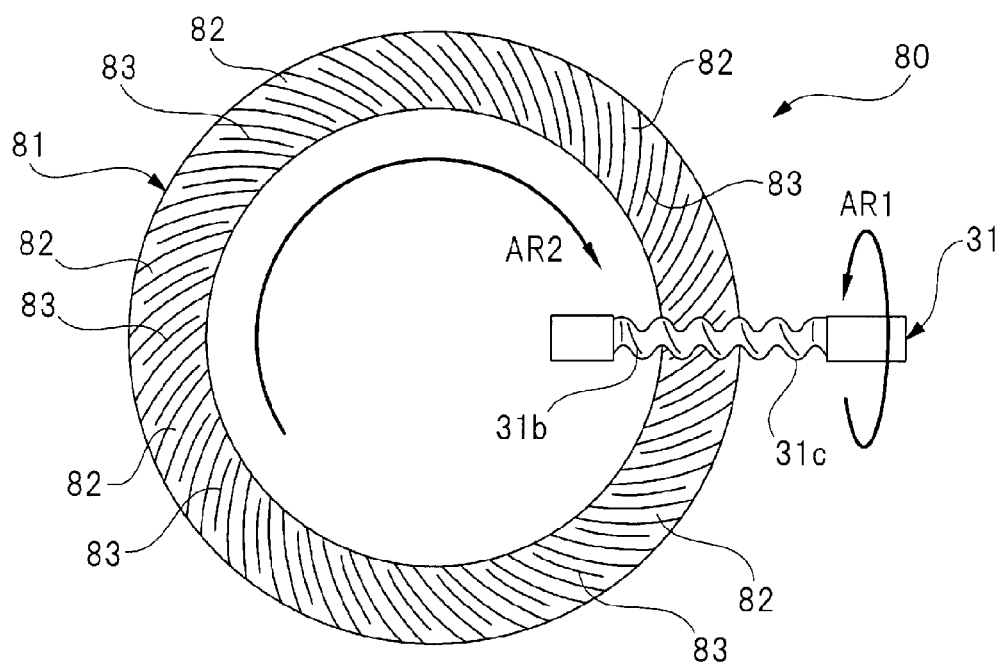
FIG. 12 is an explanatory diagram showing a sixth embodiment (a face gear).
Figure 13:
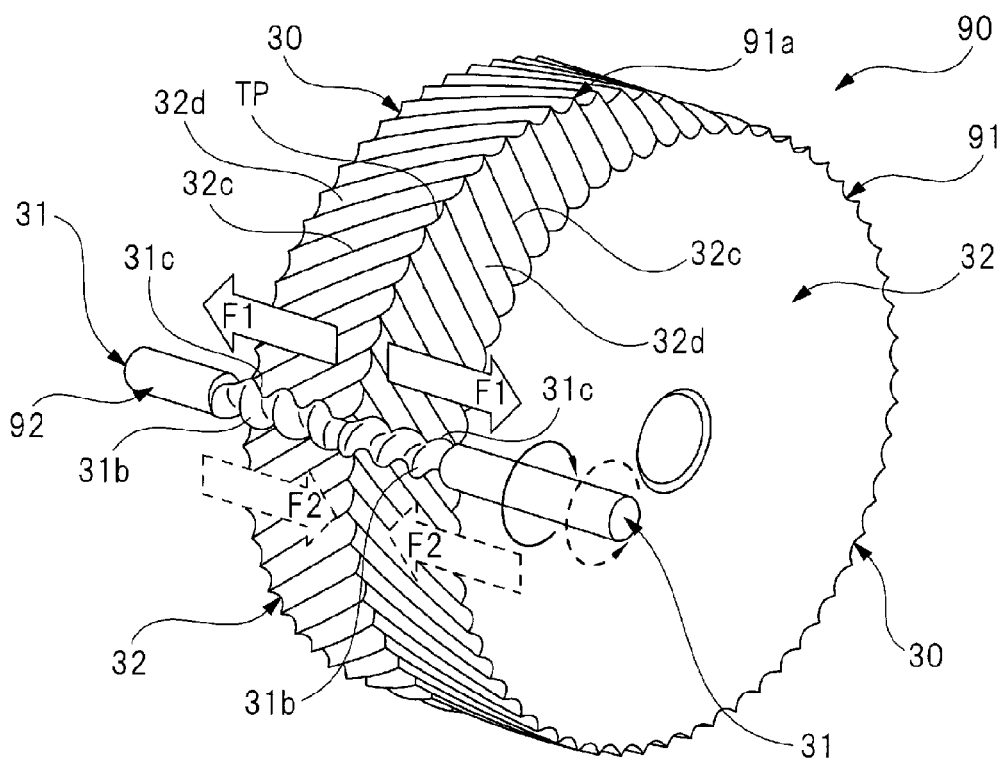
FIG. 13 is an explanatory diagram showing a seventh embodiment (a double helical gear).

FIG. 8 is a diagram corresponding to FIG. 5 and shows a second embodiment. FIG. 9 is a diagram corresponding to FIG. 5 and shows a third embodiment. FIG. 10 is a diagram corresponding to FIG. 5 and shows a fourth embodiment. FIG. 11 is a diagram corresponding to FIG. 5 and shows a fifth embodiment. FIG. 12 is an explanatory diagram showing a sixth embodiment (a face gear). FIG. 13 is an explanatory diagram showing a seventh embodiment (a double helical gear).

Second Embodiment

As shown in FIG. 8, in a deceleration mechanism 40 according to the second embodiment, the shape of the spiral tooth (the first tooth part) 41 arranged on the pinion gear 31 is different from the shape of the helical tooth 42 (the second tooth part) arranged on the helical gear 32. Specifically, a relief part 43 for preventing interference (contact) with the helical teeth 42 is arranged at the end part (the surface on the lower side in the diagram) opposite to the apex BP side with respect to the curvature center C2 of the engagement projected part 31c of the spiral tooth 41. The relief part 43 is formed by a flat surface arranged on the opposite side to the apex BP side with the curvature center C2 of the engagement projected part 31c as the center.

In addition, the tooth tips of the helical teeth 42 are extended to the inside of an arc-shaped space 44 (the meshed part in the diagram) formed by arranging the relief parts 43, and thereby the tooth tips of the helical teeth 42 are brought close to the relief part 43. Specifically, the tooth depth H1 of the helical teeth 42 is approximately 1.5 times the tooth depth H (see FIG. 6) of the helical teeth 32c of the first embodiment (H1>H).

In the second embodiment formed as described above, the same operational effect as in the first embodiment can also be obtained. In addition to this, in the second embodiment, the relief part 43 is arranged in the spiral tooth 41, thus the spiral tooth 41 can be made smaller and lighter. Besides, the tooth depth H1 of the helical teeth 42 can be set to a sufficient height, thereby improving the engaging strength between the engagement projected part 31c and the engagement recessed part 32d achieving power transmission with higher torque.

Third Embodiment

As shown in FIG. 9, in a deceleration mechanism 50 according to the third embodiment, only the shape of a spiral tooth (the first tooth part) 51 arranged on the pinion gear 31 is different. Specifically, the spiral tooth 51 is formed to have a substantially elliptic cross section along the direction orthogonal to the axial direction of the pinion gear 31. Specifically, a certain amount of both sides of the spiral tooth 51 are scraped off around an auxiliary line AL connecting the apex BP of the engagement projected part 31c and the rotation center C1 of the pinion gear 31. Specifically, a pair of arc-shaped spaces 52 (hatched parts) on both sides of the spiral tooth 51 centered on the auxiliary line AL are scraped off. At this time, the curvature center of the arc-shaped part having the apex BP of the engagement projected part 31c is scraped off so as to have the same C2 as in the first embodiment.

In the third embodiment formed as described above, the same operational effects as those of the first embodiment can also be obtained. In addition to this, in the third embodiment, compared with the spiral tooth 31b of the deceleration mechanism 30 according to the first embodiment, the size of the pair of arc-shaped spaces 52 can be reduced, thereby achieving miniaturization and weight reduction of the pinion gear 31.

Fourth Embodiment

As shown in FIG. 10, in a deceleration mechanism 60 according to the fourth embodiment, only the shape of a spiral tooth (the first tooth part) 61 arranged on the pinion gear 31 is different. Specifically, the spiral tooth 61 is formed to have a substantially fan-shaped (substantially triangular rice ball-shaped) cross section along the direction orthogonal to the axial direction of the pinion gear 31. Specifically, a predetermined amount of the parts on both sides of the spiral tooth 61 and near the apex BP are scraped off around the auxiliary line AL connecting the apex BP of the engagement projected part 31c and the rotation center C1 of the pinion gear 31. Specifically, a pair of arc-shaped spaces 62 (hatched parts) on both sides of the spiral tooth 61 centered on the auxiliary line AL and near the apex BP are scraped off respectively. At this time, the curvature center of the arc-shaped part having the apex BP of the engagement projected part 31c is scraped off so that the curvature center is the same C2 as in the first embodiment.

In the fourth embodiment formed as described above, the same operational effects as those of the first embodiment can also be obtained. In addition to this, in the fourth embodiment, compared with the spiral tooth 31b of the deceleration mechanism 30 according to the first embodiment, the size of the pair of arc-shaped spaces 62 can be reduced, thereby achieving miniaturization and weight reduction of the pinion gear 31. In addition, compared with the deceleration mechanism 50 according to the third embodiment, the part to be scraped off is small, thus eliminating the need for reducing the rigidity of the spiral tooth 61.

Moreover, the spiral tooth may not have a symmetrical shape on both sides around the auxiliary line AL as in the third and fourth embodiments, and may have an asymmetrical shape on both sides around the auxiliary line AL. In addition, the shape of the part to be scraped off is not limited to the arc shape as in the third and fourth embodiments, and may be a polygonal shape or the like, and the shape is not limited.

Fifth Embodiment

As shown in FIG. 11, in a deceleration mechanism 70 according to the fifth embodiment, the shape of a spiral tooth (the first tooth part) 71 arranged on the pinion gear 31 is different from the shape of a helical tooth (the second tooth part) 72 arranged on the helical gear 32. Specifically, the spiral tooth 71 is formed in a coil spring shape, and the rotation center C1 of the pinion gear 31 is not arranged within the range of the cross section of the spiral tooth 71 along the direction orthogonal to the axial direction of the pinion gear 31. Here, the diameter size D3 of the spiral tooth 71 is smaller than the diameter size D2 of the spiral tooth 31b of the first embodiment (D3<D2).

In addition, compared with the first embodiment, the curvature center C5 of the engagement projected part 31c is arranged at a position farther from the rotation center C1 of the pinion gear 31. Specifically, the distance between the curvature center C5 of the engagement projected part 31c and the rotation center C1 of the pinion gear 31 is set to L1, and the eccentricity L1 is approximately twice the eccentricity L of the first embodiment. Accordingly, the center C5 of the spiral tooth 71 (=the curvature center C5 of the engagement projected part 31c) follows a first rotation locus OC1 (see FIG. 5) having a diameter larger than that of the first rotation locus OC along with the rotation of the pinion gear 31.

Furthermore, because the center C5 of the spiral tooth 71 follows the first rotation locus OC1 having a large diameter, the tooth depth of the helical tooth 72 of the helical gear 32 is set to a low value such as H2. Specifically, the tooth depth H2 of the helical tooth 72 is approximately ⅔ the size of the tooth depth H (see FIG. 5) of the helical teeth 32c of the first embodiment (H2<H).

In the fifth embodiment formed as described above, the same operational effects as those of the first embodiment can also be obtained. In addition to this, in the fifth embodiment, the size of the spiral tooth 71 can be made smaller, thereby achieving miniaturization and weight reduction of the spiral tooth 71.

Sixth Embodiment

As shown in FIG. 12, in a deceleration mechanism 80 according to the sixth embodiment, the only difference is that the gear engaged with the pinion gear 31 is a face gear 81 instead of the helical gear 32 as shown in FIG. 3. That is, in the present embodiment, the face gear 81 constitutes the second gear in the present invention. Specifically, the axis of the face gear 81 is orthogonal to the axis of the pinion gear 31, thereby forming a so-called crossed gear mechanism.

The face gear 81 is formed in an annular shape, and is provided with, on its surface, a plurality of helical teeth (the second tooth part) 82 and a plurality of engagement recessed parts 83 arranged between adjacent helical teeth 82, as shown in FIG. 12. The plurality of helical teeth 82 and the plurality of engagement recessed parts 83 are inclined with respect to the axial direction of the pinion gear 31 and are arranged in the circumferential direction of the face gear 81.

Here, although not shown in detail, the engagement recess 83 is formed in an arc shape in a direction orthogonal to the axial direction of the pinion gear 31, and is formed in an arc shape like the engagement recess 32d (see FIG. 5) of the first embodiment. Accordingly, similar to the first embodiment, the engagement projected part 31c of the pinion gear 31 is engaged with the engagement recessed part 83 of the face gear 81.

Moreover, the high speed rotation of the pinion gear 31 in a direction of arrow AR1 in the diagram is the low speed rotation of the face gear 81 in a direction of arrow AR2 in the diagram. Then, a high torque rotating force is output from an output unit (not shown) arranged in the face gear 81 toward a driven object (not shown).

In the sixth embodiment formed as described above, the same operational effects as those of the first embodiment can also be obtained.

Seventh Embodiment

As shown in FIG. 13, in a deceleration mechanism 90 according to the seventh embodiment, a structure is adopted in which a pair of deceleration mechanisms 30 including the pinion gear 31 and the helical gear 32 are abutted so as to be mirror-symmetrical to each other with an abutting part TP as a boundary. That is, the pair of helical gears 32 abutted against each other is a double helical gear (second gear) 91 in the integrated state. The external appearance of a double helical teeth (second tooth part) 91a of the double helical gear 91 is formed in a substantially V shape by the helical teeth 32c facing each other so as to be mirror-symmetrical to each other. Therefore, the engagement recessed parts 32d facing each other are arranged between the adjacent double helical teeth 91a so as to have a substantially V-shaped appearance.

In addition, in the pair of pinion gears 31 abutted against each other, a double pinion gear (first gear) 92 is formed in an integrated state. The double pinion gear 92 is provided with a pair of spiral teeth 31b facing each other so as to be mirror-symmetrical to each other. That is, the spiral teeth 31b have opposite spiral directions. The engagement projected parts 31c of the spiral teeth 31b are engaged with the engagement recessed parts 32d between the adjacent double helical teeth 91a.

In the seventh embodiment formed as described above, the same operational effects as those of the first embodiment can also be obtained. In addition to this, in the seventh embodiment, because a structure in which a pair of deceleration mechanisms 30 are abutted so as to be mirror-symmetrical to each other, that is, a double helical gear structure is adopted, a thrust force that tends to move the double helical gear 91 or the double pinion gear 92 in the axial direction can be cancelled (eliminated), as shown by arrows F1 and F2 in FIG. 13.

That is, even if the double pinion gear 92 is rotated in the direction of the solid line arrow in the diagram or in the direction of the broken line arrow in the diagram, the double pinion gear 92 and the double helical gear 91 rotated by the double pinion gear 92 do not move in the axial direction. Therefore, the structure on the housing side for housing the double pinion gear 92 and the double helical gear 91 can be further simplified.

The present invention is not limited to the above embodiments, and numerous changes may be made without departing from the spirit of the invention. For example, in the third and fourth embodiments, although the vicinity of the engagement projected part 31c is scraped off so that the curvature center of the arc-shaped part having the apex BP of the engagement projected part 31c is the same C2 as in the first embodiment, the present invention is not limited thereto. For example, similar to the fifth embodiment (see FIG. 11), the vicinity of the engagement projected part 31c may be scraped off so that the curvature center of the arc-shaped part having the apex BP of the engagement projected part 31c is largely eccentric from the rotation center C1 of the pinion gear 31.

In addition, in each of the embodiments described above, although the deceleration mechanisms 30, 40, 50, 60, 70, 80, 90 (motor 10 having deceleration mechanism installed therein) are applied to a drive source of a wiper device mounted on a vehicle, the present invention is not limited thereto. The deceleration mechanisms 30, 40, 50, 60, 70, 80, 90 may also be applied to other drive sources of a power window device, a sunroof device, a seat lifter device, and the like.

Furthermore, in each of the embodiments described above, although the motor 10 having deceleration mechanism installed therein in which the deceleration mechanisms 30, 40, 50, 60, 70, 80, 90 are driven by the brushless motor 20 is shown, the present invention is not limited thereto, and a brushed motor may be used instead of the brushless motor 20 to drive the deceleration mechanisms 30, 40, 50, 60, 70, 80, 90.

Besides, the material, shape, size, number, installation location, and the like of each constituent component in each of the above-described embodiments are freely selected as long as the present invention may be achieved, and are not limited to the above-described embodiments.

Hereinafter, the eighth embodiment of the present invention is described in detail with reference to the drawings.

Figure 14:
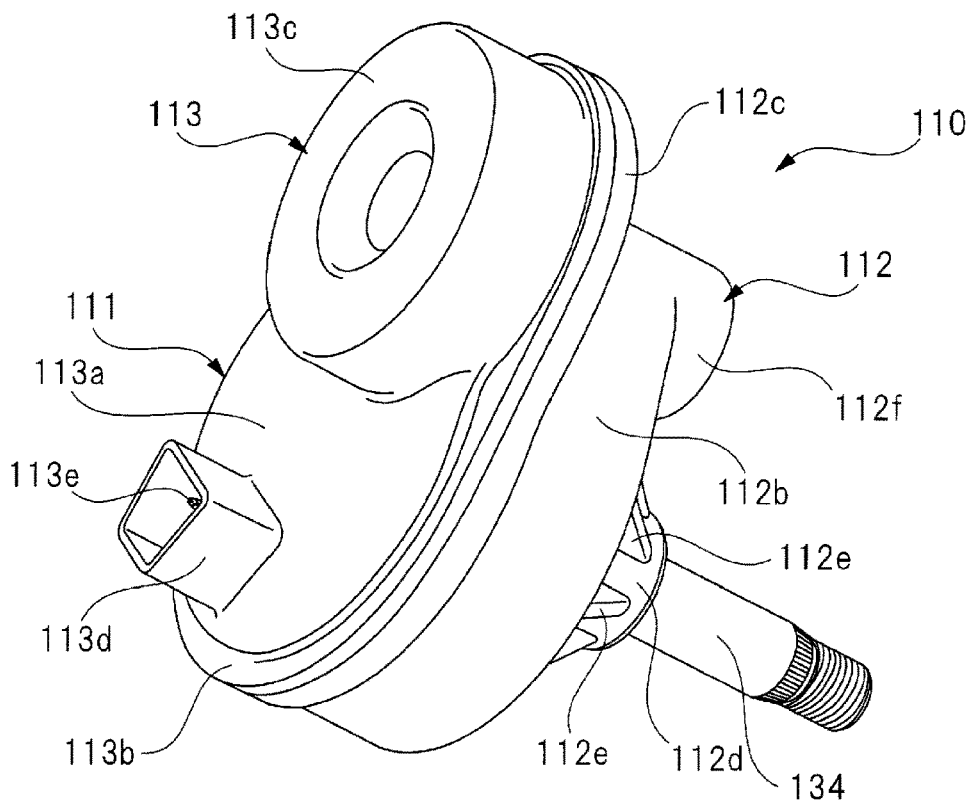
FIG. 14 is a perspective view of the motor having deceleration mechanism installed therein as viewed from the connector connection part side.
Figure 15:
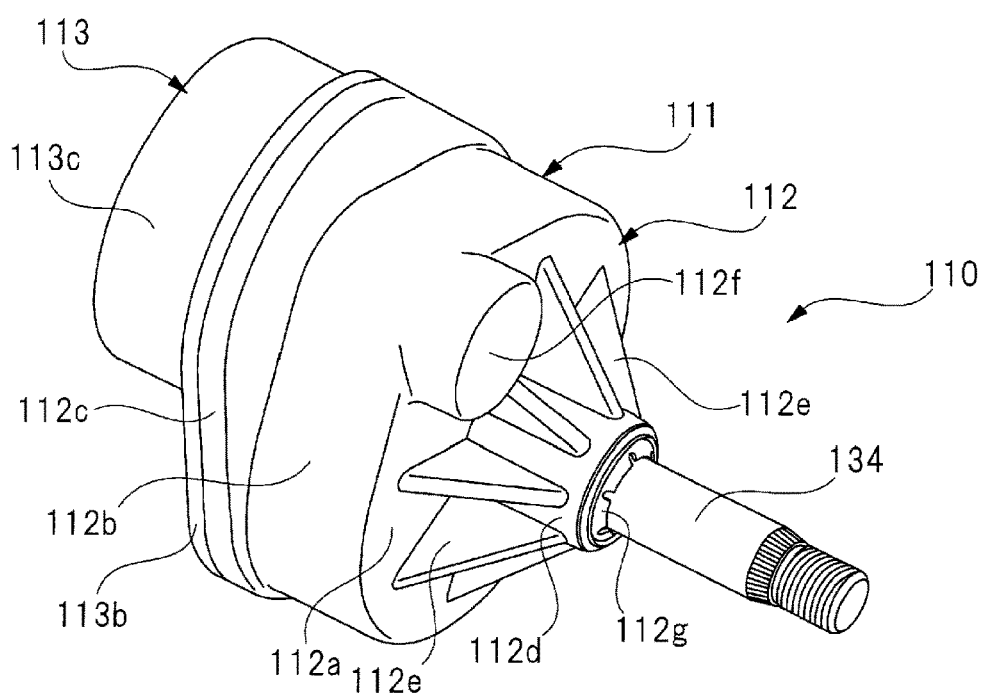
FIG. 15 is a perspective view of the motor having deceleration mechanism installed therein as viewed from the output shaft side.
Figure 16:
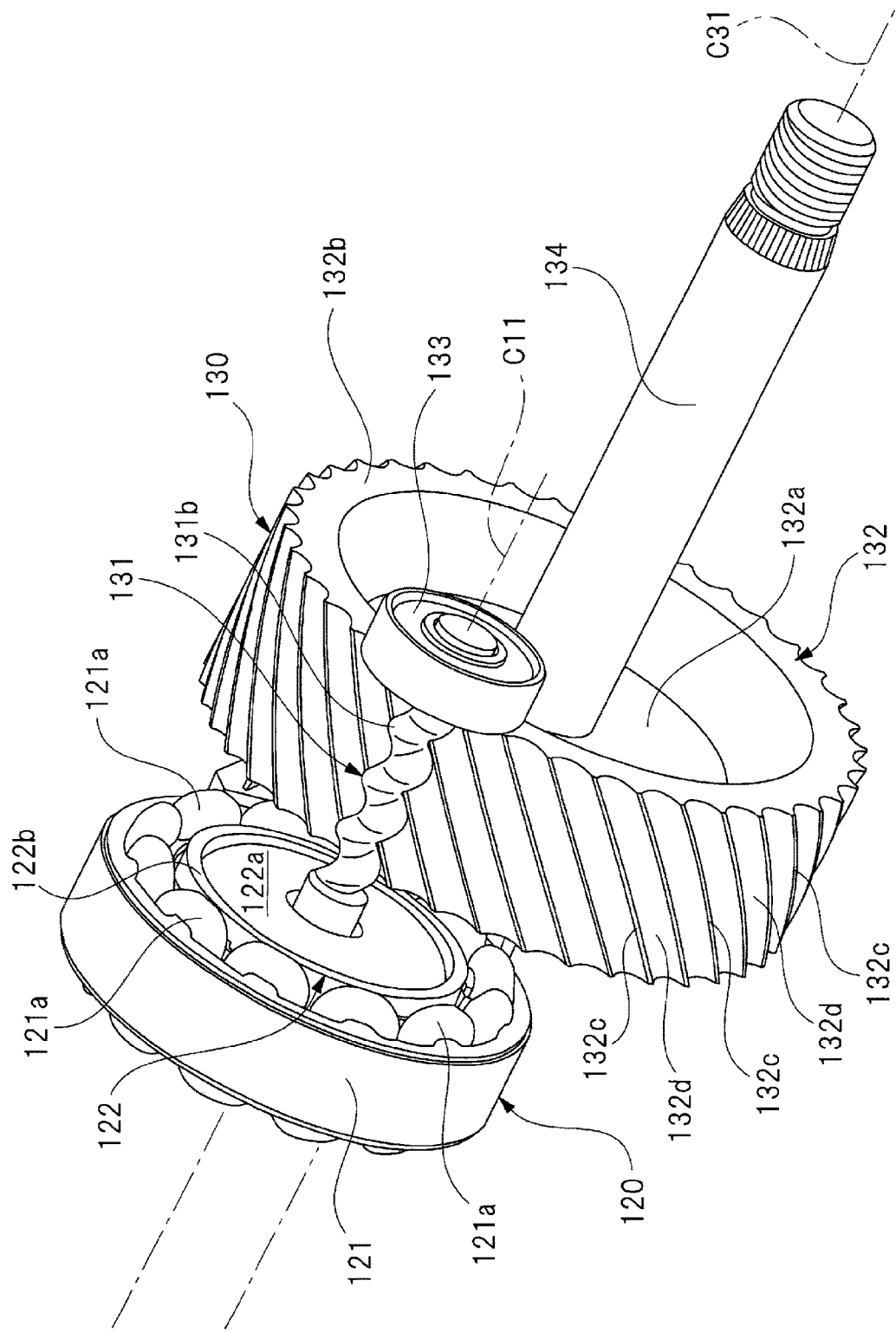
FIG. 16 is a perspective view showing an internal structure of the motor having deceleration mechanism installed therein.
Figure 17:
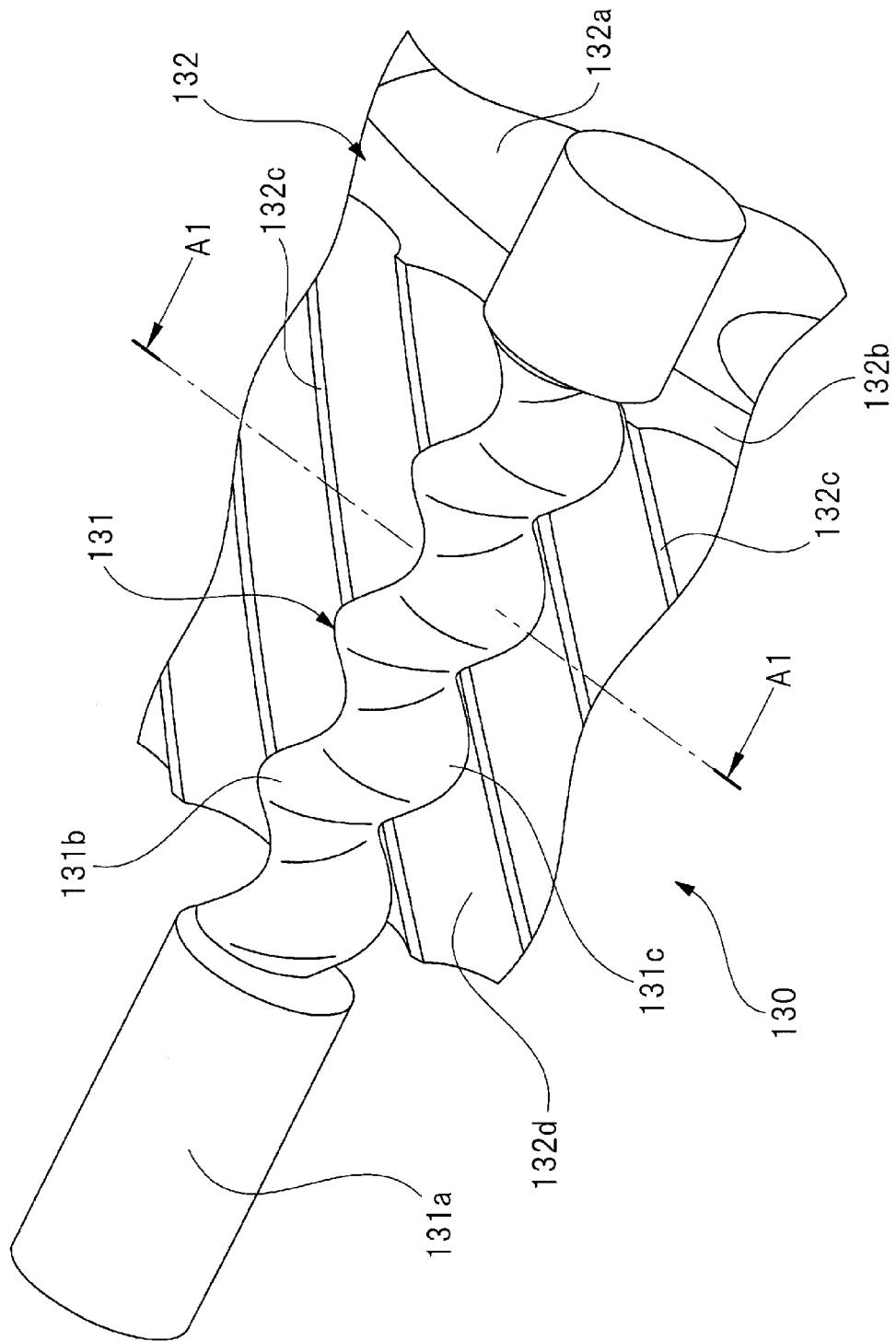
FIG. 17 is an enlarged perspective view of the engagement part of the pinion gear and the helical gear.
Figure 18:
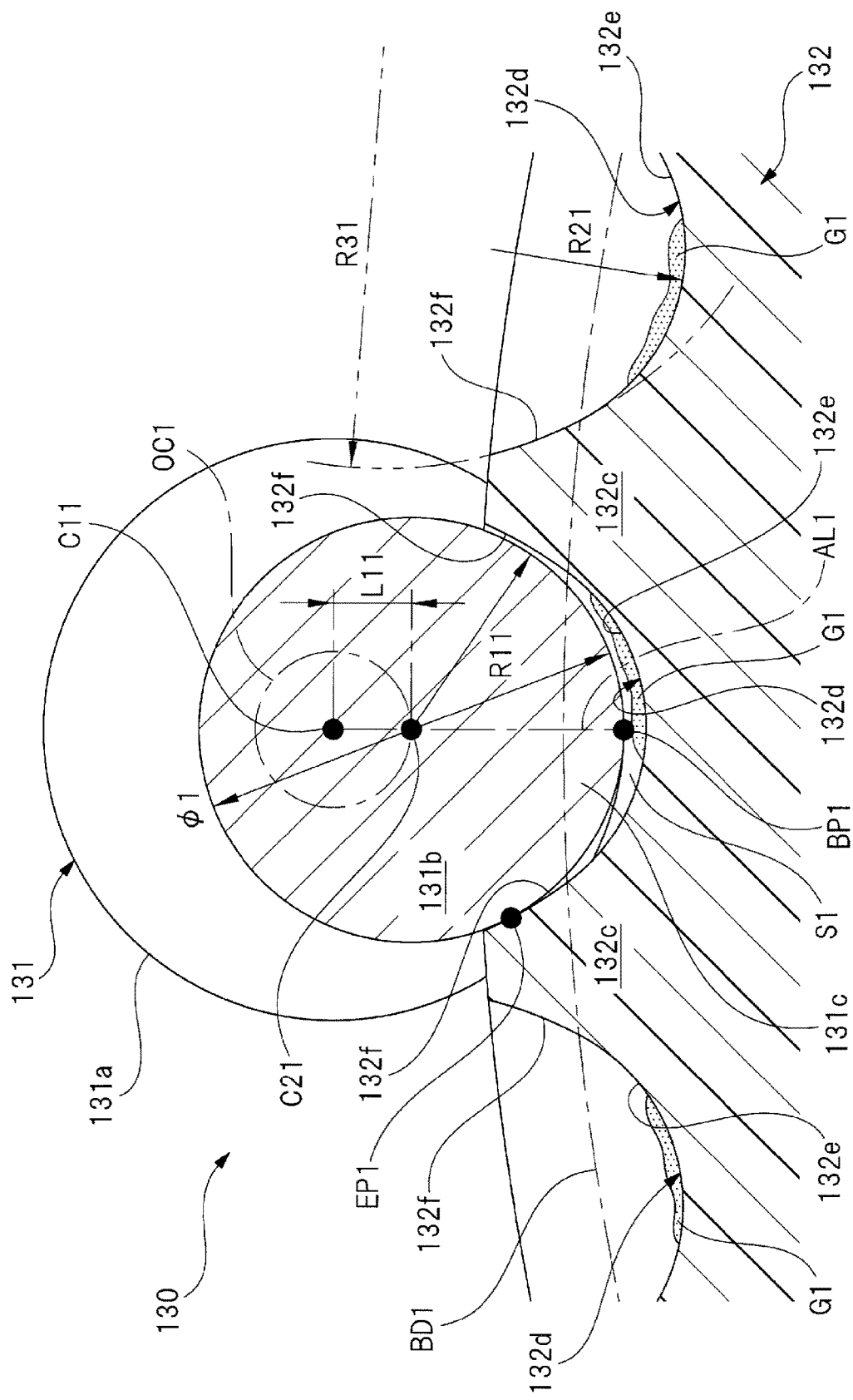
FIG. 18 is a cross-sectional view taken along the line A1-A1 of FIG. 17.
Figure 19:
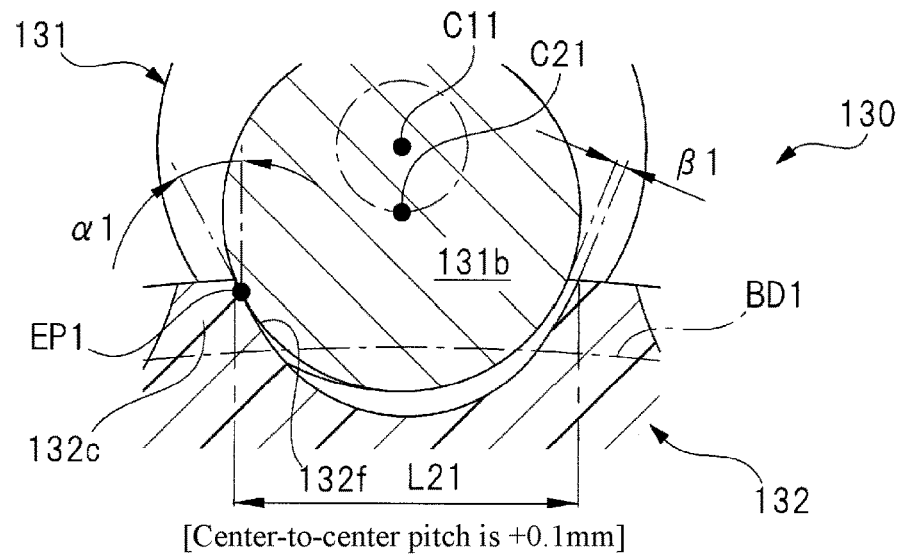
FIG. 19 is an explanatory diagram showing changes in deviation amount of a center-to-center pitch, a pressure angle, and backlash in an eighth embodiment.
Figure 19:
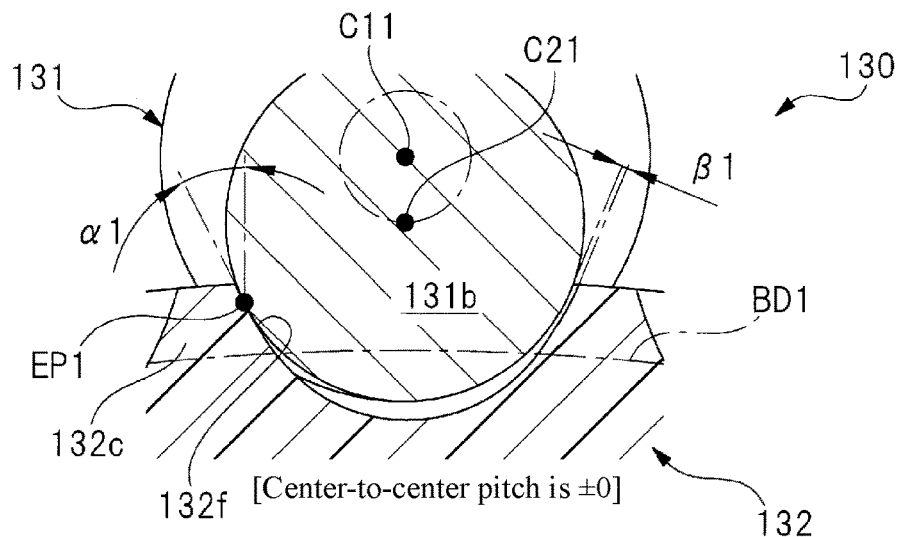
Figure 19:
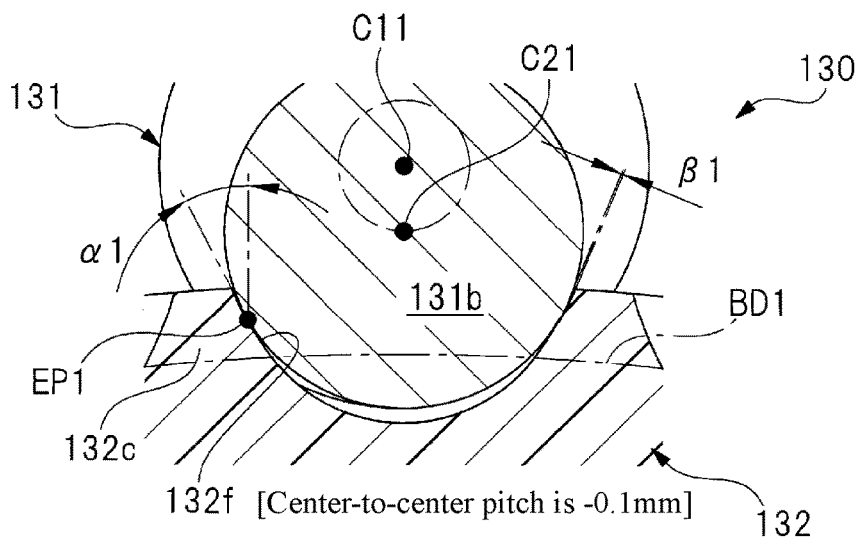
Figure 20:
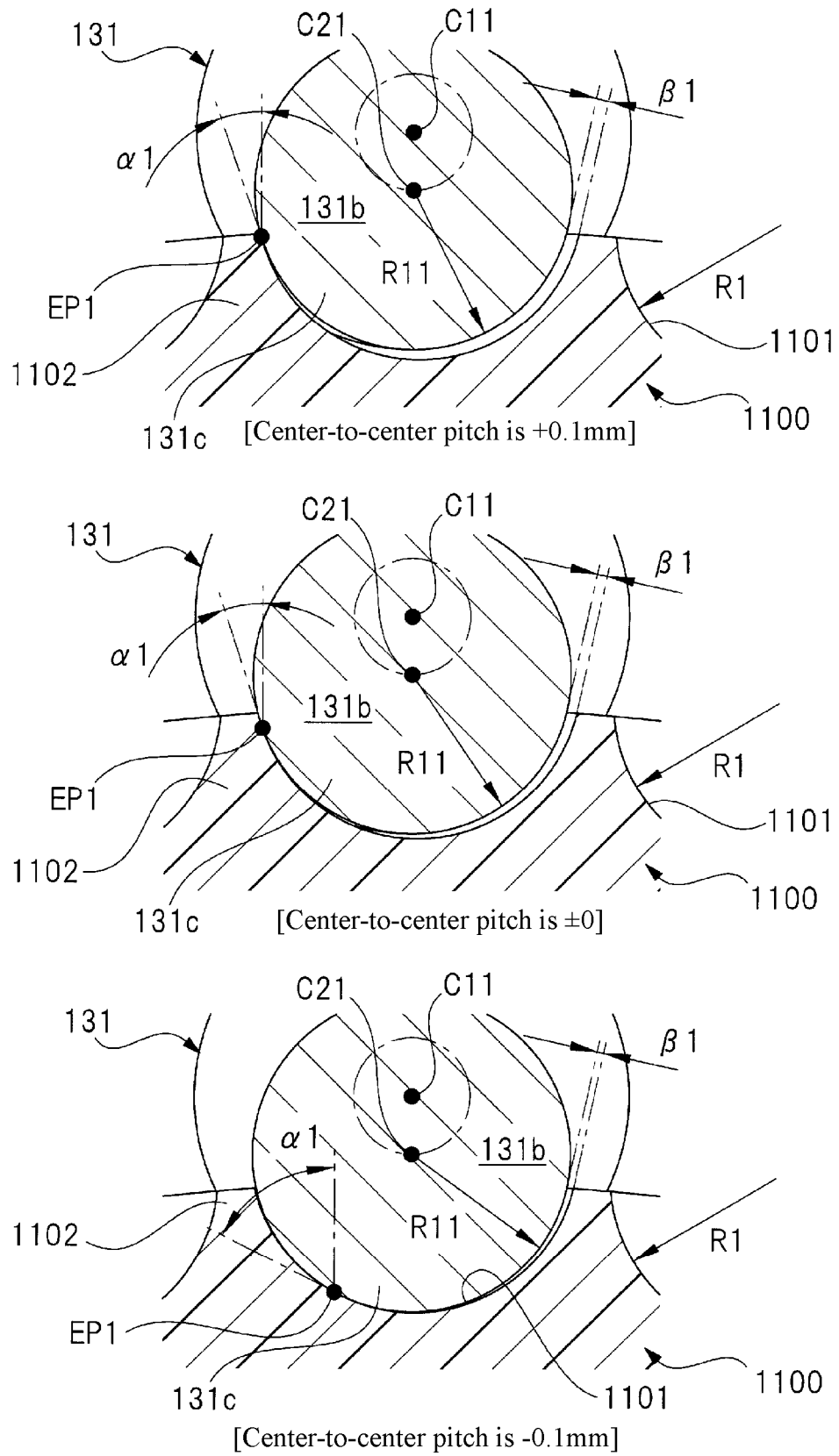
FIG. 20 is an explanatory diagram showing changes in deviation amount of a center-to-center pitch, a pressure angle, and backlash in a comparative example.
Figure 21:
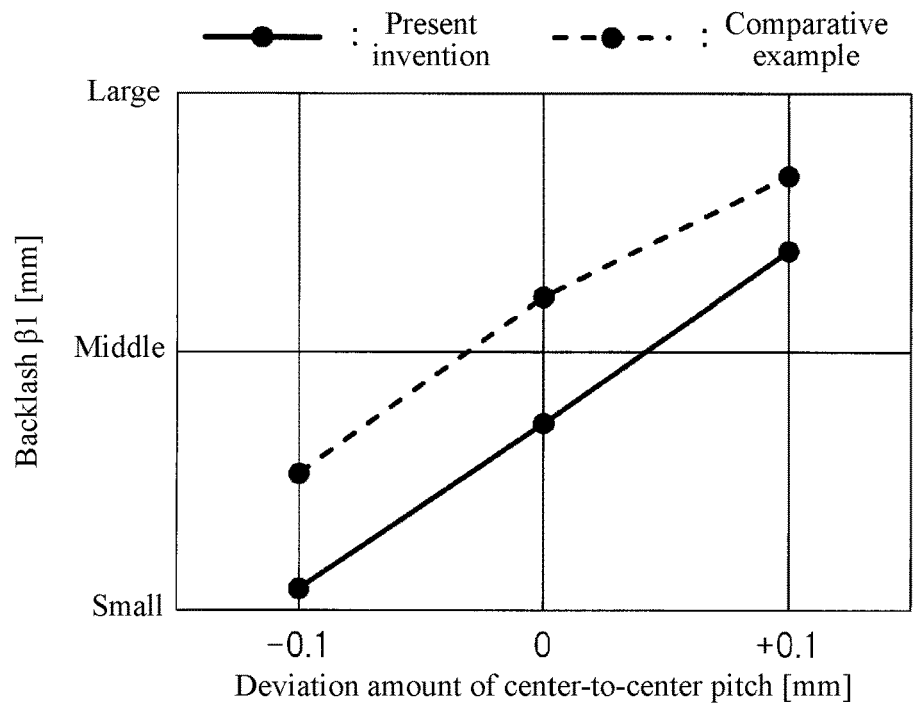
FIG. 21 is a graph that compares changes in the backlashes between the eighth embodiment and the comparative example.
Figure 22:
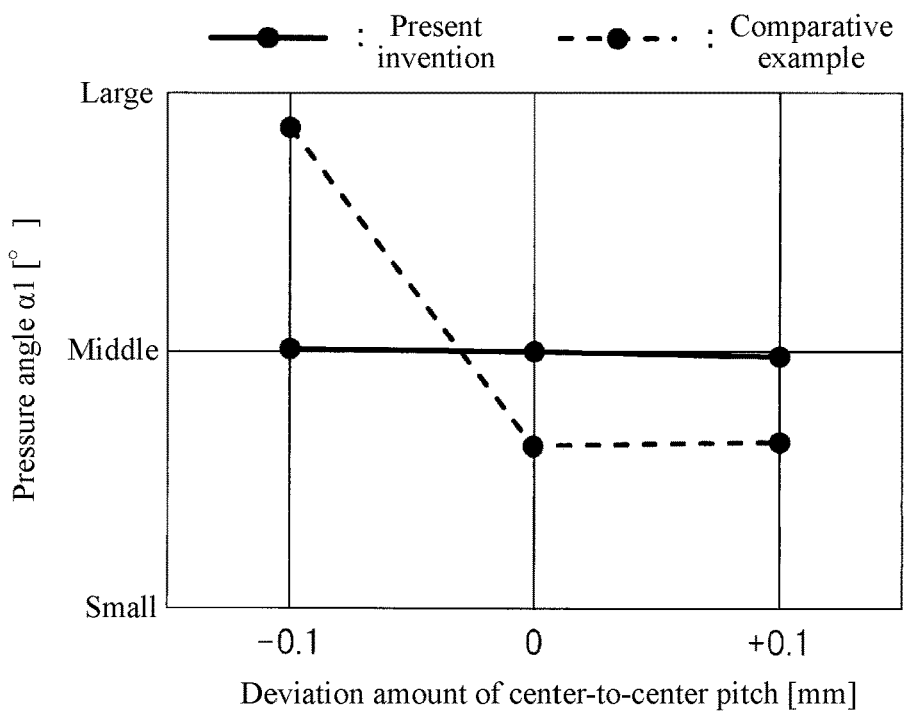
FIG. 22 is a graph that compares changes in the pressure angles between the eighth embodiment and the comparative example.

FIG. 14 is a perspective view of the motor having deceleration mechanism installed therein as viewed from the connector connection part side, FIG. 15 is a perspective view of the motor having deceleration mechanism installed therein as viewed from the output shaft side, FIG. 16 is a perspective view showing an internal structure of the motor having deceleration mechanism installed therein, FIG. 17 is an enlarged perspective view of the engagement part of the pinion gear and the helical gear, FIG. 18 is a sectional view taken along line A1-A1 of FIG. 17, FIG. 19 is an explanatory diagram showing changes in deviation amount of a center-to-center pitch, a pressure angle, and backlash in an eighth embodiment, FIG. 20 is an explanatory diagram showing changes in deviation amount of a center-to-center pitch, a pressure angle, and backlash in a comparative example, FIG. 21 is a graph that compares changes in the backlashes between the eighth embodiment and the comparative example, FIG. 22 is a graph that compares changes in the pressure angles between the eighth embodiment and the comparative example.

A motor 110 having deceleration mechanism installed therein shown in FIGS. 14 and 15 is used as a drive source of a wiper device (not shown) mounted on a vehicle such as an automobile. More specifically, the motor 110 having deceleration mechanism installed therein has a wiper member (not shown) swingably arranged on the front side of a windshield (not shown) and adapted to be swung within a predetermined wiping range (between the lower reversal position and the upper reversal position).

The motor 110 having deceleration mechanism installed therein includes a housing 111 that forms the outer shell thereof. Then, as shown in FIG. 16, a brushless motor 120 and a deceleration mechanism 130 are rotatably housed inside the housing 111. Here, the housing 111 is formed of a casing 112 made of aluminum and a cover member 113 made of plastic.

As shown in FIGS. 14 and 15, a casing 112 is formed in a substantially bowl shape by injection molding of a molten aluminum material. Specifically, the casing 112 includes a bottom wall part 112a, a side wall part 112b formed around the bottom wall part 112a in an integrated manner, and a case flange 112c arranged on the opening side (left side in the diagram) of the casing 112.

A cylindrical boss part 112d rotatably holding an output shaft 134 is arranged substantially at the center of the bottom wall part 112a in an integrated manner. A cylindrical bearing member (not shown), which is a so-called metal, is mounted on the radial inner side of the boss part 112d, thereby allowing the output shaft 134 to rotate smoothly without shaking in relation to the boss part 112d.

In addition, a plurality of reinforcing ribs 112e extending radially around the boss part 112d are arranged on the radial outer side of the boss part 112d in an integrated manner. These reinforcing ribs 112e are arranged between the boss part 112d and the bottom wall part 112a, and have a substantially triangular shape. These reinforcing ribs 112e are configured to enhance the fixing strength of the boss part 112d to the bottom wall part 112a and prevent the occurrence of defects such as the boss part 112d being inclined with respect to the bottom wall part 112a.

Furthermore, a bearing member housing part 112f is arranged at a position eccentric from the boss part 112d of the bottom wall part 112a in an integrated manner. The bearing member housing part 112f is formed in a cylindrical shape with a bottom, and protrudes in the same direction as the protruding direction of the boss part 112d. In addition, as shown in FIG. 16, a ball bearing 133 rotatably supporting the front end side of the pinion gear 131 is housed inside the bearing member housing part 112f.

Moreover, as shown in FIG. 15, a retaining ring 112g is arranged between the boss part 112d and the output shaft 134, thereby preventing the output shaft 134 from chattering in the axial direction of the boss part 112d. Consequently, the quietness of the motor 110 having deceleration mechanism installed therein is ensured.

The cover member 113 forming the housing 111 is formed in a substantially flat plate shape by injection molding of a molten plastic material. Specifically, the cover member 113 includes a main body 113a and a cover flange 113b arranged around the main body 113a in an integrated manner. Besides, the cover flange 113b is abutted against the case flange 112c via a seal member (not shown) such as an O-ring, thereby preventing rainwater and the like from entering the housing 111.

In addition, a motor housing part 113c for housing the brushless motor 120 (see FIG. 16) is arranged on the main body part 113a of the cover member 113 in an integrated manner. The motor housing part 113c is formed in a cylindrical shape with a bottom, and protrudes toward the side opposite to the casing 112 side. The motor housing part 13c faces the bearing member housing part 112f of the casing 112 with the cover member 113 mounted on the casing 112. In addition, a stator 121 (see FIG. 16) of the brushless motor 120 is fixed inside the motor housing part 113c.

Furthermore, a connector connection part 113d connected with an external connector (not shown) on the vehicle side is arranged on the main body part 113a of the cover member 113 in an integrated manner. One end sides of a plurality of terminal members 113e (only one is shown in FIG. 14) for supplying a drive current to the brushless motor 120 are exposed inside the connector connection part side 113d. In addition, a drive current is supplied to the brushless motor 120 from the external connector via these terminal members 113e.

Moreover, a control substrate (not shown) for controlling the rotation state (rotation speed, rotation direction, and the like) of the brushless motor 120 is arranged between the other end sides of the plurality of terminal members 113e and the brushless motor 120. Accordingly, the wiper member fixed to the front end side of the output shaft 134 is swung on the windshield within a predetermined wiping range. Moreover, the control substrate is fixed inside the main body 113a of the cover member 113.

As shown in FIG. 16, the brushless motor 120 housed inside the housing 111 includes an annular stator (stationary member) 121. The stator 121 is fixed inside the motor housing part 113c (see FIG. 14) of the cover member 113 in a rotation-stopped state.

The stator 121 is formed by stacking a plurality of thin steel plates (magnetic bodies), and a plurality of teeth (not shown) are arranged on the radial inner side thereof. U-phase, V-phase, and W-phase coils 121a are wound around these teeth in multiple turns by concentrated winding or the like. Accordingly, by alternately supplying a drive current to each coil 121a at a predetermined timing, the rotor 122 arranged on the radial inner side of the stator 121 is rotated with a predetermined drive torque in a predetermined rotation direction.

A rotor (rotary member) 122 is rotatably arranged on the radial inner side of the stator 121 via a minute gap (air gap). The rotor 122 includes a rotor body 122a formed by stacking a plurality of thin steel plates (magnetic bodies) into a substantially columnar shape, and a cylindrical permanent magnet 122b is arranged on the outer peripheral part thereof. Here, the permanent magnet 122b is magnetized so that magnetic poles are arranged alternately with N poles, S pole in this order in the circumferential direction. In addition, the permanent magnet 122b is firmly fixed to the rotor body 122a in an integrally rotating manner by an adhesive or the like.

As described above, the brushless motor 120 according to the present embodiment is a brushless motor having a surface permanent magnet (SPM) structure in which the permanent magnet 122b is fixed to the surface of the rotor body 122a. However, the brushless motor is not limited to the SPM structure, and a brushless motor having an interior permanent magnet (IPM) structure in which a plurality of permanent magnets are embedded in the rotor body 122a may also be used.

In addition, instead of one permanent magnet 122b formed in a cylindrical shape, a plurality of permanent magnets having a substantially arc shaped cross section along the direction intersecting with the axis of the rotor body 122a may be arranged at equal intervals so that the magnetic poles are arranged alternately in the circumferential direction. Furthermore, the number of poles of the permanent magnet 122b may be arbitrarily set to, for example, 2 poles or 4 poles or more, depending on the specifications of the brushless motor 120.

As shown in FIG. 16, the deceleration mechanism 130 housed in the housing 111 includes a pinion gear (first gear) 131 formed in a substantially rod shape and a helical gear (second gear) 132 formed in a substantially disc shape.

Here, the axis of the pinion gear 131 and the axis of the helical gear 132 are parallel to each other. Accordingly, the deceleration mechanism 130 can be made more compact in size than a worm reduction gear including a worm and a worm wheel whose axes intersect each other.

In addition, the pinion gear 131 is arranged on the input side (drive source side) of the motor 110 having deceleration mechanism installed therein, and the helical gear 132 is arranged on the output side (driving target side) of the motor 110 having deceleration mechanism installed therein. That is, the deceleration mechanism 130 reduces the high speed of rotation of the pinion gear 131 having a small number of teeth to the low speed of rotation of the helical gear 132 having a large number of teeth.

Here, the base end side of the pinion gear 131 is firmly fixed to the rotation center of the rotor body 122a by press fitting or the like, so that the pinion gear 131 is integrally rotated with the rotor body 122a. That is, the pinion gear 131 also functions as a drive shaft of the motor 110 having deceleration mechanism installed therein, and drives the pinion gear 131 to rotate. That is, the pinion gear 131 constitutes the rotary shaft in the present invention.

In addition, the front end side of the pinion gear 131 is rotatably supported by the ball bearing 133. Furthermore, the base end side of the output shaft 134 is firmly fixed to the rotation center of the helical gear 132 by press fitting or the like, so that the output shaft 134 is integrally rotated with the helical gear 132.

The pinion gear 131 that forms the deceleration mechanism 130 is made of metal and has a shape as shown in FIGS. 16 to 19. Specifically, the pinion gear 131 has a pinion body 131a formed in a substantially columnar shape, the axial base end side is fixed to the rotor body 122a, and the axial front end side is rotatably supported by the ball bearing 133. That is, the rotation center C11 of the pinion gear 131 (the pinion body 131a) coincides with the rotation centers of the rotor body 122a and the ball bearing 133.

A spiral tooth 131b is arranged at a part facing the helical gear 132 along the axial direction of the pinion body 131a in an integrated manner. Specifically, the axial length of the spiral tooth 131b is set to be slightly longer than the axial length of the helical gear 132. Accordingly, the spiral tooth 131b may be surely engaged with the helical gear 132.

The spiral tooth 131b continuously extends in a spiral manner in the axial direction of the pinion gear 131, and the pinion gear 131 is provided with only one spiral tooth 131b. That is, the number of teeth of the pinion gear 131 is set to "1".

As shown in FIG. 18, the spiral tooth 131b is formed to have a circular cross section along the direction orthogonal to the axial direction of the pinion gear 131, and the diameter size thereof is ø1. Specifically, in the present embodiment, ø1 is set to 5.45 mm.

The center C21 of the spiral tooth 131b is eccentric (offset) with respect to the rotation center C11 of the pinion gear 131 by a predetermined distance L11. Accordingly, the center C21 of the spiral tooth 131b follows the locus OC1 along with the rotation of the pinion gear 131. In other words, the locus OC1 forms a reference circle of the spiral tooth 131b.

In addition, as shown in FIG. 18, an auxiliary line AL1 is drawn from the rotation center C11 of the pinion gear 131 toward the center C21 of the spiral tooth 131b (downward in the diagram). When the auxiliary line AL1 is further extended to the surface of the spiral tooth 131b, the auxiliary line AL1 intersects with the surface of the spiral tooth 131b. This intersection point is an apex BP1 of the engagement projected part 131c.

Here, the engagement projected part 131c is an engagement part that forms a part of the spiral tooth 131b, and the engagement projected part 131c also extends spirally in the axial direction of the pinion gear 131. The engagement projected part 131c is engaged with the engagement recessed part 132d between adjacent helical teeth 132c of the helical gear 132.

The engagement projected part 131c forms a part of the spiral tooth 131b, and is formed in an arc shape along the rotation direction of the pinion gear 131. Accordingly, the radius of curvature R11 of the engagement projected part 131c is ø1/2 (≈2.72 mm).

In this way, the engagement projected part 131c is arranged at a part near the apex BP1 of the spiral tooth 131b, and the curvature center thereof coincides with the center C21 of the spiral tooth 131b. Here, the radius of curvature R11 of the engagement projected part 131c constitutes a first radius of curvature in the present invention.

The apex BP1 of the engagement projected part 131c follows a line that forms the surface of the pinion body 131a shown in FIG. 18 along with the rotation of the pinion gear 131. Accordingly, the engagement projected parts 131c along the axial direction of the pinion gear 131 are successively engaged with the engagement recessed parts 132d one after another, and the helical gear 132 is rotated in a decelerated state.

Moreover, FIG. 18 shows a state in which the engagement projected part 131c is engaged with the engagement recessed part 132d.

The helical gear 132 forming the deceleration mechanism 130 is made of plastic and has a shape as shown in FIGS. 16 to 19. Specifically, the helical gear 132 includes a gear body 132a formed in a substantially disc shape, and the base end side of the output shaft 134 is firmly fixed to the center part of the gear body 132a by press fitting or the like. In addition, a cylindrical part 132b extending in the axial direction of the output shaft 134 is arranged on the outer peripheral part of the gear body 132a in an integrated manner.

A plurality of helical teeth 132c are arranged on the radial outer side of the cylindrical part 132b in an integrated manner so as to be aligned in the circumferential direction of the cylindrical part 132b. These helical teeth 132c are inclined with respect to the axial direction of the pinion gear 131 at a predetermined angle so that the helical gear 132 rotates with the rotation of the spiral tooth 131b.

Here, the number of the helical teeth 132c arranged on the helical gear 132 is set to "40". That is, in the present embodiment, the deceleration ratio of the deceleration mechanism 130 including the pinion gear 131 and the helical gear 132 is "40".

As shown in FIG. 18, an engagement recessed part 132d is arranged between adjacent helical teeth 132c. Therefore, similar to the helical teeth 132c, the engagement recessed part 132d is also inclined with respect to the axial direction of the pinion gear 131 at a predetermined angle. The engagement projected part 131c of the pinion gear 131 is engaged with the engagement recessed part 132d.

The engagement recessed part 132d is formed in a substantially arc shape along the rotation direction of the helical gear 132. An arc-shaped bottom (bottom) 132e is formed at the center of the engagement recessed part 132d along the rotation direction of the helical gear 132. The arc-shaped bottom 132e forms the deepest part of the engagement recessed parted part 132d, and in the state of engagement of the engagement projected part 131c and the engagement recessed part 132d, a predetermined gap S1 is formed between the apex BP1 part of the engagement projected part 131c and the arc-shaped bottom 132e of the engagement recessed part 132d.

Lubricating oil G1 (hatched part in the diagram) for smoothing the operation of the deceleration mechanism 130 is accommodated in the gap S1. That is, the gap S1 functions as a lubricating oil holding part for holding the lubricating oil G1. Moreover, the lubricating oil G1 is not shown in FIG. 19 and is shown only in FIG. 18.

Here, a radius of curvature R21 of the arc-shaped bottom 132e is set to a value smaller than the radius of curvature R11 of the engagement projected part 131c (R21<R11). Specifically, in the present embodiment, the radius of curvature R21 is set to 2.5 mm. Accordingly, even if the apex BP1 of the engagement projected part 131c bottoms out on the arc-shaped bottom 132e of the engagement recessed part 132d, the lubricating oil G1 held in the gap S1 is not pushed out and exhausted. Therefore, the smooth operation of the deceleration mechanism 130 is maintained for a long period of time.

In addition, the engagement recessed part 132d includes a pair of arc-shaped side wall parts (side wall parts) 132f. These arc-shaped side wall parts 132f are arranged on both sides of the arc-shaped bottom 132e along the rotation direction of the helical gear 132, and are smoothly connected to both sides of the arc-shaped bottom 132e. That is, no step or the like is formed between the arc-shaped bottom 132e and the pair of arc-shaped side wall parts 132f. Accordingly, even if an engaging point EP1 between the engagement projected part 131c and the engagement recessed part 132d moves back and forth between the arc-shaped bottom 132e and the arc-shaped side wall part 132f, the smooth operation of the deceleration mechanism 130 is not hindered.

Here, the separation distance between the pair of arc-shaped side wall parts 132f, that is, the groove width of the engagement recessed part 132d is set to L21 as shown in the upper part of FIG. 19. The separation distance L21 is set to be slightly smaller than the diameter size ø1 of the spiral tooth 131b (L21<ø1).

Furthermore, the pair of arc-shaped side wall parts 132f are formed with a predetermined radius of curvature so as to be recessed toward the radial outer side of the engagement recessed part 132d. That is, these arc-shaped side wall parts 132f are arc-shaped recesses. The radius of curvature R31 (see FIG. 18) of the arc-shaped side wall part 132f is set to be twice the radius of curvature R11 of the engagement projected part 131c (R31=2×R11). Specifically, in the present embodiment, the radius of curvature R31 is set to 5.45 mm. Here, the radius of curvature R31 of the arc-shaped side wall part 132f constitutes the second radius of curvature in the present invention.

Moreover, in the present embodiment, the arc-shaped side wall part 132f is formed with the radius of curvature R31 so as to be recessed toward the radial outer side of the engagement recessed part 132d, and thus compared with the reverse arc-shaped side wall parts 151 (see FIG. 24) of the tenth embodiment described later, it has an advantage that the engagement projected part 131c is difficult to be detached from the engagement recessed part 132d.

Summarizing each radius of curvature R11 to R31, the radius of curvature R11 of the engagement projected part 131c is 2.72 (=5.45÷2) mm, the radius of curvature R21 of the arc-shaped bottom 132e is 2.5 mm, and the radius of curvature R31 of the arc-shaped side wall part 132f is 5.45 mm (R31>R11>R21).

Then, in the present embodiment, the engaging condition of the pinion gear 131 and the helical gear 132 is set as follows according to the above dimensional relationship. That is, in a state in which the engagement projected part 131c is engaged with the engagement recess 132d deepest (the state shown in FIG. 18), the gap S1 for holding the lubricating oil G1 is formed between the apex BP1 of the engagement projected part 131c and the arc-shaped bottom 132e of the engagement recessed part 132d, and the engaging point EP1 between the engagement projected part 131c and the engagement recessed part 132d is located on the arc-shaped side wall parts 132f.

Here, in FIGS. 18 and 19, a boundary line BD1 (dashed line) is given to the boundary part to make it easy to understand the boundary part between the arc-shaped bottom 132e and the pair of arc-shaped side wall parts 132f.

Next, in the deceleration mechanism 130 formed as described above, changes in backlash β1 and pressure angle α1 accompanied by the displacement of the engaging point EP1 when the distance (center-to-center pitch) between the rotation center C11 of the pinion gear 131 and the rotation center C31 of the helical gear 132 (see FIG. 16) is varied is described in detail with reference to the drawings.

Here, FIG. 20 shows a comparative example substantially similar to the previous art, the pinion gear 131 uses the same one as in the present invention, and one having an engagement recessed part 1101 formed in an arc shape having a constant radius of curvature R1 is used as a helical gear 1100. Moreover, the radius of curvature R11 of the engagement projected part 131*c* and the radius of curvature R1 of the engagement recessed part 1101 are substantially the same size (R11≈R1).

[Center-to-Center Pitch is ±0]

As shown in the middle part of FIG. 19, when the deviation amount of the center-to-center pitch is 0 mm, the engaging point EP1 in the present invention is arranged at a part slightly closer to the tooth tip of the spiral tooth 132*c* than the center of the arc-shaped side wall part 132*f*. On the other hand, as shown in the middle part of FIG. 20, the engaging point EP1 in the comparative example is also arranged at a part near the tooth tip of a helical tooth 1102.

At this time, as shown in FIG. 21, the backlash β1 indicates a value smaller than the medium value in the present invention (solid line), and indicates a larger value (greater than the medium value) than that of the present invention in the comparative example (broken line). In addition, as shown in FIG. 22, the pressure angle α1 indicates a medium value in the present invention (solid line), and indicates a smaller value than that of the present invention in the comparative example (broken line).

[Center-to-Center Pitch is −0.1 mm]

As shown in the lower part of FIG. 19, when the deviation amount of the center-to-center pitch is 0.1 mm on the negative side, the engaging point EP1 in the present invention is arranged substantially at the center of the arc-shaped side wall part 132*f*. On the other hand, as shown in the lower part of FIG. 20, the engaging point EP1 in the comparative example is largely displaced and is arranged closer to the deepest part of the engagement recessed part 1101.

At this time, as shown in FIG. 21, the backlash β1 indicates a small value in the present invention (solid line), and indicates a larger value than that of the present invention in the comparative example (broken line). In addition, as shown in FIG. 22, the pressure angle α1 indicates a medium value as in the case of [Center-to-center pitch is ±0] in the present invention (solid line), and indicates a value significantly larger than that of the present invention (about twice the size) in the comparative example (broken line).

[Center-to-Center Pitch is +0.1 mm]

As shown in the upper part of FIG. 19, when the deviation amount of the center-to-center pitch is 0.1 mm on the plus side, the engaging point EP1 in the present invention is located closer to the tooth tip of the helical tooth 132*c* than if the deviation amount of the center-to-center pitch is 0 mm. On the other hand, as shown in the upper part of FIG. 20, the engaging point EP1 in the comparative example is arranged at the tooth tip of the helical tooth 1102.

At this time, as shown in FIG. 21, the backlash β1 indicates a value larger than the medium value in the present invention (solid line), and indicates a larger value than that of the present invention in the comparative example (broken line). In addition, as shown in FIG. 22, the pressure angle α1 indicates a medium value as in the case of [Center-to-center pitch is ±0] in the present invention (solid line), and indicates a smaller value than that of the present invention in the comparative example (broken line).

Thus, when the center-to-center pitch between the pinion gear 131 and the helical gear 132 is varied, it has been found that in the deceleration mechanism 130 of the present invention, the backlash β1 changes on the small value side compared to the deceleration mechanism in the comparative example that is substantially similar to the previous art (see FIG. 21).

In addition, it has been found that in the deceleration mechanism in the comparative example, the pressure angle α1 is greatly varied from a value smaller than the medium value to a large value. However, in the deceleration mechanism 130 of the present invention, the pressure angle α1 is stable (does not vary) at a medium value (see FIG. 22).

As described above in detail, in the eighth embodiment, the pinion gear 131 is provided with the engagement projected part 131*c* formed in an arc shape having the radius of curvature R11 along the rotation direction of the pinion gear 131. The helical gear 132 is provided with the engagement recessed part 132*d* engaged with the engagement projected part 132*c*. The engagement recessed part 132*d* includes the arc-shaped bottom 132*e* arranged at the center of the engagement recessed part 132*d* along the rotation direction of the helical gear 132 and a pair of arc-shaped side wall parts 132*f* arranged on both sides of the arc-shaped bottom 132*e* along the rotation direction of the helical gear 132. The arc-shaped side wall parts 132*f* are arc-shaped recessed parts each having a radius of curvature R31 larger than the radius of curvature R11.

Accordingly, the size and weight of the motor 110 having deceleration mechanism installed therein including the deceleration mechanism 130 can be reduced, the variation in the pressure angle α1 can be suppressed even if the center-to-center pitch between the pinion gear 131 and the helical gear 132 is varied, and the backlash β1 can be changed on the small value side.

In addition, in the eighth embodiment, because the gap S1 for holding the lubricating oil G1 is arranged between the engagement projected part 131*c* and the arc-shaped bottom 132*e* in the state of engagement of the engagement projected part 131*c* and the engagement recessed part 132*d*, the smooth operation of the deceleration mechanism 130 (motor 110 having deceleration mechanism installed therein) can be maintained for a long period of time.

Next, a plurality of other embodiments according to the present invention are described in detail with reference to the drawings. The parts having the same functions as those in the eighth embodiment described above are designated by the same reference numerals, and detailed description thereof is omitted.

Figure 23:
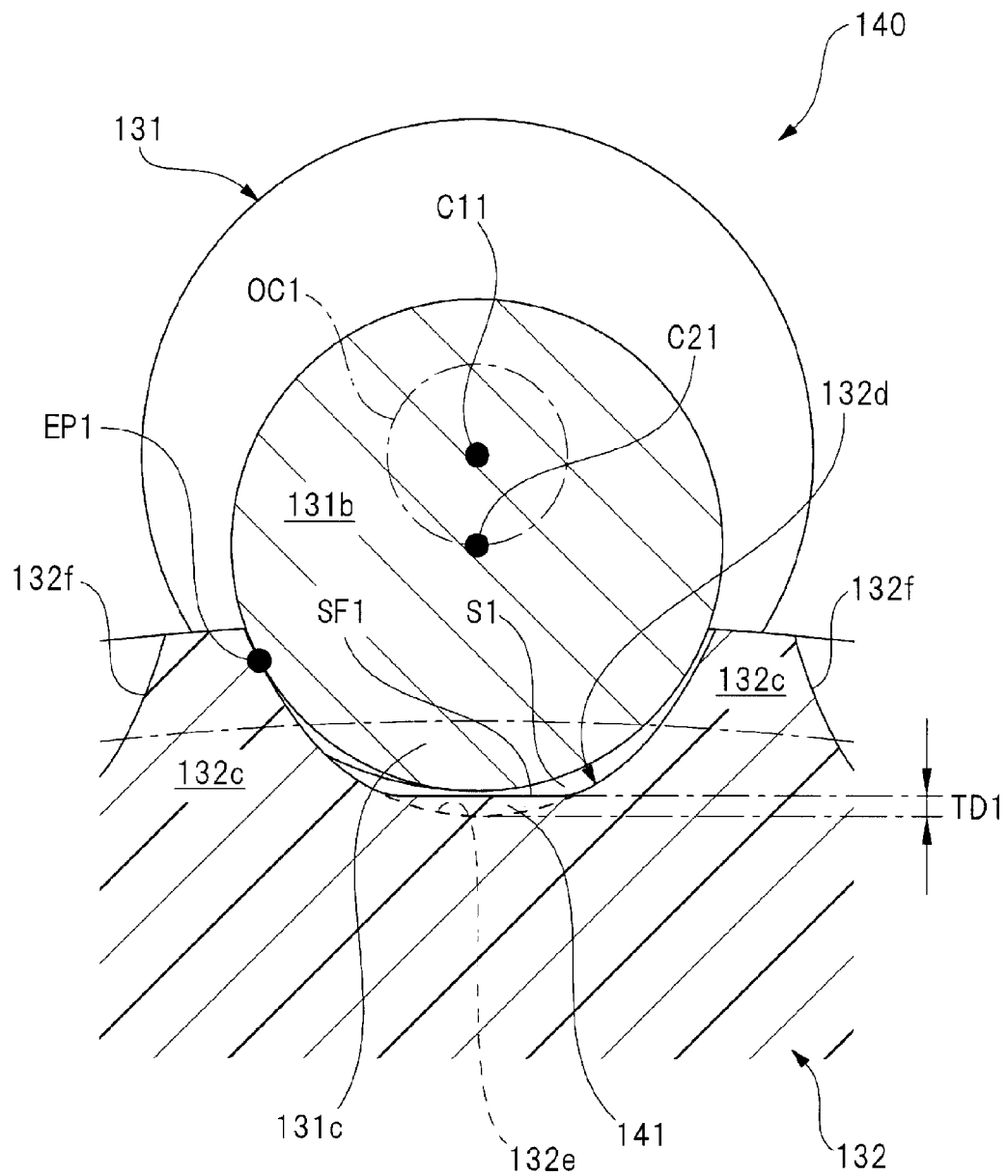
FIG. 23 is a diagram corresponding to FIG. 18, showing a ninth embodiment.
Figure 24:
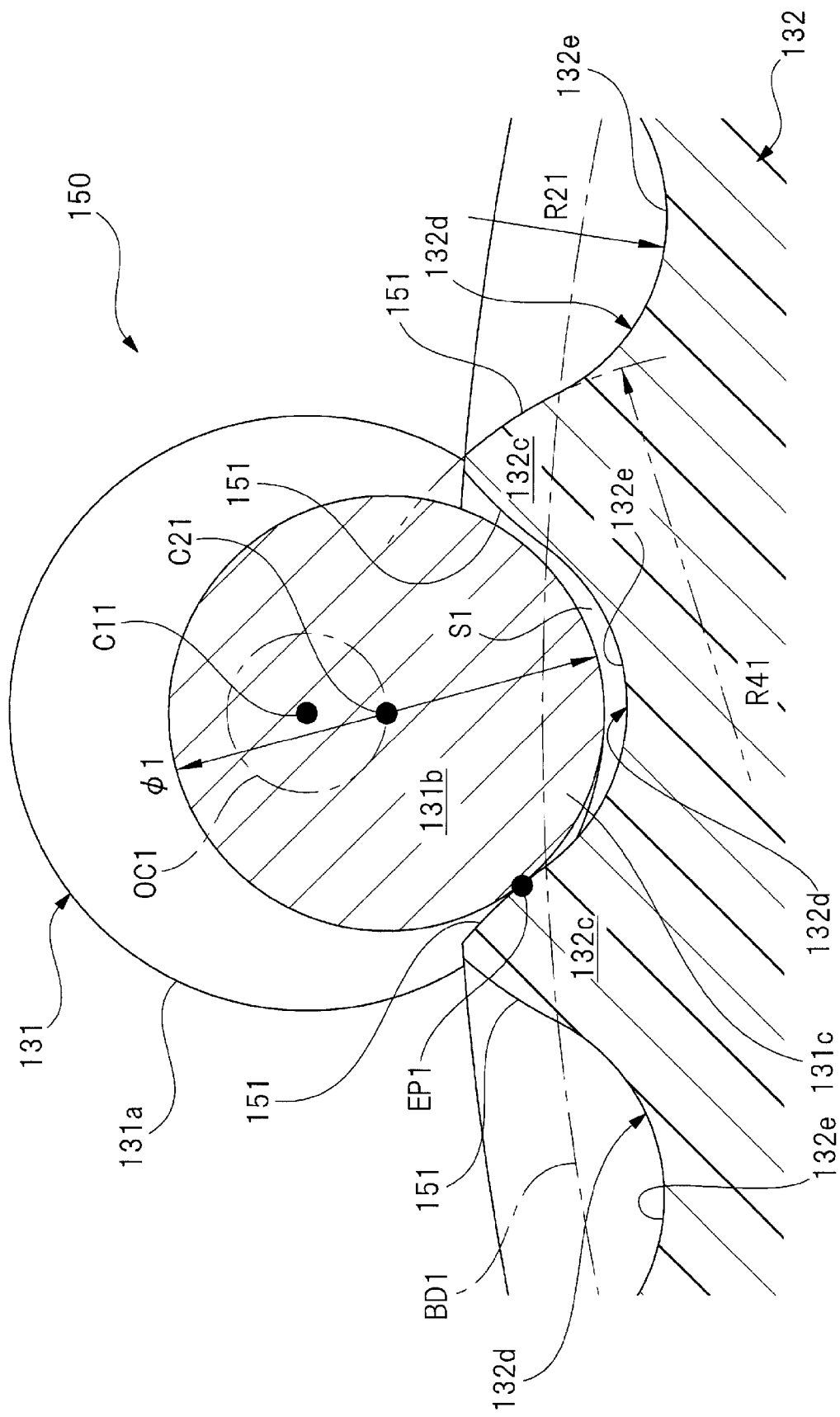
FIG. 24 is a diagram corresponding to FIG. 18, showing a tenth embodiment.
Figure 25:
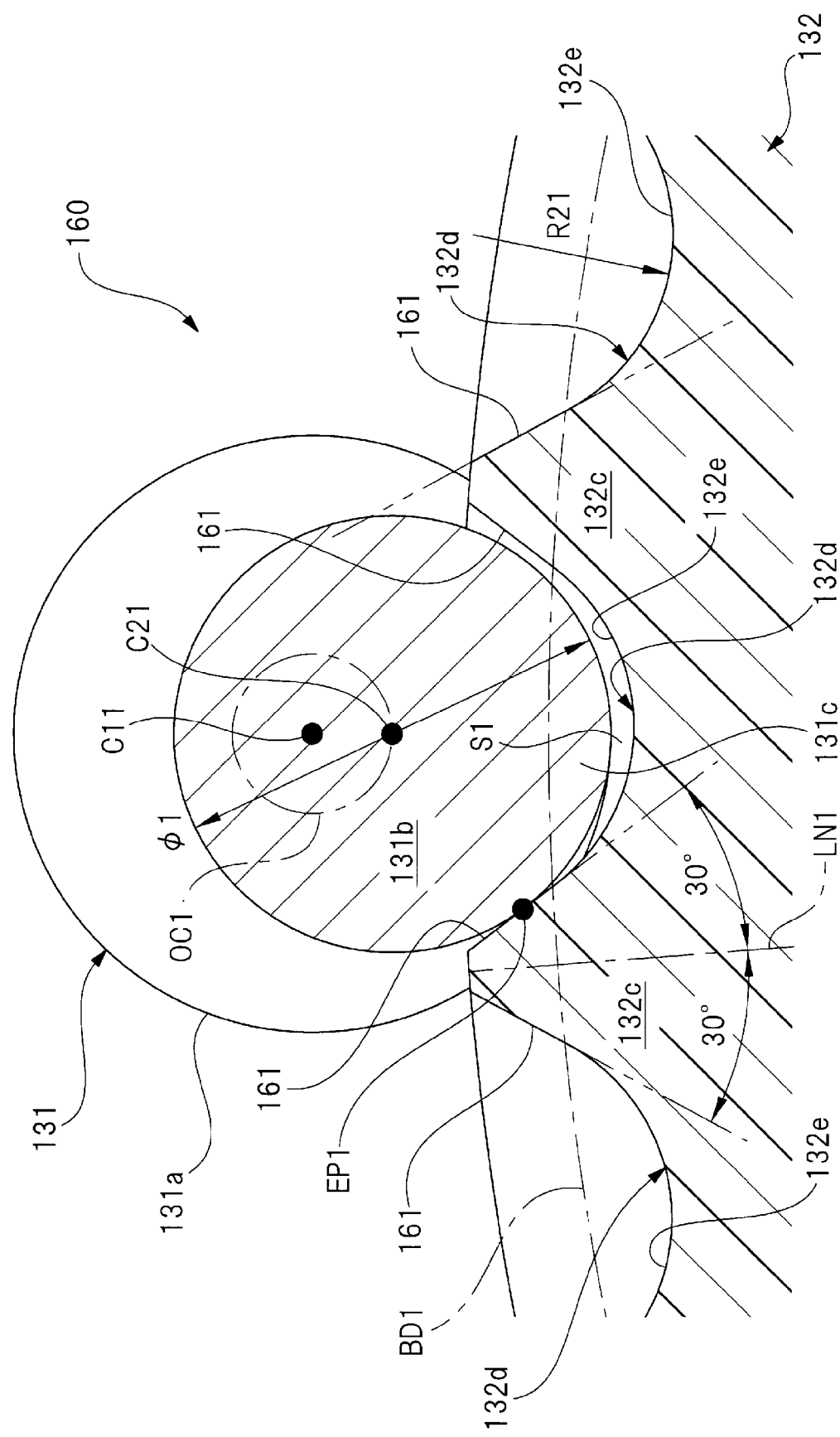
FIG. 25 is a diagram corresponding to FIG. 18, showing an eleventh embodiment.
Figure 26:
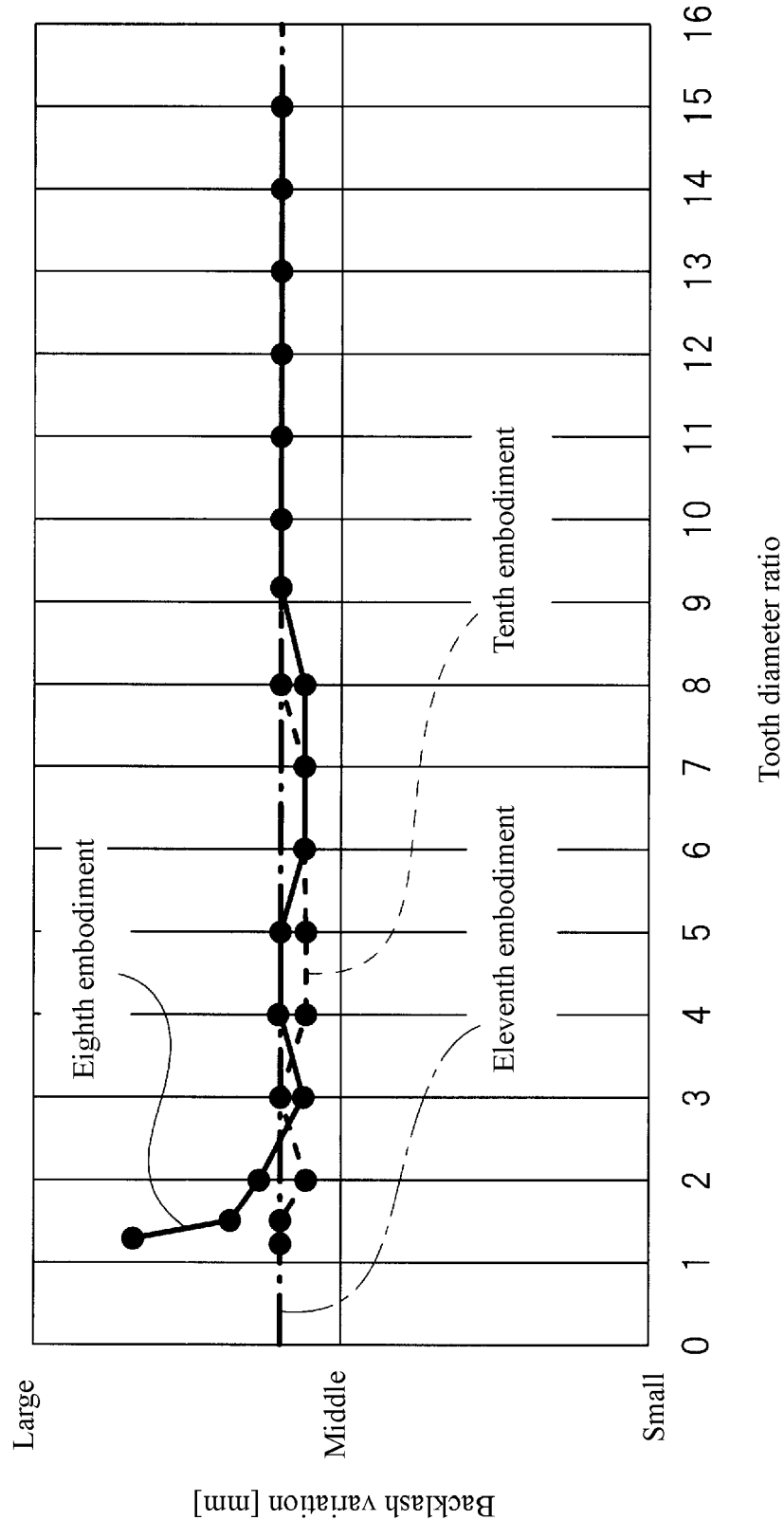
FIG. 26 is a graph showing a relationship between tooth diameter ratios and backlash variations in the eighth, tenth, and eleventh embodiments.
Figure 27:
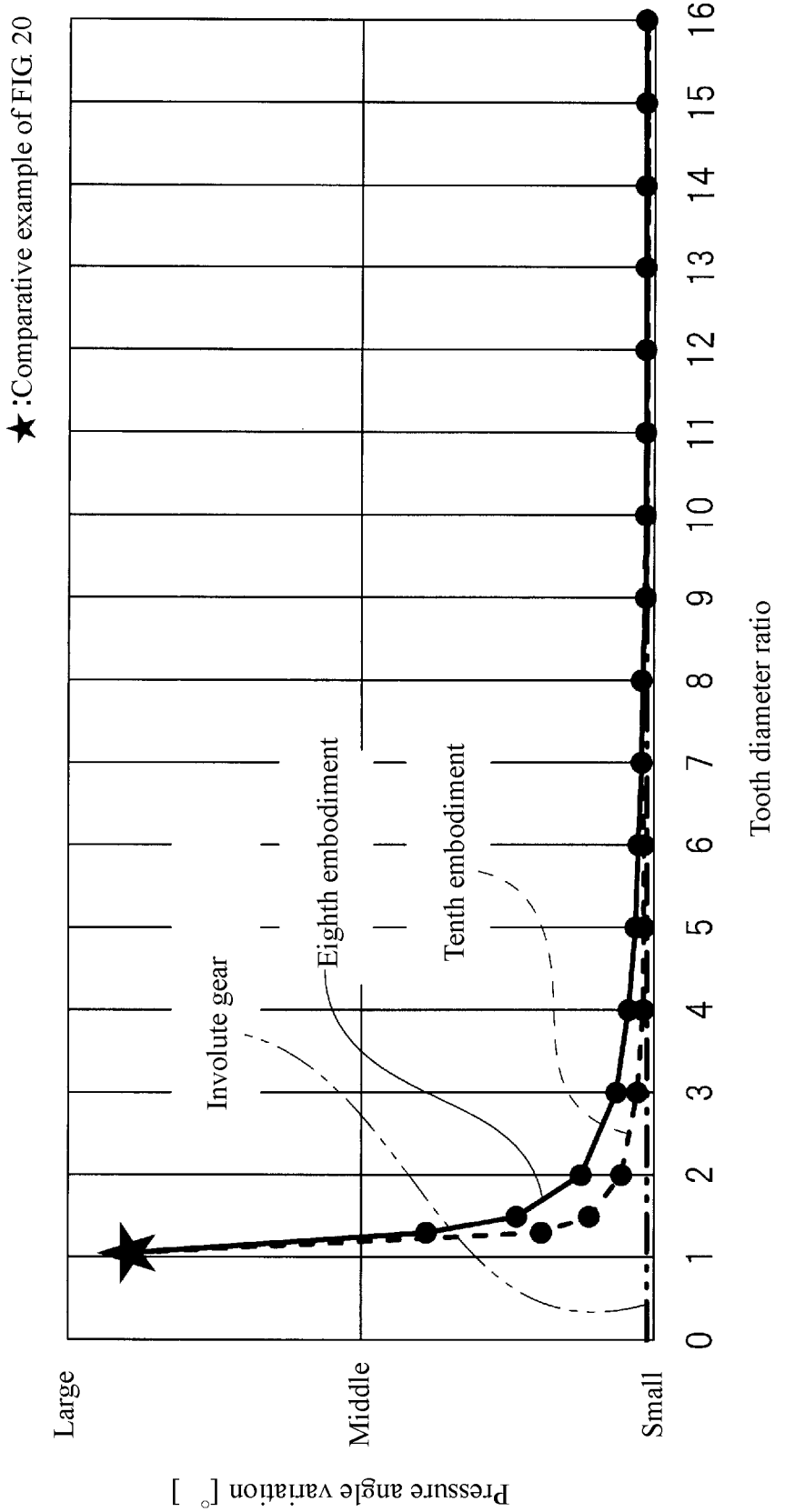
FIG. 27 is a graph showing a relationship between tooth diameter ratios and pressure angle variations in the eighth, tenth embodiments and an involute gear.
Figure 28:
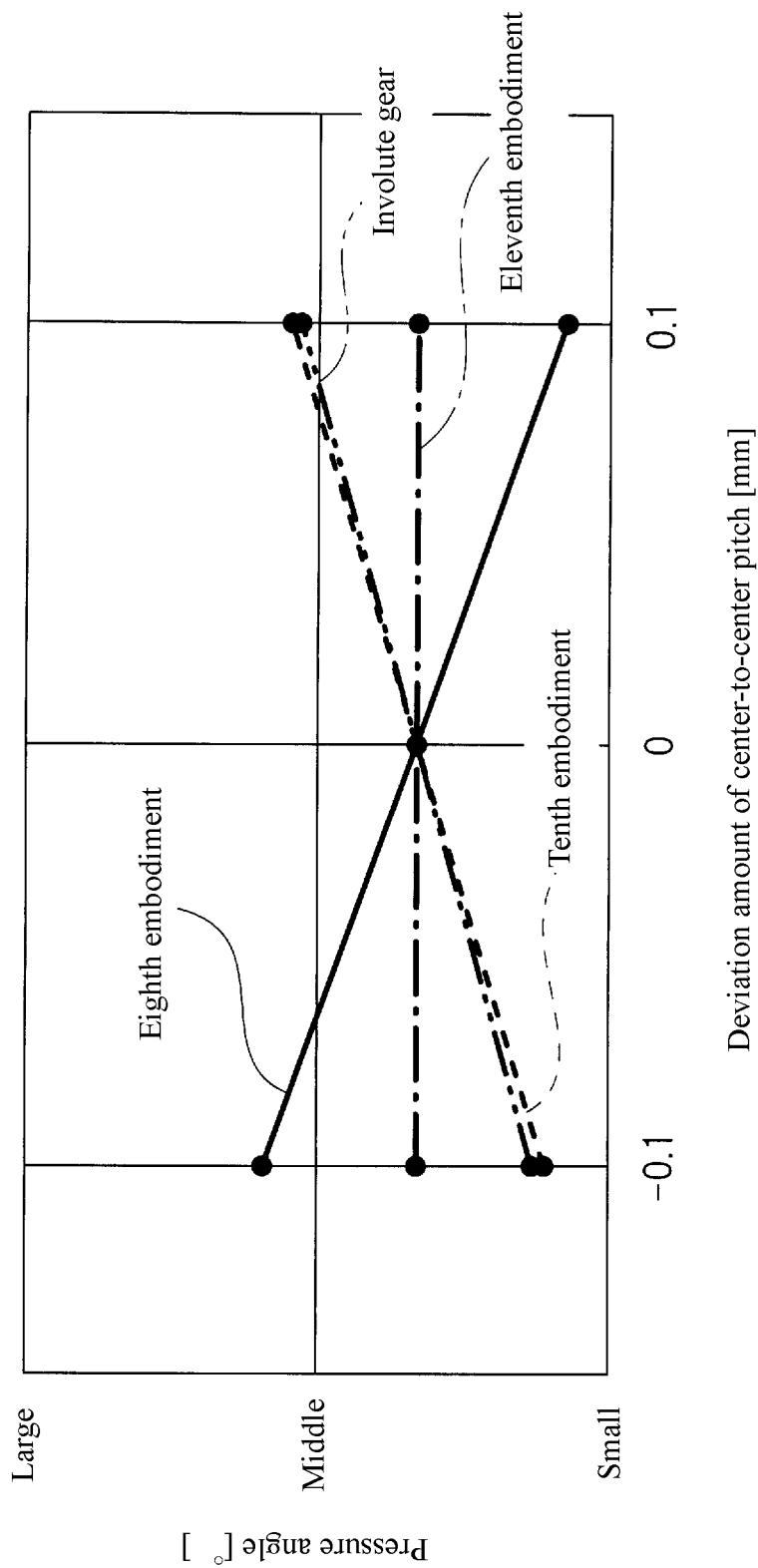
FIG. 28 is a graph showing changes in deviation amounts of center-to-center pitches and pressure angles in the eighth, tenth, eleventh embodiments and the involute gear.

FIG. 23 is a diagram corresponding to FIG. 18 and shows a ninth embodiment. FIG. 24 is a diagram corresponding to FIG. 18 and shows a tenth embodiment. FIG. 25 is a diagram corresponding to FIG. 18 and shows an eleventh embodiment. FIG. 26 is a graph showing the relationship between the tooth diameter ratios and the backlash variations in the eighth, tenth and eleventh embodiments. FIG. 27 is a graph showing a relationship between tooth diameter ratios and pressure angle variations in the eighth, tenth embodiments and an involute gear. FIG. 28 is a graph showing changes in deviation amounts of center-to-center pitches and pressure angles in the eighth, tenth, eleventh embodiments and the involute gear.

Ninth Embodiment

As shown in FIG. 23, a deceleration mechanism 140 of the ninth embodiment is different from that of the eighth embodiment only in the shape of the engagement recessed part 132*d* formed on the helical gear 132. In the deceleration mechanism 130 (see FIG. 18) of the eighth embodiment, the gap S1 for holding the lubricating oil G1 is formed between the engagement projected part 131*c* and the arc-shaped bottom 132*e* in the state of engagement of the engagement projected part 131*c* and the engagement recessed part 132*d*.

On the other hand, in the ninth embodiment, a built-up part 141 for narrowing (partially filling) the gap S1 formed between the engagement projected part 131c and the arc-shaped bottom 132e in the state of engagement of the engagement projected part 131c and the engagement recessed part 132d is arranged.

Specifically, as shown in FIG. 23, the built-up part 141 narrows the gap S1 by the thickness dimension TD1 from the deepest part of the arc-shaped bottom 132e, and the surface thereof is a flat surface SF1. However, the thickness dimension TD1 of the build-up part 141 is set in a manner that the engagement projected part 131c and the flat surface SF1 of the build-up part 141 do not come into contact with each other during operation of the deceleration mechanism 140. Accordingly, the lubricating oil (not shown) may be retained in the minute gap S1 between the engagement projected part 131c and the flat surface SF1.

In the ninth embodiment formed as described above, substantially the same operational effects as those of the eighth embodiment can also be obtained. In addition to this, in the ninth embodiment, the strength of the tooth roots of the helical teeth 132c can be enhanced, and the deformation of the helical teeth 132c can be suppressed and transmission of higher torque can be achieved.

Tenth Embodiment

As shown in FIG. 24, a deceleration mechanism 150 of the tenth embodiment is different from that of the eighth embodiment only in the shape of the engagement recessed part 132d arranged on the helical gear 132. In the deceleration mechanism 130 (see FIG. 18) of the eighth embodiment, the arc-shaped side wall part 132f having the radius of curvature R31 is arranged so as to be recessed toward the radial outer side of the engagement recessed part 132d. That is, in the eighth embodiment, the arc-shaped side wall part 132f is an arc-shaped recessed part. On the other hand, in the tenth embodiment, a pair of reverse arc-shaped side wall parts (side wall parts) 151 are arranged on both sides of the arc-shaped bottom 132e along the rotation direction of the helical gear 132.

Specifically, the reverse arc-shaped side wall part 151 is formed with a radius of curvature R41 so as to protrude toward the radial inner side of the engagement recessed part 132d. That is, these reverse arc-shaped side wall parts 151 are arc-shaped projected parts. Moreover, similar to the eighth embodiment, the lubricating oil (not shown) is arranged between the engagement projected part 131c and the arc-shaped bottom 132e.

Here, the radius of curvature R41 of the reverse arc-shaped side wall 151 is set to twice the radius of curvature R11 of the engagement projected part 131c (R41=2×R11). That is, the radius of curvature R41 of the reverse arc-shaped side wall 151 is equal to the radius of curvature R31 of the arc-shaped side wall part 132f in the eighth embodiment (R41=R31). The radius of curvature R41 of the reverse arc-shaped side wall part 151 constitutes the second radius of curvature in the present invention.

In the tenth embodiment formed as described above, substantially the same operational effects as those of the eighth embodiment can also be obtained. Here, in the tenth embodiment, as shown in the ninth embodiment in FIG. 23, a build-up part for narrowing the gap S1 formed between the engagement projected part 131c and the arc-shaped bottom 132e in the state of engagement of the engagement projected part 131c and the engagement recessed part 132d may also be arranged.

Eleventh Embodiment

As shown in FIG. 25, a deceleration mechanism 160 of the eleventh embodiment is different from that of the eighth embodiment only in the shape of the engagement recessed part 132d arranged on the helical gear 132. In the deceleration mechanism 130 (see FIG. 18) of the eighth embodiment, the arc-shaped side wall part 132f having the radius of curvature R31 is arranged so as to be recessed toward the radial outer side of the engagement recessed part 132d. On the other hand, in the eleventh embodiment, a pair of flat side wall parts (side wall parts) 161 each having a flat surface extending straight from the arc-shaped bottom 132e are arranged on both sides of the arc-shaped bottom 132e along the rotation direction of the helical gear 132.

Specifically, the inclination angles of the pair of flat side wall parts 161 are inclined at an inclination angle of 30° so as to be mirror-symmetrical about a line segment LN1 passing through the center of the tooth tips of the helical teeth 132c. Moreover, similar to the eighth embodiment, the lubricating oil (not shown) is arranged between the engagement projected part 131c and the arc-shaped bottom 132e.

In the eleventh embodiment formed as described above, substantially the same operational effects as those of the eighth embodiment can also be obtained. Here, in the eleventh embodiment, as shown in the ninth embodiment of FIG. 23, a build-up part for narrowing the gap S1 formed between the engagement projected part 131c and the arc-shaped bottom 132e in the state of engagement of the engagement projected part 131c and the engagement recessed part 132d may also be arranged.

Here, various characteristics of the deceleration mechanism 130 (see FIG. 18) of the eighth embodiment, the deceleration mechanism 150 (see FIG. 24) of the tenth embodiment, and the deceleration mechanism 160 (see FIG. 25) of the eleventh embodiment are respectively described with reference to FIGS. 26 to 28.

FIG. 26 is a graph showing the relationship between the tooth diameter ratio and the backlash variation [mm]. Here, the tooth diameter ratio means the radius of curvature R11 of the engagement projected part 131c and the radius of curvature of the arc-shaped side wall part 132f. Therefore, in the eighth and tenth embodiments, the tooth diameter ratio is "2" (twice).

As shown in FIG. 26, in the "eleventh embodiment" shown by the dash line, the engaging point EP1 (see FIG. 25) part is linear and has no relation to the tooth diameter ratio, and the backlash variation indicates a constant value with an approximately medium value. In the "eighth embodiment" shown by the solid line, it has been found that the backlash variation becomes large when the tooth diameter ratio is "2" or less. On the other hand, in the "tenth embodiment" shown by the broken line, it has been found that the backlash variation is stable around the approximately medium value regardless of the tooth diameter ratio. That is, it has been found that the "tenth embodiment" has a better effect in suppressing the backlash variation than the "eighth embodiment".

From the viewpoint of "backlash" as described above, it has been found that it is desirable to set the tooth diameter ratio to about "2" even if it is small. That is, it is desirable that both the radius of curvature R31 of the arc-shaped side wall part 132f and the radius of curvature R41 of the reverse arc-shaped side wall part 151 are set to be at least twice as large as the radius of curvature R11 of the engagement projected part 131c.

FIG. 27 is a graph showing the relationship between the tooth diameter ratio and the pressure angle variation [°]. In the "eleventh embodiment", because the engaging point EP1 (see FIG. 25) part is linear, the pressure angle does not vary. Therefore, the graph of the "eleventh embodiment" is not shown in FIG. 27. On the other hand, the characteristics of the existing involute gears are described for reference.

As indicated by the double-dashed line, in the involute gear, even if the pressure angle is varied due to its characteristics, it is varied within a very small angle range. On the other hand, in the "eighth embodiment" shown by the solid line, it has been found that when the tooth diameter ratio is "2" or less, the variation in the pressure angle becomes sharply larger. Moreover, the variation in the pressure angle when the tooth diameter ratio is "2" in the "eighth embodiment" is sufficiently allowable as a product. On the other hand, in the "tenth embodiment" indicated by the broken line, it has been found that when the tooth diameter ratio is "2", the variation in the pressure angle is about ½ of that in the "eighth embodiment". That is, it has been found that the "tenth embodiment" has a better effect than the "eighth embodiment" in terms of suppressing variations in pressure angle.

From the viewpoint of "pressure angle" as described above, it has been found that it is desirable to set the tooth diameter ratio to about "2" even if it is small. That is, it is desirable that both the radius of curvature R31 of the arc-shaped side wall part 132f and the radius of curvature R41 of the reverse arc-shaped side wall part 151 are set to be at least twice as large as the radius of curvature R11 of the engagement projected part 131c.

Here, when the comparative example shown in FIG. 20 is plotted in FIG. 27, it becomes a part of an asterisk. That is, the tooth diameter ratio is approximately "1", and the variation in the pressure angle is the largest value in the range shown in FIG. 27.

FIG. 28 is a graph showing changes in deviation amounts [mm] of center-to-center pitches and pressure angles [°] in the eighth, tenth, eleventh embodiments and the involute gear. In FIG. 28, it has been found that the "tenth embodiment" has the same characteristic as the existing involute gear (double-dashed line) shown for reference, and the "eighth embodiment" has a characteristic opposite to that of the existing involute gear. Moreover, in the "eleventh embodiment", the engaging point EP1 (see FIG. 25) part is linear, and thus the pressure angle has a constant value.

From the relationship between the deviation amount of the center-to-center pitch and the pressure angle as described above, the "eighth embodiment" and the "tenth embodiment" having mutually opposite characteristics may be appropriately selected and applied according to the characteristics of the required deceleration mechanism, the usage of the deceleration mechanism, or the like. In other words, the variation of the deceleration mechanism may be easily increased. Moreover, the "eleventh embodiment" exhibiting characteristics substantially in the middle of those of the "eighth embodiment" and the "tenth embodiment" may be added to the variations of the deceleration mechanism.

The present invention is not limited to the above-mentioned embodiments, and numerous changes may be made without departing from the spirit of the invention. In each of the above-described embodiments, although the deceleration mechanisms 130, 140, 150, 160 (motor 110 having deceleration mechanism installed therein) are applied to the drive source of the wiper device mounted on the vehicle, the present invention is not limited thereto. The deceleration mechanisms 130, 140, 150, 160 may be applied to other drive sources of a power window device, a sunroof device, a seat lifter device, and the like.

In addition, in each of the above-described embodiments, although the motor 110 having deceleration mechanism installed therein in which the deceleration mechanisms 130, 140, 150, 160 are driven by the brushless motor 120 is shown, the present invention is not limited thereto, and a brushed motor may be used instead of the brushless motor 120 to drive the deceleration mechanism 130, 140, 150, 160.

In addition, the material, shape, size, number, installation location, and the like of each constituent component in each of the above-described embodiments are freely selected as long as the present invention may be achieved, and are not limited to the above-described embodiments.

Hereinafter, the twelfth embodiment of the present invention is described in detail with reference to the drawings.

Figure 29:
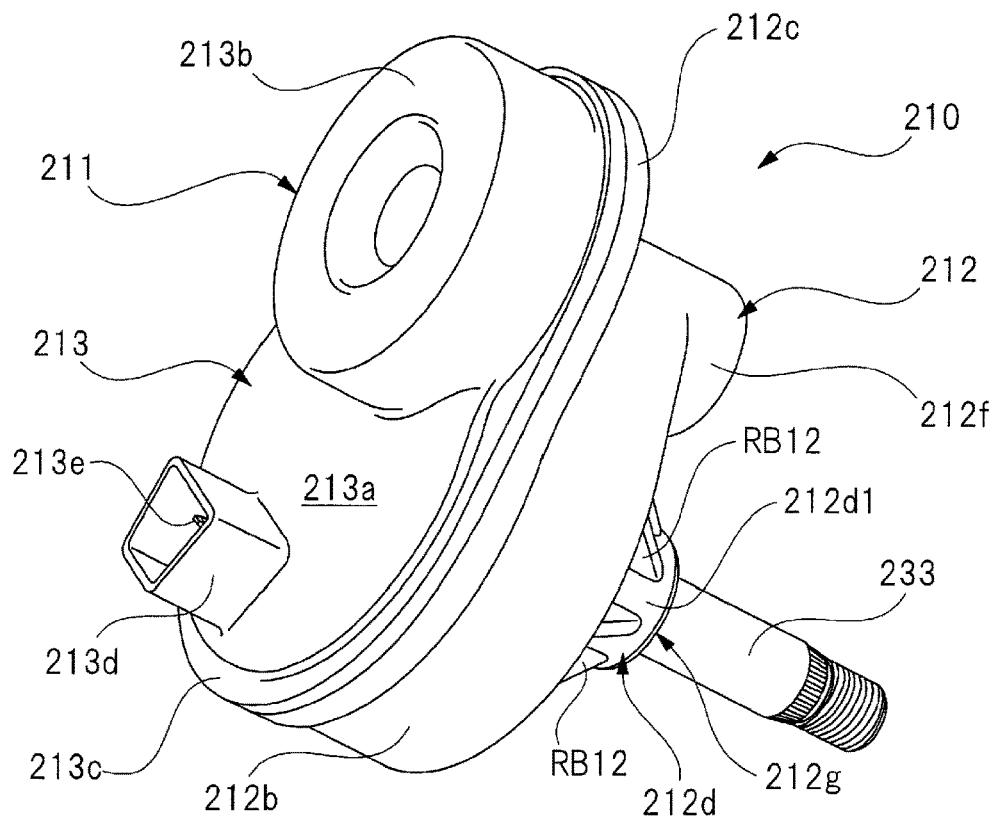
FIG. 29 is a perspective view of the motor having deceleration mechanism installed therein as viewed from the connector connection part side.
Figure 30:
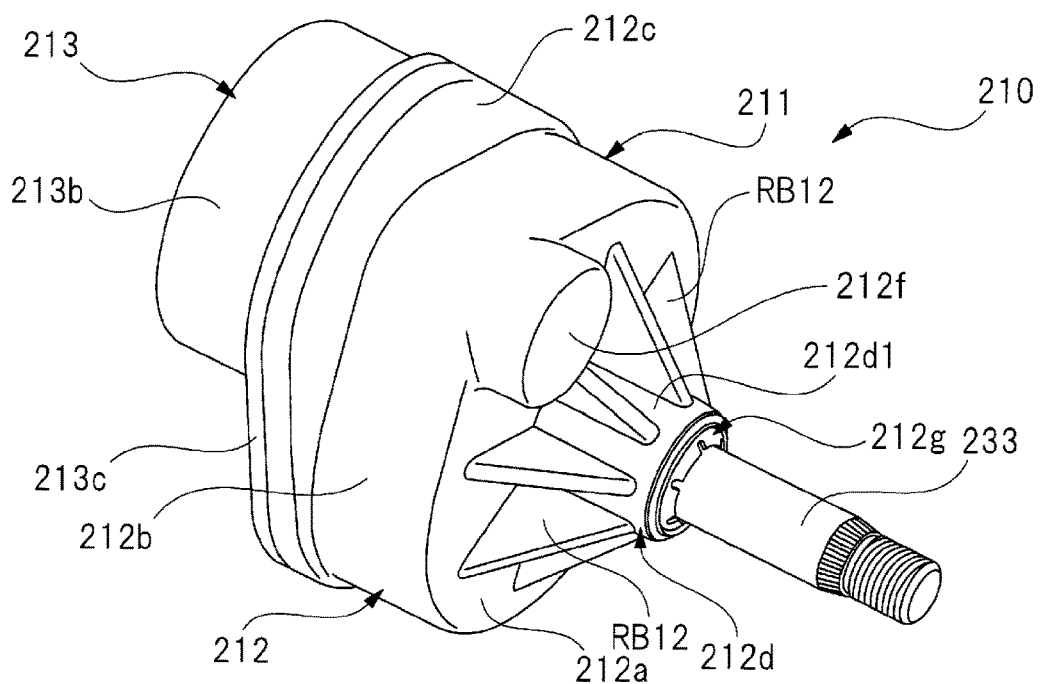
FIG. 30 is a perspective view of the motor having deceleration mechanism installed therein as viewed from the output shaft side.
Figure 31:
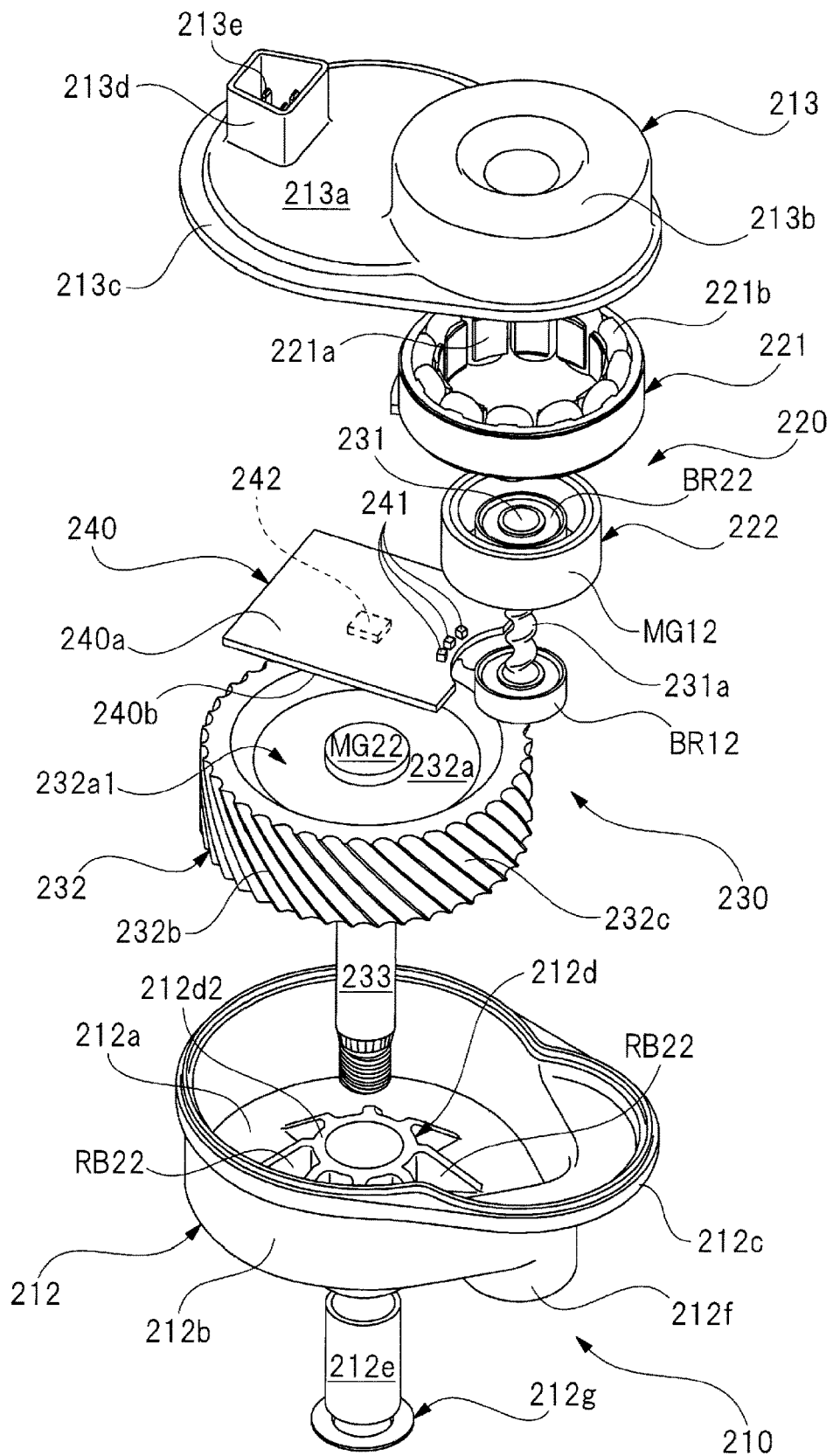
FIG. 31 is an exploded perspective view showing an internal structure of the motor having deceleration mechanism installed therein.
Figure 32:
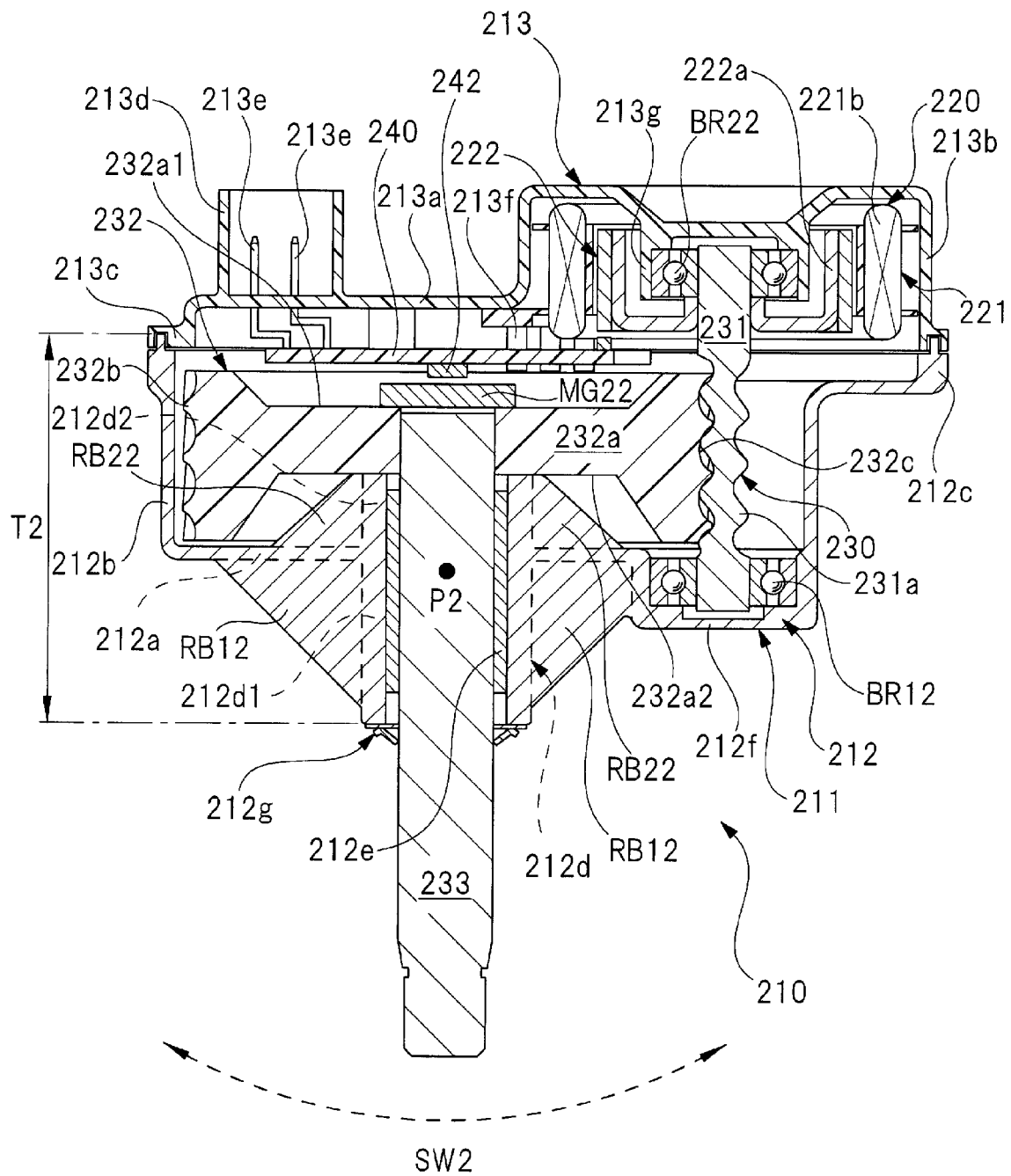
FIG. 32 is a cross-sectional view showing an internal structure of the motor having deceleration mechanism installed therein.

FIG. 29 is a perspective view of the motor having deceleration mechanism installed therein as viewed from the connector connection part side. FIG. 30 is a perspective view of the motor having deceleration mechanism as viewed from the output shaft side. FIG. 31 is an exploded perspective view showing an internal structure of the motor having deceleration mechanism installed therein. FIG. 32 is a cross-sectional view showing an internal structure of the motor having deceleration mechanism installed therein. (a) of FIG. 33 and (b) of FIG. 33 are perspective views showing a gear case as a single unit. FIG. 34 is an explanatory diagram showing a manufacturing procedure of the gear case. FIG. 35 is an enlarged cross-sectional view showing details of the sensor substrate. FIG. 36 is an enlarged cross-sectional view of a brushless motor. FIG. 37 is a cross-sectional view taken along line A2-A2 of FIG. 36. FIG. 38 is a perspective view showing details of the deceleration mechanism.

A motor 210 having deceleration mechanism installed therein shown in FIGS. 29 and 30 is used as a drive source of a wiper device (not shown) mounted on a vehicle such as an automobile. More specifically, the motor 210 having deceleration mechanism installed therein has a wiper member (not shown) swingably arranged on the front side of a windshield (not shown) and adapted to be swung within a predetermined wiping range (between the lower reversal position and the upper reversal position).

The motor 210 having deceleration mechanism installed therein includes a housing 211 that forms the outer shell thereof. As shown in FIGS. 31 and 32, a brushless motor (motor unit) 220 and a deceleration mechanism (deceleration mechanism unit) 230 are rotatably housed inside the housing 211. In addition, a sensor substrate 240 for detecting the rotational states of the rotor 222 and the helical gear 232 is housed inside the housing 211. Here, the housing 211 includes a gear case 212 made of aluminum die cast and a cover member 213 made of plastic.

As shown in FIGS. 29 to 33, the gear case 212 is formed in a substantially bowl shape by injection molding of a molten aluminum material. Specifically, the gear case 212 includes a bottom wall part 212a, a side wall part 212b arranged around the bottom wall part 212a in an integrated manner, and a case flange 212c arranged on the opening side (upper side in FIG. 32) of the gear case 212.

A cylindrical boss part (support cylinder part) 212d for rotatably supporting an output shaft 233 is integrally arranged substantially at the center of the bottom wall part 212a. The length dimension along the axial direction of the boss part 212d is set to be slightly larger than the height dimension of the side wall part 212b, and a part of the boss part 212d near the center in the axial direction is fixed to the bottom wall part 212a. Accordingly, a first cylindrical part 212d1 forming one side in the longitudinal direction of the boss part 212d is protruded from the bottom wall part 212a to the outside of the gear case 212, and a second cylindrical part 212d2 forming the other side in the longitudinal direction of the boss part 212d is protruded from the bottom wall part 212a to the inside of the gear case 212.

Therefore, the axial length of the boss part 212d is sufficiently secured, and the "blur" of the output shaft 233 during the operation of the motor 210 having deceleration mechanism installed therein may be effectively suppressed. In addition, the second cylinder part 212d2 of the boss part 212d is protruded to the inside of the gear case 212, thereby suppressing an increase in a thickness dimension T2 (see FIG. 32) of the gear case 212.

As shown in FIG. 33, in order to increase the fixing strength of the boss part 212d to the bottom wall part 212a, a plurality of first reinforcing ribs RB12 and second reinforcing ribs RB22 are arranged on one side and the other side in the axial direction of the boss part 212d respectively. More specifically, the first reinforcing rib RB12 is arranged on the outer periphery of the boss part 212d on the first cylindrical part 212d1 side, and the second reinforcing rib RB22 is arranged on the outer periphery of the boss part 212d on the second cylindrical part 212d2 side. In addition, eight first reinforcing ribs RB12 and eight second reinforcing ribs RB22 are arranged around the boss part 212d at equal intervals (45° intervals).

As described above, the plurality of first reinforcing ribs RB12 are arranged between the first cylindrical part 212d1 of the boss part 212d and the bottom wall part 212a and outside the gear case 212. In addition, the plurality of second reinforcing ribs RB22 are arranged between the second cylindrical part 212d2 of the boss part 212d and the bottom wall part 212a and inside the gear case 212.

The plurality of first reinforcing ribs RB12 and second reinforcing ribs RB22 are each formed in a substantially triangular shape, and are arranged in an integrated manner so as to be stretched between the boss part 212d and the bottom wall part 212a. Accordingly, as shown in FIG. 32, the boss part 212d is fixed to the relatively thin bottom wall part 212a with sufficient fixing strength, thereby achieving miniaturization and weight reduction of the gear case 212.

Here, the first reinforcing rib RB12 and the second reinforcing rib RB22 are arranged at the same position in the circumferential direction of the boss part 212d (see FIG. 32). However, the first reinforcing rib RB12 and the second reinforcing rib RB22 may be arranged at different positions in the circumferential direction of the boss part 212d depending on the specifications of the gear case 212.

In addition, during the operation of the motor 210 having deceleration mechanism installed therein, when a reaction force such as a hollow force is applied to the output shaft 233, the output shaft 233 swings around a swing center P2 of FIG. 32 with respect to the boss part 212d as shown by a broken line arrow SW2. At this time, because the bottom wall part 212a is arranged in the vicinity of the swing center P2, the reaction force that tends to result in inclination of the boss part 212d may be released to each of the first reinforcing rib RB12 and the second reinforcing rib RB22 in a well-balanced manner. Therefore, the occurrence of cracks and the like due to the concentration of stress on the connecting part between the boss part 212d and the bottom wall part 212a may be suppressed.

Here, the gear case 212 is manufactured by an injection molding device 250 shown in FIG. 34. Specifically, the injection molding device 250 includes a lower mold 251 and an upper mold 252. The lower mold 251 is a fixed mold fixed to a base (not shown) of the injection molding device 250 and forms the outside of the gear case 212. On the other hand, the upper mold 252 is a movable mold that is lifted and lowered by a lifting mechanism (not shown) of the injection molding device 250, and forms the inside of the gear case 212.

Then, as shown in FIG. 34, a cavity CA2 is formed inside the upper mold 251 and the lower mold 252 by operating the elevating mechanism to bring the upper mold 252 into contact with the lower mold 251. In addition, the upper mold 252 is provided with a dispenser DS2 for supplying a molten aluminum material (molten material) to the cavity CA2. Specifically, the dispenser DS2 pressure-feeds the molten material to a supply passage 252a of the upper mold 252 with a predetermined pressure, and thereby the cavity CA2 connected to the supply passage 252a is filled with the molten material.

At this time, as indicated by arrows M12 and M22 in the diagram, the molten material is evenly filled in the cavity CA2. In particular, as shown by an the arrow M22 in the diagram, in a part where the shape of the gear case 212 is complicated, that is, in a part where the boss part 212d and the plurality of the first reinforcing ribs RB12 and the second reinforcing ribs RB22 (see FIG. 33) are formed, the molten material is branched in the vertical direction of the cavity CA2.

Here, in the present embodiment, the length dimensions along the axial direction of the boss parts 212d of the first reinforcing rib RB12 and the second reinforcing rib RB22 are shorter than those of the conventional ribs. Accordingly, the molten material is efficiently and evenly distributed over the parts forming the boss part 212d, the first reinforcing rib RB12 and the second reinforcing rib RB22. In other words, the shape of the gear case 212 in the present embodiment is a shape that can improve the "flow of molten metal". Thus, occurrence of "cast holes", "short shots", or the like can be reliably suppressed, thereby improving yield and mass productivity.

In addition, as shown in FIG. 32, a cylindrical bearing member 212e, which is a so-called "metal", is mounted on the radially inner side of the boss part 212d. This allows the output shaft 233 to rotate smoothly without shaking in relation to the boss part 212d.

In addition, a bearing member housing part 212f is arranged at a position eccentric from the boss part 212d of the bottom wall part 212a in an integrated manner. The bearing member housing part 212f is formed in a bottomed cylindrical shape, and protrudes from the bottom wall part 212a to the outside of the gear case 212. A first ball bearing BR12 for rotatably supporting the front end side of the pinion gear 231 is housed inside the bearing member housing part 212f.

Furthermore, a retaining ring 212g is arranged between the boss part 212d and the output shaft 233, thereby preventing the output shaft 233 from chattering in the axial direction of the boss part 212d, and ensuring the quietness of the motor 210 having deceleration mechanism installed therein.

The cover member 213 forming the housing 211 is formed by injection molding of a melted plastic material, and includes a substrate holding part 213a formed in a substantially flat plate shape, and a motor housing part 213b formed in a substantially bottomed cylindrical shape. In addition, a cover flange 213c is arranged around the cover member 213 in an integrated manner, and is abutted against the case flange 212c via a seal member (not shown) such as an O-ring, thereby preventing rainwater and the like from entering the housing 211.

The substrate holding part 213a faces the boss part 212d of the gear case 212 from the axial direction of the output shaft 233 with the cover member 213 attached to the gear case 212. The sensor substrate 240 is fixed inside the substrate holding part 213a by a plurality of fixing screws (not shown). That is, the substrate holding part 213a holds the sensor substrate 240 via the plurality of fixing screws.

In addition, the board holding part 213a is integrally provided with a connector connection part 213d to which an external connector (not shown) on the vehicle side is connected. One end sides of a plurality of terminal members 213e (only two are shown in FIG. 32) are exposed inside the connector connection part side 213d. The other end sides of the terminal members 213e are electrically connected to the sensor substrate 240.

Moreover, some of the plurality of terminal members 213e are configured to supply a drive current to a brushless motor 220, and the other terminal members 213e are configured to send a signal indicating the operating state of the motor 210 having deceleration mechanism installed therein to an in-vehicle controller (not shown) via an external connector. Accordingly, the motor 210 having deceleration mechanism installed therein is controlled by the in-vehicle controller, and the wiper member fixed to the front end part of the output shaft 233 is swung within a predetermined wiping range on the windshield.

Furthermore, one end sides of a plurality of terminal members for motor 213f are electrically connected to the sensor substrate 240, and the other end sides of these terminal members for motor 213f are electrically connected to the brushless motor 220. Specifically, three terminal members for motor 213f are arranged corresponding to each of the U-phase, V-phase, and W-phase coils 221b of the brushless motor 220 (see FIG. 35).

In addition, as shown in FIG. 31, three Hall ICs (Hall integrated circuit) 241 and one MR (magneto resistance) sensor 242 are mounted on the sensor substrate 240, respectively. The three Hall ICs 241 are mounted on the front surface (one side surface) 240a of the sensor substrate 240, and the MR sensor 242 is mounted on the back surface (other side surface) 240b of the sensor substrate 240.

More specifically, the three Hall ICs 241 are arranged side by side at a predetermined interval in the vicinity of the edge part of the surface 240a, and face the first sensor magnet MG12 arranged on the rotor 222 from the axial direction of the pinion gear 231. Here, the rotor 222 is fixed to the pinion gear 231, in other words, the first sensor magnet MG12 is arranged on the pinion gear 231 via the rotor 222. In this way, the three Hall ICs 241 are arranged at parts separated from the first sensor magnet MG12 at the same separation distance t22 (see FIG. 35).

On the other hand, the MR sensor 242 is arranged substantially at the center of the back surface 240b and faces the second sensor magnet MG22 arranged at the rotation center of the helical gear 232 from the axial direction of the pinion gear 231. Moreover, as shown in FIG. 35, the separation distance t12 between the MR sensor 242 and the second sensor magnet MG22 is substantially the same as the separation distance t22 between the three Hall ICs 241 and the first sensor magnet MG12 (t12≈t22). That is, the sensor substrate 240 is arranged between the first sensor magnet MG12 and the second sensor magnet MG22 in a state in which the motor 210 having deceleration mechanism installed therein is assembled.

Then, the Hall ICs 241 and the MR sensor 242 catch the change in the magnetic flux accompanying the rotation of the first sensor magnet MG12 and the second sensor magnet MG22, and transmit a rectangular wave (pulse signal) to the in-vehicle controller.

Thus, the in-vehicle controller grasps the rotation state (rotation speed, rotation direction, or the like) of the brushless motor 220 (pinion gear 231) by measuring the number of times and appearing timing of the pulse signals received from the Hall ICs 241 and the MR sensor 242, and controls the brushless motor 220 based on the grasped rotation state. In addition, the in-vehicle controller also grasps the rotation state of the output shaft 233 (position of the wiper member with respect to the windshield) and controls the brushless motor 220 based on the grasped rotation state.

Moreover, the signal transmitted by the MR sensor 242 may be a stepwise signal, a sine wave, or the like.

The motor housing part 213b is protruded to the side (upper side in FIG. 32) opposite to the gear case 212 side in a state in which the cover member 213 is mounted on the gear case 212. In addition, the motor housing part 213b faces the bearing member housing part 212f of the gear case 212 in a state in which the cover member 213 is mounted on the gear case 212. A stator core (stator) 221 of the brushless motor 220 is fixed inside the motor housing part 213b.

Besides, a bearing holding cylinder 213g is arranged at the center of the motor housing part 213b, and is arranged on the radial inner side of the rotor 222. A second ball bearing BR22 for rotatably supporting the base end side of the pinion gear 231 is housed inside the bearing holding cylinder 213g.

As shown in FIGS. 31, 32, 36 and 37, the brushless motor 220 housed in the motor housing part 213b includes an annular stator core 221. The stator core 221 is fixed inside the motor housing part 213b in a rotation-stopped state (not shown in detail).

The stator core 221 is formed by stacking a plurality of thin steel plates (magnetic bodies), and a plurality of teeth 221a are arranged on the radially inner side thereof. Here, in the present embodiment, 12 teeth 221a (12 slots) are arranged. The U-phase, V-phase, and W-phase coils 221b are wound around these teeth 221a by concentrated winding a predetermined number of times.

Thus, an increase in the axial dimension of the stator core 221 is effectively suppressed as compared with the distributed winding in which the coils are wound so as to straddle the plurality of slots. That is, in the present embodiment, by adopting the brushless motor 220 of concentrated winding, the brushless motor 220 is reduced in size (thinness).

Then, by alternately supplying the drive current to the U-phase, V-phase, and W-phase coils 221b at a predetermined timing, the rotor 222 arranged on the radial inner side of the stator core 221 is rotated with a predetermined drive torque in a predetermined rotation direction.

A rotor (rotary member) 222 is rotatably arranged on the radial inner side of the stator core 221 via a minute gap (air gap). The rotor 222 is configured to rotate the pinion gear 231, and includes a rotor body 222a having a substantially U-shaped cross section formed by pressing a steel plate (magnetic material). A first sensor magnet (permanent magnet) MG12 formed in a substantially cylindrical shape is arranged on the radial outer side of the rotor body 222a.

Here, as described above, the first sensor magnet MG12 is configured to detect the rotation state of the brushless motor 220, and is also configured to rotate the rotor 222.

That is, the first sensor magnet MG12 is a permanent magnet that has both a sensor function and a rotational drive function. The first sensor magnet MG12 is magnetized so that magnetic poles are arranged alternately with N poles, S pole in this order in the circumferential direction. The first sensor magnet MG12 is firmly fixed to the rotor body 222a in an integrally rotating manner by an adhesive or the like As described above, the brushless motor 220 according to the present embodiment adopts a brushless motor having a surface permanent magnet (SPM) structure in which a permanent magnet (the first sensor magnet MG12) is fixed on the radially outer surface of the rotor body 222a. Here, the number of poles of the first sensor magnet MG12 may be arbitrarily set to, for example, 2 poles or 4 poles or more, depending on the specifications of the brushless motor 220.

A second ball bearing BR22 for rotatably supporting the pinion gear 231 is arranged on the radial inner side of the rotor body 222a that forms the rotor 222. Accordingly, as shown in FIG. 36, the second ball bearing BR22 is arranged within the range of the height dimension h2 of the rotor 222 and within the range of the radial dimension d2 of the rotor 222. That is, when the rotor body 222a is viewed from the outside in the radial direction, the second ball bearing BR22 is hidden by the rotor body 222a.

Therefore, the size of the brushless motor 220 in the axial direction can be reduced, and an increase in the size of the output shaft 233 of the motor 210 having deceleration mechanism installed therein along the axial direction can be suppressed, thereby realizing downsizing of the motor 210 having deceleration mechanism installed therein.

As shown in FIGS. 31, 32, and 38, the deceleration mechanism 230 rotatably housed inside the gear case 212 includes a pinion gear (first gear) 231 formed in a substantially rod shape, and a helical gear (second gear) 232 formed in a substantially disc shape. Here, the axis of the pinion gear 231 and the axis of the helical gear 232 are parallel to each other. That is, the pinion gear 231 and the output shaft 233 are parallel to each other. Accordingly, the deceleration mechanism 230 can be made more compact in size than a worm reduction gear including a worm and a worm wheel the axes of which intersect each other.

In addition, the pinion gear 231 is arranged on the input side (drive source side) of the motor 210 having deceleration mechanism installed therein, and the helical gear 232 is arranged on the output side (driven object side) of the motor 210 having deceleration mechanism installed therein. That is, the deceleration mechanism 230 reduces the high speed of rotation of the pinion gear 231 having a small number of teeth to the low speed of rotation of the helical gear 232 having a large number of teeth. Therefore, the helical gear 232 is rotated at a lower speed than the pinion gear 231

Here, the base end side (axial end part) of the pinion gear 231 is firmly fixed to the center of the rotor body 222a and the second ball bearing BR22 by press fitting or the like, so that the pinion gear 231 is integrally rotated with the rotor 222. That is, the pinion gear 231 also functions as a rotary shaft of the motor 210 having deceleration mechanism installed therein. In addition, the front end side of the pinion gear 231 is firmly fixed to the center of the first ball bearing BR12 by press fitting or the like.

The pinion gear 231 forming the deceleration mechanism 230 is made of metal and has a shape as shown in FIGS. 32 and 38. Specifically, spiral teeth (teeth) 231a are integrally arranged around the pinion gear 231, and the axial length of the spiral tooth 231a is slightly longer than the axial length of the helical gear 232. Accordingly, the spiral tooth 231a is reliably engaged with the helical gear 232.

The spiral tooth 231a continuously extends in a spiral manner in the axial direction of the pinion gear 231, and the pinion gear 231 is provided with only one spiral tooth 231a. That is, the number of teeth of the pinion gear 231 is set to "1". The spiral tooth 231a is formed to have a circular cross section along a direction orthogonal to the axial direction of the pinion gear 231, and is adapted to enter (be engaged with) the engagement recessed part 232c of the helical gear 232.

The helical gear 232 forming the deceleration mechanism 230 is made of plastic and has a shape as shown in FIGS. 32 and 38. Specifically, the helical gear 232 includes a gear body 232a formed in a substantially disc shape, and the base end side of the output shaft 233 is firmly fixed to the rotation center of the gear body 232a by press fitting or the like. This causes the output shaft 233 to rotate integrally with the helical gear 232.

In addition, a first recessed part 232a1 that is shallowly recessed in the axial direction of the output shaft 233 is arranged on the sensor substrate 240 side (upper side in FIG. 32) of the gear body 232a. The second sensor magnet MG22 is fixed to the center of the first recessed part 232a1. The depth dimension of the first recessed part 232a1 is slightly larger than the thickness dimension of the second sensor magnet MG22, so that when the helical gear 232 is viewed from the outside in the radial direction, the second sensor magnet MG22 is hidden by the helical gear 232. This also realizes downsizing of the motor 210 having deceleration mechanism installed therein.

On the other hand, a second recessed part 232a2 deeply recessed in the axial direction of the output shaft 233 is formed on the side opposite to the sensor substrate 240 side of the gear body 232a, that is, on the part of the gear body 232a facing the bottom wall part 212a (lower side in FIG. 32). The depth dimension of the second recessed part 232a2 is deeper than the depth dimension of the first recessed part 232a1. Then, as shown in FIG. 32, the second cylindrical part 212d2 of the boss part 212d and the plurality of second reinforcing ribs RB22 are inserted into the inside of the second recessed part 232a2. This also realizes downsizing of the motor 210 having deceleration mechanism installed therein.

In addition, on the outer peripheral part of the gear body 232a, a plurality of spiral teeth 232b are integrally arranged so as to be aligned in the circumferential direction of the gear body 232a. These helical teeth 232b are inclined with respect to the axial direction of the pinion gear 231 at a predetermined angle, so that the helical gear 232 rotates with the rotation of the spiral tooth 231a. Specifically, an engagement recessed part 232c is arranged between the adjacent helical teeth 232b, and the spiral tooth 231a is inserted into and engaged with the engagement recessed part 232c. Moreover, in the engagement recessed part 232c, the cross section along the direction orthogonal to the axial direction of the output shaft 233 is formed in a circular shape (a substantially arc shape).

Here, the number of helical teeth 232b (the engagement recessed parts 232c) arranged on the helical gear 232 is "40". That is, in the present embodiment, the deceleration ratio of the deceleration mechanism 230 including the pinion gear 231 and the helical gear 232 is set to "40".

As described above in detail, according to the present embodiment, by protruding one side in the longitudinal direction and the other side in the longitudinal direction of the boss part 212d that rotatably supports the output shaft 233 to the outside and the inside of the gear case 212, respectively, the first reinforcing ribs RB12 are formed between the first cylindrical part 212*d*1 and the bottom wall part 212*a* forming one side in the longitudinal direction of the boss part 212*d*, and the second reinforcing ribs RB22 are formed between the second cylindrical part 212*d*2 and the bottom wall part 212*a* forming the other side in the longitudinal direction of the boss part 212*d*, thereby enhancing the fixing strength of the boss part 212*d* to the bottom wall part 212*a*.

Thus, the boss part 212*d* may be prevented from largely protruding from the bottom wall part 212*a* of the gear case 212 toward the outside of the gear case 212 without reducing the strength of the gear case 212. Therefore, the thickness dimension of the output shaft 233 of the motor 210 having deceleration mechanism installed therein along the axial direction can be reduced, thereby improving the versatility of the motor 210 having deceleration mechanism installed therein.

In addition, according to the present embodiment, the pinion gear 231 and the output shaft 233 are arranged in parallel with each other, and the second recessed part 232*a*2 recessed in the axial direction of the output shaft 233 is arranged at the part facing the bottom wall part 212*a* of the helical gear 232. The second reinforcing rib RB22 is inserted into the second recess 232*a*2.

Therefore, the thickness dimension of the output shaft 233 of the motor 210 having deceleration mechanism installed therein in the axial direction can be reduced, thereby improving the versatility of the motor 210 having deceleration mechanism installed therein.

Furthermore, according to the present embodiment, because the pinion gear 231 forming the deceleration mechanism 230 includes only one spiral tooth 231*a*, the deceleration ratio is higher than the deceleration ratio of a pinion gear 231 including a plurality of tooth parts.

Therefore, the small brushless motor 220 may be adopted, and the size of the motor 210 having deceleration mechanism installed therein may be further reduced.

In addition, according to the present embodiment, the rotor 222 that rotates the pinion gear 231 is arranged at the axial end part of the pinion gear 231, and the second ball bearing BR22 that rotatably supports the pinion gear 231 is arranged on the radial inner side of the rotor 222.

Accordingly, the second ball bearing BR22 may be arranged so as to be hidden on the radial inner side of the rotor 222, thereby reducing the axial dimension of the brushless motor 220.

Furthermore, according to the present embodiment, the pinion gear 231 and the helical gear 232 are provided with the first sensor magnet MG12 and the second sensor magnet MG22, respectively. The sensor substrate 240 is arranged between the first sensor magnet MG12 and the second sensor magnet MG22. Three Hall ICs 241 facing the first sensor magnet MG12 from the axial direction of the pinion gear 231 are arranged on the surface 240*a* of the sensor substrate 240. One MR sensor 242 facing the second sensor magnet MG22 from the axial direction of the pinion gear 231 is arranged on the back surface 240*b* of the sensor substrate 240.

Accordingly, the three Hall ICs 241 may be arranged at parts separated from the first sensor magnet MG12 at the same separation distance t22. Thus, the three Hall ICs 241 may be surely operated under the same conditions, and the in-vehicle controller may precisely detect the rotation state of the pinion gear 231 accordingly.

In addition, three Hall ICs 241 and one MR sensor 242 may be mounted on each of the front surface 240*a* and the back surface 240*b* of the same sensor substrate 240, thus eliminating the need for arranging a plurality of sensor substrates inside the housing 211. Therefore, an increase in the number of parts can be suppressed, and the motor 210 having deceleration mechanism installed therein can be further miniaturized and reduced in weight.

The present invention is not limited to the above embodiments, and numerous changes may be made without departing from the spirit of the invention. For example, in the above embodiment, although the motor 210 having deceleration mechanism installed therein is applied to the drive source of a wiper device mounted on a vehicle, the present invention is not limited thereto, and it may also be applied to other drive sources of a power window device, a sunroof device, or the like.

In addition, in the above-described embodiment, although the motor 210 having deceleration mechanism installed therein including the brushless motor 220 is shown, the present invention is not limited thereto, and a brushed motor may also be used as the motor unit.

In addition, the material, shape, size, number, installation location, and the like of each constituent component in the above-described embodiment are freely selected as long as the present invention may be achieved, and are not limited to the above-described embodiment.

INDUSTRIAL APPLICABILITY

The deceleration mechanism and the motor having deceleration mechanism installed therein are used, for example, as a drive source such as a wiper device and a power window device mounted on a vehicle such as an automobile.

What is claimed is:

1. A deceleration mechanism, comprising a first gear and a second gear, the deceleration mechanism having:
    a first tooth part, arranged in the first gear and extending spirally in an axial direction of the first gear;
    an engagement projected part, arranged on the first tooth part, formed in an arc shape in a direction orthogonal to the axial direction of the first gear, and having a curvature center at a position eccentric from a rotation center of the first gear;
    a plurality of second tooth parts, arranged on the second gear, inclined with respect to the axial direction of the first gear, and arranged in a circumferential direction of the second gear; and
    an engagement recessed part, arranged between the adjacent second tooth parts, formed in an arc shape in a direction orthogonal to the axial direction of the first gear, and engaged with the engagement projected part,
    wherein the first tooth part comprises:
    an apex, arranged on the engagement projected part at an end part of a radial outer side of the first gear; and
    a relief part, arranged at an end part opposite to the apex with respect to the curvature center of the engagement projected part and configured to prevent an interference with the second tooth part.

2. The deceleration mechanism according to claim 1, wherein a deceleration ratio of the first gear and the second gear is equal to a ratio of a first distance between the curvature center of the engagement projected part and the rotation center of the first gear and a second distance between a curvature center of the engagement recessed part and a rotation center of the second gear.

3. The deceleration mechanism according to claim 1, wherein an axis of the first gear and an axis of the second gear are parallel to each other.

4. A motor having deceleration mechanism installed therein, comprising:
- a motor, having a rotating body;
- a first gear, rotated by the rotating body; and
- a second gear, rotated by the first gear,
- the motor having deceleration mechanism installed therein having:
- a first tooth part, arranged in the first gear and extending spirally in an axial direction of the first gear;
- an engagement projected part, arranged on the first tooth part, formed in an arc shape in a direction orthogonal to the axial direction of the first gear, and having a curvature center at a position eccentric from a rotation center of the first gear;
- a plurality of second tooth parts, arranged on the second gear, inclined with respect to the axial direction of the first gear, and arranged in a circumferential direction of the second gear;
- an engagement recessed part, arranged between the adjacent second tooth parts, formed in an arc shape in a direction orthogonal to the axial direction of the first gear, and engaged with the engagement projected part, and
- an output shaft arranged at a rotation center of the second gear,
- wherein the first tooth part comprises:
- an apex, arranged on the engagement projected part at an end part of a radial outer side of the first gear, and
- a relief part, arranged at an end part opposite to the apex with respect to the curvature center of the engagement projected part and configured to prevent an interference with the second tooth part.

5. The motor having deceleration mechanism installed therein according to claim 4,
wherein a deceleration ratio of the first gear and the second gear is equal to a ratio of a first distance between the curvature center of the engagement projected part and the rotation center of the first gear and a second distance between a curvature center of the engagement recessed part and the rotation center of the second gear.

6. The motor having deceleration mechanism installed therein according to claim 4,
wherein an axis of the first gear and an axis of the second gear are parallel to each other.

* * * * *